United States Patent
Nelson et al.

(10) Patent No.: US 10,507,423 B2
(45) Date of Patent: *Dec. 17, 2019

(54) SEAL ARRANGEMENT FOR FILTER ELEMENT; FILTER ELEMENT ASSEMBLY; AND, METHODS

(71) Applicant: Donaldson Company, Inc., Bloomington, MN (US)

(72) Inventors: Benny Kevin Nelson, Bloomington, MN (US); Sheldon Anderson, Bloomington, MN (US); Thomas Miller, Eagan, MN (US); Ross Norman Anderson, Chanhassen, MN (US); John Orlin Kirkwold, Champllin, MN (US); Kevin Schrage, Spring Valley, MN (US); Troy Murphy, Cresco, IA (US); Donald Raymond Mork, Lime Springs, IA (US); Richard J. Osendorf, West St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/639,464

(22) Filed: Jun. 30, 2017

(65) Prior Publication Data
US 2018/0015406 A1 Jan. 18, 2018

Related U.S. Application Data

(63) Continuation of application No. 14/611,604, filed on Feb. 2, 2015, now Pat. No. 9,718,021, which is a (Continued)

(51) Int. Cl.
*B01D 59/50* (2006.01)
*B01D 46/52* (2006.01)
(Continued)

(52) U.S. Cl.
CPC ....... *B01D 46/527* (2013.01); *B01D 46/0001* (2013.01); *B01D 46/0004* (2013.01);
(Continued)

(58) Field of Classification Search
CPC .............. B01D 46/527; B01D 46/0001; B01D 46/0004; B01D 46/525; B01D 46/10;
(Continued)

(56) References Cited

U.S. PATENT DOCUMENTS

| | | |
|---|---|---|
| 3,019,854 A | 2/1962 | O'Bryant |
| 3,025,963 A | 3/1962 | Bauer |

(Continued)

FOREIGN PATENT DOCUMENTS

| | | |
|---|---|---|
| CA | 997684 | 9/1976 |
| DE | 2155522 | 5/1973 |

(Continued)

OTHER PUBLICATIONS

Declaration of Steven S. Gieseke with Exhibits A-C dated Jan. 31, 2000.
(Continued)

*Primary Examiner* — Dung H Bui
(74) *Attorney, Agent, or Firm* — Merchant & Gould P.C.

(57) ABSTRACT

A filter cartridge arrangement is provided which includes a media pack comprising Z-filter media, a preform and a housing seal member. Improvements in the preform and seal member are described which include: a single beveled surface of the seal member to facilitate installation; and, an inside region of the seal member having a tip adjacent in inwardly directed lip of the preform, to control flash during molding. A variety of media pack configurations and features are described.

19 Claims, 27 Drawing Sheets

Related U.S. Application Data continuation of application No. 13/854,316, filed on Apr. 1, 2013, now Pat. No. 8,945,268, which is a continuation of application No. 12/084,730, filed as application No. PCT/US2006/043836 on Nov. 8, 2006, now Pat. No. 8,409,316.

(60) Provisional application No. 60/735,650, filed on Nov. 9, 2005.

(51) Int. Cl.
| | |
|---|---|
| B01D 46/24 | (2006.01) |
| B01D 46/00 | (2006.01) |
| B01D 46/10 | (2006.01) |
| F02M 35/02 | (2006.01) |
| F02M 35/024 | (2006.01) |

(52) U.S. Cl.
CPC .......... *B01D 46/10* (2013.01); *B01D 46/2411* (2013.01); *B01D 46/2414* (2013.01); *B01D 46/521* (2013.01); *B01D 46/525* (2013.01); *F02M 35/0203* (2013.01); B01D 46/0005 (2013.01); B01D 2271/027 (2013.01); B01D 2279/60 (2013.01); F02M 35/024 (2013.01)

(58) Field of Classification Search
CPC .......... B01D 2279/60; B01D 2271/027; F02M 35/0203; F02M 35/024
See application file for complete search history.

(56) References Cited

U.S. PATENT DOCUMENTS

| | | |
|---|---|---|
| 3,209,917 A | 10/1965 | Yelinek |
| 3,442,067 A | 5/1969 | Swenson |
| 3,676,242 A | 7/1972 | Prentice |
| 3,695,437 A | 10/1972 | Shaltis |
| 3,740,933 A | 6/1973 | Hollowell |
| 3,807,150 A | 4/1974 | Maracle |
| 3,841,953 A | 10/1974 | Kohkamp et al. |
| 3,849,241 A | 11/1974 | Butin et al. |
| 3,878,014 A | 4/1975 | Melead |
| 3,912,631 A | 10/1975 | Turman |
| 4,065,341 A | 12/1977 | Cub |
| 4,282,186 A | 8/1981 | Nonnenmann et al. |
| 4,285,909 A | 8/1981 | Mizusawa et al. |
| 4,310,419 A | 1/1982 | Nara et al. |
| 4,322,231 A | 3/1982 | Hilzendeger et al. |
| 4,402,830 A | 9/1983 | Pall |
| 4,449,993 A | 5/1984 | Bergeron |
| 4,498,989 A | 2/1985 | Miyakawa et al. |
| 4,578,091 A | 3/1986 | Borja |
| 4,617,176 A | 10/1986 | Merry |
| 4,720,292 A | 1/1988 | Engel et al. |
| 4,759,783 A | 7/1988 | Machado |
| 4,824,564 A | 4/1989 | Edwards et al. |
| 4,925,561 A | 5/1990 | Ishii et al. |
| 4,997,556 A | 3/1991 | Yano et al. |
| 4,999,038 A | 3/1991 | Lundberg |
| 5,049,326 A | 9/1991 | Matsumoto et al. |
| 5,082,476 A | 1/1992 | Kahlbaugh et al. |
| 5,174,895 A | 12/1992 | Drori |
| 5,238,474 A | 8/1993 | Kahlbaugh et al. |
| 5,304,312 A | 4/1994 | Forster et al. |
| 5,350,515 A | 9/1994 | Stark et al. |
| 5,415,677 A | 5/1995 | Ager et al. |
| 5,435,870 A | 7/1995 | Takagaki et al. |
| 5,484,466 A | 1/1996 | Brown et al. |
| 5,487,767 A | 1/1996 | Brown |
| 5,490,930 A | 2/1996 | Krull |
| 5,543,007 A | 8/1996 | Takagaki et al. |
| 5,547,480 A | 8/1996 | Coulonvaux |
| 5,582,146 A | 12/1996 | Linsbauer et al. |
| 5,611,922 A | 3/1997 | Steve |
| 5,613,992 A | 3/1997 | Engel |
| 5,645,718 A | 7/1997 | Hardison et al. |
| 5,672,399 A | 9/1997 | Kahlbaugh et al. |
| 5,683,660 A | 11/1997 | Wirth et al. |
| 5,685,985 A | 11/1997 | Brown et al. |
| 5,693,109 A | 12/1997 | Coulonvaux |
| 5,714,126 A | 2/1998 | Frund |
| 5,730,766 A | 3/1998 | Clements |
| 5,755,843 A | 5/1998 | Sundquist |
| 5,772,883 A | 6/1998 | Rothman et al. |
| D396,098 S | 7/1998 | Gillingham et al. |
| D398,046 S | 8/1998 | Gillingham et al. |
| 5,792,247 A | 8/1998 | Gillingham et al. |
| 5,800,587 A | 9/1998 | Kahlbaugh et al. |
| 5,820,646 A | 10/1998 | Gillingham et al. |
| D401,306 S | 11/1998 | Ward et al. |
| 5,863,313 A | 1/1999 | Coulonvaux |
| 5,895,574 A | 4/1999 | Friedmann et al. |
| 5,897,676 A | 4/1999 | Engel |
| 5,902,364 A | 5/1999 | Tokar et al. |
| 5,908,480 A | 6/1999 | Ban et al. |
| 5,938,804 A | 8/1999 | Engel et al. |
| D416,308 S | 11/1999 | Ward et al. |
| D417,268 S | 11/1999 | Gillingham |
| 6,048,386 A | 4/2000 | Gillingham et al. |
| D425,189 S | 5/2000 | Gillingham et al. |
| 6,149,700 A | 11/2000 | Morgan et al. |
| 6,179,890 B1 | 1/2001 | Ramos et al. |
| 6,187,073 B1 | 2/2001 | Gieseke et al. |
| 6,187,240 B1 | 2/2001 | Coulonvaux |
| 6,190,432 B1 | 2/2001 | Gieseke et al. |
| 6,235,195 B1 | 5/2001 | Tokar |
| D450,827 S | 11/2001 | Gieseke et al. |
| 6,312,491 B1 | 11/2001 | Coulonvaux |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| D461,003 S | 7/2002 | Gieseke et al. |
| D461,884 S | 8/2002 | Gieseke et al. |
| 6,447,567 B1 | 9/2002 | Ehrenberg |
| D466,602 S | 12/2002 | Gieseke et al. |
| 6,517,598 B2 | 2/2003 | Anderson et al. |
| 6,610,117 B2 | 8/2003 | Gieseke et al. |
| 6,610,126 B2 | 8/2003 | Xu et al. |
| 6,638,332 B1 | 10/2003 | Schmitz et al. |
| D483,459 S | 12/2003 | DeWit et al. |
| 6,783,565 B2 | 8/2004 | Gieseke et al. |
| 6,852,141 B2 | 2/2005 | Bishop et al. |
| 6,946,012 B1 | 9/2005 | Miller et al. |
| 6,994,744 B2 | 2/2006 | Tokar et al. |
| 6,997,968 B2 * | 2/2006 | Xu .................. B01D 46/00 55/495 |
| 7,004,986 B2 | 2/2006 | Kopec et al. |
| 7,008,467 B2 | 3/2006 | Krisko et al. |
| 7,252,704 B2 | 8/2007 | Tokar et al. |
| 7,255,300 B2 | 8/2007 | Johnston |
| 7,261,756 B2 | 8/2007 | Merritt |
| 7,303,604 B2 | 12/2007 | Gieseke et al. |
| 7,318,851 B2 | 1/2008 | Brown et al. |
| 7,396,376 B2 | 7/2008 | Schrage et al. |
| 7,931,724 B2 | 4/2011 | Schrage et al. |
| 7,935,166 B2 | 5/2011 | Schrage et al. |
| 8,034,144 B2 | 10/2011 | Gieseke et al. |
| 8,409,316 B2 | 4/2013 | Nelson et al. |
| 8,945,268 B2 | 2/2015 | Nelson et al. |
| 9,718,021 B2 | 8/2017 | Nelson et al. |
| 2001/0003893 A1 | 6/2001 | Ramos et al. |
| 2001/0037631 A1 | 11/2001 | Morgan et al. |
| 2002/0185007 A1 | 12/2002 | Xu et al. |
| 2004/0173097 A1 | 9/2004 | Engelland et al. |
| 2004/0221555 A1 | 11/2004 | Engelland et al. |
| 2005/0060972 A1 | 3/2005 | Gieseke et al. |
| 2006/0090431 A1 | 5/2006 | Brown |
| 2006/0090434 A1 | 5/2006 | Brown et al. |
| 2006/0091061 A1 | 5/2006 | Brown et al. |
| 2006/0091064 A1 | 5/2006 | Brown et al. |
| 2006/0091066 A1 | 5/2006 | Driml et al. |
| 2006/0091084 A1 | 5/2006 | Merritt et al. |

(56) References Cited

U.S. PATENT DOCUMENTS

| | | | |
|---|---|---|---|
| 2006/0163150 | A1 | 7/2006 | Golden et al. |
| 2009/0241494 | A1 | 10/2009 | Schrage et al. |
| 2009/0266041 | A1 | 10/2009 | Schrage et al. |
| 2011/0203241 | A1 | 8/2011 | Schrage et al. |

FOREIGN PATENT DOCUMENTS

| | | |
|---|---|---|
| DE | 10222800 | 12/2003 |
| EP | 0 376 443 B1 | 7/1990 |
| EP | 0 486 276 A1 | 5/1992 |
| EP | 0 486 276 B1 | 5/1992 |
| EP | 0 492 250 A1 | 7/1992 |
| EP | 0 529 921 A1 | 3/1993 |
| EP | 0 529 921 B1 | 3/1993 |
| EP | 0 581 695 B1 | 2/1994 |
| EP | 0 704 233 B1 | 4/1996 |
| EP | 0 738 528 A2 | 10/1996 |
| EP | 738528 A2 | 10/1998 |
| EP | 1 159 052 B1 | 11/2003 |
| EP | 1364695 | 11/2003 |
| GB | 703823 | 2/1954 |
| GB | 1275651 | 5/1972 |
| JP | S58-151417 | 9/1983 |
| JP | 59-26113 | 2/1984 |
| JP | 59-170669 | 11/1984 |
| JP | 60-112320 | 6/1985 |
| JP | S60-155921 | 8/1985 |
| JP | 63-122617 | 8/1988 |
| JP | H02-48117 | 9/1988 |
| JP | H02-48118 | 9/1988 |
| JP | 1-11971 | 4/1989 |
| JP | 1-122817 | 5/1989 |
| JP | 1-171615 | 7/1989 |
| WO | WO 88/03431 | 5/1988 |
| WO | WO 88/03432 | 5/1988 |
| WO | WO 97/40908 | 11/1997 |
| WO | WO 97/40910 | 11/1997 |
| WO | WO 97/40917 | 11/1997 |
| WO | WO 97/40918 | 11/1997 |
| WO | WO 97/41939 | 11/1997 |
| WO | WO 97/45200 | 12/1997 |
| WO | WO 98/35144 | 8/1998 |
| WO | WO 99/37381 | 7/1999 |
| WO | WO 99/47237 | 9/1999 |
| WO | WO 00/50149 | 8/2000 |
| WO | WO 00/74818 | 12/2000 |
| WO | WO 03/084641 | 10/2003 |
| WO | WO 03/95068 A1 | 11/2003 |
| WO | WO 2004/007054 | 1/2004 |
| WO | WO 2004/020075 A2 | 3/2004 |
| WO | WO 2005/063361 | 7/2005 |
| WO | WO 2005/094655 A2 | 10/2005 |
| WO | WO 2006/017790 A1 | 2/2006 |
| WO | WO 2007/056589 | 5/2007 |

OTHER PUBLICATIONS

Opposer's (Baldwin's) Reasons for the Opposition from European Patent of EP 1 159 052 B1 (Aug. 24, 2004).
Proprietor's (Donaldson's)Answer from European Opposition of EP 1 159 052 B1 (Mar. 31, 2005).
Opposer's (Baldwin's) Arguments Prior to Oral Proceedings from European Opposition of EP 1 159 052 B1 (Jan. 20, 2006).
Proprietor's (Donaldson's) Arguments Prior to Oral Proceedings from European Opposition of EP 1 159 052 B1 (Jan. 21, 2006).
Minutes of the Oral Proceedings from European Opposition of EP 1 159 052 B1 (Apr. 14, 2006).
Decision Revoking the European patent from European Opposition of EP 1 159 052 B1 (Apr. 13, 2006).
Proprietor's (Donaldson's) Grounds of Appeal from European Opposition of EP 1 159 052 B1 (Aug. 17, 2006).
Opposer's (Baldwin's) Response to the Grounds of Appeal from European Opposition of EP 1 159 052 B1 (Feb. 16, 2007).
Proprietor's Donaldson's Written Submission from European Opposition of EP 1 159 052 B1 (Oct. 30, 2009).
Opposer's (Baldwin's) Written Submission from European Opposition of EP 1 159 052 B1 (Nov. 11, 2009).
Minutes from Oral Hearing from European Opposition of EP 1 159 052 B1 (Dec. 15, 2009).
Decision from European Opposition of EP 1 159 052 B1 (dated Dec. 12, 2009).
Complaint with Exhibits A-F; *Donaldson Company, Inc.* v. *Mann+Hummel USA, Inc. and Mann+Hummel GmbH*, United States District Court District of Minnesota, Case 0:07-cv-04136 MJD-SRN filed Oct. 1, 2007.
Notice of Claims Involving Patents; *Donaldson Company, Inc.* v. *Mann+Hummel USA, Inc. and Mann+Hummel GmbH*, United States District Court District of Minnesota, Case 0:07-cv-04136 MJD-SRN filed Oct. 1, 2007.
Rule 7.1 Disclosure Statement of Plaintiff Donaldson Company, Inc.; *Donaldson Company, Inc.* v. *Mann+Hummel USA, Inc. and Mann+Hummel GmbH*, United States District Court District of Minnesota, Case 0:07-cv-04136 MJD-SRN filed Oct. 1, 2007.
Civil Cover Sheet; *Donaldson Company, Inc.* v. *Mann+Hummel USA, Inc. and Mann+Hummel GmbH*, United States District Court District of Minnesota, Case 0:07-cv-04136 MJD-SRN filed Oct. 1, 2007.
Voluntary Order of Dismissal, *Donaldson Company, Inc.* v. *Mann+Hummel USA, Inc. and Mann+Hummel GmbH*, United States District Court District of Minnesota, Case 0:07-cv-04136 MJD-SRN filed Apr. 29, 2008.
Notice of Opposition by Baldwin Filters from the European Patent Office in European Opposition of EP 1 410 832 (Feb. 11, 2008).
Reasons for Opposition by Baldwin Filters in European Opposition of EP 1 410 832 (Jan. 31, 2008).
Notice of Opposition from Mann+Hummel GmbH in European Opposition of EP 1 410 832 (Feb. 1, 2008).
Grounds for Opposition from Mann+Hummel GmbH in European Opposition of EP 1 410 832 (Feb. 1, 2008).
English Translation of Grounds for Opposition from Mann+Hummel GmbH in European Opposition of EP 1 410 832 (Feb. 1, 2008).
Communication pursuant to Article 101(1) and Rule 81(2) to (3) EPC for EP 1 410 832 (Feb. 17, 2010).
Donaldson's Submission in European Opposition in European Opposition of EP 1 410 832 (Sep. 22, 2008).
Notice of Opposition by Baldwin Filters from the European Patent Office in European Opposition of EP 1 785 246 (Jan. 30, 2009).
Notice of Opposition by Baldwin Filters in European Opposition of EP 1 785 246 (Dec. 23, 2008).
Communication pursuant to Article 101(1) and Rule 81(2) to (3) EPC for EP 1 785 246 (dated Feb. 17, 2010).
Donaldson's Response to Communication dated Jan. 30, 2009 in European Opposition of EP 1 785 246; (Aug. 9, 2009).
Maintenance Decision from European Opposition of EP 1 159 052 B1 (Jul. 7, 2011).
Statement Regarding Product dated Dec. 23, 2010 (7 pages).
Statement Regarding Product dated Dec. 23, 2010 (10 pages).
Brown Motion 2—Lack of Written Description, 87 pages, filed Jul. 7, 2011.
Brown Motion 3—Indefiniteness, 112, Second, 51 pages, filed Aug. 31, 2011.
Brown Motion 4 Based Upon Prior Art, 78 pages, filed Aug. 31, 2011.
Brown Motion 5—Denial of Benefit, 13 pages, filed Aug. 31, 2011.
Brown Motion 6—Dedesignate Claims, 31 pages, filed Aug. 31, 2011.
Schrage Substantive Motion 1, 28 pages, filed Aug. 31, 2011.
Brown Opposition 1, 55 pages, Nov. 15, 20211.
Schrage Opposition 2, 91 pages, filed Nov. 15, 2011.
Schrage Opposition 3, 61 pages, filed Nov. 15, 2011.
Schrage Opposition 4, 74 pages, filed Nov. 15, 2011.
Schrage Opposition 5, 21 pages, filed Nov. 15, 2011.
Schrage Opposition 6, 21 pages, filed Nov. 15, 2011.
Brown Reply 2, 83 pages, filed Nov. 29, 2011.
Brown Reply 3, 45 pages, filed Nov. 29, 2011.

(56) References Cited

OTHER PUBLICATIONS

Brown Reply 4, 52 pages, filed Nov. 29, 2011.
Brown Reply 5, 22 pages, filed Nov. 29, 2011.
Brown Reply 6, 17 pages, filed Nov. 29, 2011.
Schrage Reply 1, 68 pages, filed Nov. 29, 2011.
Schrage Motion 2 (To Exclude Brown Exhibits 2098, 2117-2123, and 2125), 20 pages, filed Dec. 13, 2011.
Brown Motion 8, 18 pages, filed Dec. 13, 2011.
Brown Opposition 2, 21 pages, filed Dec. 15, 2011.
Schrage Opposition 8, 20 pages, filed Dec. 16, 2011.
Brown Reply 8, 19 pages, filed Dec. 19, 2011.
Schrage Reply 2, 25 pages, filed Dec. 20, 2011.
Brown Exhibit List, 11 pages, filed Dec. 25, 2011.
Schrage Exhibit List as of Dec. 28, 2011, 5 pages, filed Dec. 28, 2011.
Schrage Exhibit 1001—Schrage Objections to Brown's Evidence Served Jul. 27, 2011; filed Aug. 3, 2011.
Schrage Exhibit 1002—U.S. Pat. No. 7,318,851.
Schrage Exhibit 1003—U.S. Pat. No. 6,350,291.
Schrage Exhibit 1004—U.S. Pat. No. 6,517,598.
Schrage Exhibit 1005—U.S. Patent Application Publication No. US2008/0016832.
Schrage Exhibit 1006—U.S. Pat. No. 7,396,375.
Schrage Exhibit 1007—Declaration of David Y.H. Pui.
Schrage Exhibit 1008—Exhibit Curricula Vitae of David Y.H. Pui.
Schrage Exhibit 1009—Claim Chart.
Schrage Exhibit 1010—Declaration of Tom Lage.
Schrage Exhibit 1011—Drawing of Tom Lage.
Schrage Exhibit 1012—U.S. Patent Application Publication No. US2009/0241494.
Schrage Exhibit 1013—U.S. Pat. No. 7,569,090.
Schrage Exhibit 1014—Merriam-Webster Dictionary Definition of the Term "Hub"; as printed on Aug. 31, 2011.
Schrage Exhibit 1015—U.S. Pat. No. 7,318,851 marked by Merritt during deposition dated Oct. 27, 2011.
Schrage Exhibit 1016—Second Declaration of David Y.H. Pui.
Schrage Exhibit 1017—Second Declaration of Tom Lage.
Schrage Exhibit 1018—Page of U.S. Patent Publication No. US 2009/0241494 that includes Figure 6 (as referenced by exhibit 1017).
Schrage Exhibit 1019—Page of U.S. Patent Publication No. US 2009/0241494 that includes Figure 6, with Lage drawing (as referenced by exhibit 1017).
Schrage Exhibit 1020—Deposition Transcript of Steven Merritt dated Oct. 27, 2011.
Schrage Exhibit 1021—Exhibit 2117, "Steve Merritt measurements on Fig. 7 of U.S. Pat. No. 6,350,291"—with additional drawings and notations by Steven Merritt during his deposition on Nov. 22, 2011.
Schrage Exhibit 1022—Exhibit 1011, "Drawing by Tom Lage"—with additional drawings and notations by Steven Merritt during his deposition on Nov. 22, 2011.
Schrage Exhibit 1023—Exhibit 2119, "Screen Shot of Solid Edge generated lines on zoomed portion of Fig. 6 of U.S. Pat. No. 6,350,291"—with additional drawings and notations by Steven Merritt during his deposition on Nov. 22, 2011.
Schrage Exhibit 1024—Exhibit 2007, "Browns involved U.S. Pat. No. 7,318,851"—with additional drawings and notations by Steven Merritt during his deposition on Nov. 22, 2011.
Schrage Exhibit 1025—Exhibit 2024, "Timely Engineering Associates Memorandum dated Aug. 10, 2004"—with additional drawings and notations by Steven Merritt during his deposition on Nov. 22, 2011.
Schrage Exhibit 1026—Deposition transcript of Steven Merritt dated Nov. 22, 2011.
Schrage Exhibit 1027—Japanese patent application JP 9-234157 published Sep. 9, 1997.
Schrage Exhibit 1028—English translation of the abstract of Japanese patent application JP 9-234157 published Sep. 9, 1997 (printed from qpat.com on Nov. 17, 2011).
Schrage Exhibit 1029—Deposition transcript of Steven Merritt dated Dec. 9, 2011.
Schrage Exhibit 1030—File History of U.S. Appl. No. 60/556,133, filed Mar. 24, 2004.
Schrage Exhibit 1031—Paper 136: Schrage Objections to Evidence Dated Nov. 15, 2011 (filed Nov. 22, 2011).
Schrage Exhibit 1032—Paper 148: Schrage Objections to Evidence Dated Nov. 29, 2011 (filed Dec. 6, 2011).
Brown Exhibit 2001—USP 20090241494, US Patent Publication of Schrage U.S. Appl. No. 12/321,127.
Brown Exhibit 2007—Browns involved U.S. Pat. No. 7,318,851 (Document name EX2007_USP_7318851_Brown.pdf).
Brown Exhibit 2008—Schrage Notice of Copying Claims (Document name EX2008_SchrageNoticeOfCopyingClaims.pdf).
Brown Exhibit 2009—Schrage's involved application's specification, including claims and abstract, and figures.
Brown Exhibit 2010—US Patent Publication 20090301045 to Nelson.
Brown Exhibit 2011—Inventor Declaration in Nelson, U.S. Appl. No. 12/084,730, published as 20090301045.
Brown Exhibit 2012—Text Compare Figs1-16Nelson_Schrage.
Brown Exhibit 2013—Definition of "shelf" from onelook.com.
Brown Exhibit 2014—Definition of "rib" from Oxford Dictionaries.
Brown Exhibit 2015—Definition of "annular" from onelook.com.
Brown Exhibit 2016—Definition of "ring" from onelook.com.
Brown Exhibit 2017—Definition of "raised" from onelook.com.
Brown Exhibit 2018—Definition of "projecting" from onelook.com.
Brown Exhibit 2019—Claims of Schrage provisional.
Brown Exhibit 2020—Claims of Schrage U.S. Appl. No. 11/091,883, as filed.
Brown Exhibit 2021—Examiner Reasons for Allowance, U.S. Appl. No. 11/019,883.
Brown Exhibit 2022—Schrage Comments on Allowance in U.S. Appl. No. 11/019,883.
Brown Exhibit 2023—US Patent Publication 20030146149 showing holes in the extension.
Brown Exhibit 2024—Timely Engineering Associates Memorandum dated Aug. 10, 2004.
Brown Exhibit 2025—Apr. 1, 2003 Baldwin Filters Engineering Bulletin.
Brown Exhibit 2026—Apr. 6, 2004 Baldwin Update.
Brown Exhibit 2027—Aug. 5, 2003 Baldwin Update.
Brown Exhibit 2028—CV of Steve Merritt.
Brown Exhibit 2029—Definition of "from" from onelook.com.
Brown Exhibit 2030—Brown Reasons for Allowance.
Brown Exhibit 2031—Definition of "edge" from onelook.com.
Brown Exhibit 2032—Definition of "perimeter" from onelook.com.
Brown Exhibit 2033—Brown's first declaration of Steve Merritt.
Brown Exhibit 2034—Definition of "axial" from onelook.com.
Brown Exhibit 2035—Definition of "situated" from onelook.com.
Brown Exhibit 2036—Definition of "on" from onelook.com.
Brown Exhibit 2037—Brown Exhibit 2001—Definition of "along" from onelook.com.
Brown Exhibit 2038—Definition of "in" from onelook.com.
Brown Exhibit 2039—Definition of "direction" from onelook.com.
Brown Exhibit 2040—Definition of "of" from onelook.com.
Brown Exhibit 2041—Definitions of "axially" from onelook.com.
Brown Exhibit 2042—Definitions of "axis" from onelook.com.
Brown Exhibit 2043—Definitions of "connecting" from onelook.com.
Brown Exhibit 2044—Definitions of "connection" from onelook.com.
Brown Exhibit 2045—Definitions of "operatively" from onelook.com.
Brown Exhibit 2046—Definitions of "operative" from onelook.com.
Brown Exhibit 2047—Brown's second declaration of Steve Merritt in Support of Motion 3.
Brown Exhibit 2049—Definitions of "filter" from onelook.com.
Brown Exhibit 2050—Brown Steve Merritt Unnumbered Declaration in Response to Objections to Evidence Submitted in Support of Brown Motion 2.
Brown Exhibit 2051—US Patent Application Publication 20020185008 to Anderson.

(56) References Cited

OTHER PUBLICATIONS

Brown Exhibit 2052—IFW for Schrage accorded benefit U.S. Appl. No. 60/532,783.
Brown Exhibit 2053—Application, as Filed, for Schrage accorded to benefit U.S. Appl. No. 11/019,883.
Brown Exhibit 2054—Application, as Filed, for Schrage accorded to benefit U.S. Appl. No. 12/215,725.
Brown Exhibit 2055—Brown's third declaration of Steve Merritt in support of Motion 4.
Brown Exhibit 2056—Brown's fourth declaration of Steve Merritt in support of Motion 5.
Brown Exhibit 2057—Brown's fifth declaration of Steve Merritt in support of Motion 6.
Brown Exhibit 2059—"John Deere" Trademark registration No. 921844.
Brown Exhibit 2060—AL111748B perspective top elevation view, long side.
Brown Exhibit 2061—AL111748B perspective side elevation view, long side.
Brown Exhibit 2062—AL111748B perspective side elevation view, short side.
Brown Exhibit 2063—AL111748B perspective bottom elevation view, long side.
Brown Exhibit 2064—AL111748B close-up of outer side surface of seal.
Brown Exhibit 2065—AL111748B close-up of inner short side surface of seal.
Brown Exhibit 2066—AL111748B close-up of inner long side surface of seal, peeled.
Brown Exhibit 2067—Sandberg Declaration Regarding AL111748 sale in the U.S.
Brown Exhibit 2068—Sandberg Declaration Exhibit A, bates Nos. 1-4.
Brown Exhibit 2069—Sandberg Declaration Exhibit A, bates Nos. 5-7.
Brown Exhibit 2070—Sandberg Declaration Exhibit A, bates Nos. 8.
Brown Exhibit 2071—Sandberg Declaration Exhibit A, bates Nos. 9-17.
Brown Exhibit 2072—Sandberg Declaration Exhibit A, bates Nos. 18-25.
Brown Exhibit 2073—Sandberg Declaration Exhibit A, bates Nos. 26.
Brown Exhibit 2074—Sandberg Declaration Exhibit A, bates Nos. 27.
Brown Exhibit 2075—Sandberg Declaration Exhibit A, bates Nos. 28-31.
Brown Exhibit 2076—Sandberg Declaration Exhibit A, bates Nos. 32.
Brown Exhibit 2077—Sandberg Declaration Exhibit A, bates Nos. 33-36.
Brown Exhibit 2078—Sandberg Declaration Exhibit A, bates Nos. 37-42.
Brown Exhibit 2079—Sandberg Declaration Exhibit A, bates Nos. 43.
Brown Exhibit 2080—Sandberg Declaration Exhibit A, bates Nos. 44-45.
Brown Exhibit 2081—Sandberg Declaration Exhibit A, bates Nos. 46-49.
Brown Exhibit 2082—Sandberg Declaration Exhibit A, bates Nos. 50-53.
Brown Exhibit 2083—Sandberg Declaration Exhibit A, bates Nos. 54-60.
Brown Exhibit 2084—Sandberg Declaration Exhibit A, bates Nos. 61-65.
Brown Exhibit 2085—Sandberg Declaration Exhibit A, bates Nos. 66-71.
Brown Exhibit 2086—Sandberg Declaration Exhibit A, bates Nos. 72.
Brown Exhibit 2087—Definition of "canted" from onelook.com.
Brown Exhibit 2089—Redacted version of Conception Document.
Brown Exhibit 2090—AL111748B close-up of stripped corner, posts exposed.
Brown Exhibit 2091—U.S. Pat. No. 5,902,364 to Tokar, seal height.
Brown Exhibit 2092—Deere TM4523 (Aug. 3, 1997) manual excerpt, showing filter.
Brown Exhibit 2093—Transcript of Aug. 19, 2011 deposition of Eric Sandberg, signature page.
Brown Exhibit 2094—Picture of label and packing bag enclosing new AL111748 filter.
Brown Exhibit 2095—Brown Steve Merritt Unnumbered Declaration in Response to Objections to Evidence Served on Brown Sep. 7, 2011.
Brown Exhibit 2096—Brown Bruce Margulies Unnumbered Declaration in Response to Objections to Evidence Served on Brown on Sep. 7, 2011.
Brown Exhibit 2097—Brown Sep. 16, 2011 Email Requesting Clarification of Sep. 7, 2011 Objections.
Brown Exhibit 2098—Brown's seventh declaration of Steve Merritt in support of Opposition 1.
Brown Exhibit 2099—Definition of "conically" from onelook.com.
Brown Exhibit 2100—Definition of "conical" from onelook.com.
Brown Exhibit 2101—Definition of "join" from onelook.com.
Brown Exhibit 2102—Definition of "joined" from onelook.com.
Brown Exhibit 2103—Definition of "joint" from onelook.com.
Brown Exhibit 2104—Definition of "cavity" from onelook.com.
Brown Exhibit 2105—Definition of "hub" from onelook.com.
Brown Exhibit 2108—Definition of "bead" from onelook.com.
Brown Exhibit 2109—Transcript of Cross Examination of Mr. Pui on Oct. 25, 2011.
Brown Exhibit 2110—*Carace* v. *Meyer Marketing*, 2011 U.S. Dist. Lexis 104181, _ F. Supp. _ (S.D.N.Y., Sep. 13, 2011).
Brown Exhibit 2117—Steve Merritt measurements on Fig. 7 of U.S. Pat. No. 6,350,291.
Brown Exhibit 2118—Steve Merritt measurements on Fig. 6 of U.S. Pat. No. 6,350,291.
Brown Exhibit 2119—Screen Shot of Solid Edge generated lines on zoomed portion of Fig. 6 of U.S. Pat. No. 6,350,291.
Brown Exhibit 2120—Brown's eighth declaration of Steve Merritt in support of Reply 2.
Brown Exhibit 2121—Steve Merritt measurements on Fig. 4 of US20090241494 (Schrage).
Brown Exhibit 2122—Steve Merritt measurements on Fig. 6 of US20090241494 (Schrage).
Brown Exhibit 2123—Steve Merritt measurements on Fig. 10 of US20090241494 (Schrage).
Brown Exhibit 2124—Transcript of Cross Examination of Mr. Pui on Nov. 23, 2011.
Brown Exhibit 2125—Brown unnumbered declaration of Steve Merritt in response to objection served Nov. 22, 2011 to evidence Brown evidence served Nov. 15, 2011.
Brown Exhibit 2126—Brown Objections to Evidence Served Sep. 1, 2011.
Brown Exhibit 2127—Brown Objections to Evidence Served Sep. 22, 2011.
Brown Exhibit 2128—Brown Objections to Evidence Served Sep. 22, 2011.
Brown Exhibit 2129—Brown unnumbered declaration of Steve Merritt in response to objection served Dec. 6, 2011 to evidence Brown served Nov. 29, 2011.
Brown Exhibit 2130—Wikipedia page for "Solid Edge."
Brown Exhibit 2131—Wikipedia page for "Measurement Uncertainty."
Decision of Motions filed Mar. 23, 2012.
First Redeclaration Order filed Mar. 23, 2012.
Order Setting Conference Call filed Mar. 23, 2012.
Brown Request for Rehearing on Paper 297 filed Mar. 30, 2012.
Post Conference Call Order filed Apr. 4, 2012.
Schrage Request for Rehearing filed Apr. 6, 2012.
Brown Request for Rehearing on Paper 301 filed Apr. 10, 2012.
Order filed Apr. 10, 2012.
Memorandum Opinion and Order dated Apr. 13, 2012.
Communication filed Apr. 13, 2012.

(56) References Cited

OTHER PUBLICATIONS

Brown Motion 9 filed Apr. 18, 2012.
Order filed Apr. 19, 2012.
Brown Motion 10 filed Apr. 23, 2012.
Order filed Apr. 23, 2012.
Brown Motion 10 Supplement filed Apr. 24, 2012.
Schrage Opposition 10 filed Apr. 30, 2012.
Order Times for Priority Phase and Second Redeclaration filed May 7, 2012.
Brown Motion 11.
Exhibit 2137 from Brown Motion 11—Jan. 10, 2003 Memo to Norm Johnson.
Exhibit 2138 from Brown Motion 11—Jan. 31, 2003 Memo to Norm Johnson.
Exhibit 2139 from Brown Motion 11—Feb. 7, 2003 Memo to Norm Johnson.
Exhibit 2140 from Brown Motion 11—Mar. 7, 2003 Memo to Norm Johnson.
Exhibit 2141 from Brown Motion 11—Mar. 14, 2003 Memo to Norm Johnson.
Exhibit 2142 from Brown Motion 11—Mar. 21, 2003 Memo to Norm Johnson.
Exhibit 2143 from Brown Motion 11—Mar. 28, 2003 Memo to Norm Johnson.
Exhibit 2144 from Brown Motion 11—Apr. 4, 2003 Memo to Norm Johnson.
Exhibit 2145 from Brown Motion 11—Apr. 18, 2003 Memo to Norm Johnson.
Exhibit 2146 from Brown Motion 11—May 2, 2003 Memo to Norm Johnson.
Exhibit 2147 from Brown Motion 11—Marked up Ex 2089 showing numbers for counts 2-3 language, 2003.
Exhibit 2148 from Brown Motion 11—May 12, 2003 Brown 13 page PowerPoint.
Exhibit 2149 from Brown Motion 11—May 23, 2003 Memo to Norm Johnson.
Exhibit 2150 from Brown Motion 11—Channel Flow Concept Ideas TOC, 2008.
Exhibit 2151 from Brown Motion 11—Channel Flow Concept Ideas Tab 36, 2003.
Exhibit 2152 from Brown Motion 11—Jun. 3, 2003 Memo to Norm Johnson.
Exhibit 2153 from Brown Motion 11—Jun. 13, 2003 Memo to Norm Johnson.
Exhibit 2154 from Brown Motion 11—Jun. 20, 2003 Memo to Norm Johnson.
Exhibit 2155 from Brown Motion 11—Jun. 27, 2003 Memo to Norm Johnson.
Exhibit 2156 from Brown Motion 11—Jul. 3, 2003 Memo to Norm Johnson.
Exhibit 2157 from Brown Motion 11—Jul. 18, 2003 Memo to Norm Johnson.
Exhibit 2158 from Brown Motion 11—Aug. 1, 2003 Memo to Norm Johnson.
Exhibit 2159 from Brown Motion 11—Aug. 8, 2003 Memo to Norm Johnson.
Exhibit 2160 from Brown Motion 11—Aug. 15, 2003 Memo to Norm Johnson.
Exhibit 2161 from Brown Motion 11—Aug. 22, 2003 Memo to Norm Johnson.
Exhibit 2162 from Brown Motion 11—Aug. 29, 2003 Memo to Norm Johnson.
Exhibit 2163 from Brown Motion 11—Sep. 5, 2003 Memo to Norm Johnson.
Exhibit 2164 from Brown Motion 11—Sep. 26, 2003 Memo to Norm Johnson.
Exhibit 2165 from Brown Motion 11—Oct. 24, 2003 Memo to Norm Johnson.
Exhibit 2166 from Brown Motion 11—Oct. 31, 2003 Memo to Norm Johnson.
Exhibit 2167 from Brown Motion 11—Nov. 7, 2003 Memo to Norm Johnson.
Exhibit 2168 from Brown Motion 11—Nov. 21, 2003 Memo to Norm Johnson.
Exhibit 2169 from Brown Motion 11—Nov. 26, 2003 Memo to Norm Johnson.
Exhibit 2170 from Brown Motion 11—Dec. 19, 2003 Memo to Norm Johnson.
Exhibit 2171 from Brown Motion 11—Jan. 16, 2004 Memo to Norm Johnson.
Exhibit 2172 from Brown Motion 11—Jan. 23, 2004 Memo to Norm Johnson.
Exhibit 2173 from Brown Motion 11—Jan. 30, 2004 Memo to Norm Johnson.
Exhibit 2174 from Brown Motion 11—Feb. 6, 2004 Memo to Norm Johnson.
Exhibit 2175 from Brown Motion 11—Feb. 20, 2004 Memo to Norm Johnson.
Exhibit 2176 from Brown Motion 11—Feb. 27, 2004 Memo to Norm Johnson.
Exhibit 2177 from Brown Motion 11—Mar. 19, 2004 Memo to Norm Johnson.
Exhibit 2178 from Brown Motion 11—Mar. 26, 2004 Memo to Norm Johnson.
Exhibit 2179 from Brown Motion 11—Apr. 2, 2004 Memo to Norm Johnson.
Exhibit 2180 from Brown Motion 11—Apr. 9, 2004 Memo to Norm Johnson.
Exhibit 2181 from Brown Motion 11—Apr. 16, 2004 Memo to Norm Johnson.
Exhibit 2182 from Brown Motion 11—Feb. 13, 2004 Memo to Norm Johnson.
Exhibit 2183 from Brown Motion 11—Mar. 5, 2004 Memo to Norm Johnson.
Exhibit 2184 from Brown Motion 11—Apr. 23, 2004 Memo to Norm Johnson.
Exhibit 2185 from Brown Motion 11—May 7, 2004 Memo to Norm Johnson.
Exhibit 2186 from Brown Motion 11—May 14, 2004 Memo to Norm Johnson.
Exhibit 2187 from Brown Motion 11—May 21, 2004 Memo to Norm Johnson.
Exhibit 2188 from Brown Motion 11—Emails between counsel regarding service discrepancy, Ex. 1101, 2012.
Exhibit 2189 from Brown Motion 11—Jun. 4, 2004 Memo to Norm Johnson.
Exhibit 2190 from Brown Motion 11—Jun. 25, 2004 Memo to Norm Johnson.
Exhibit 2191 from Brown Motion 11—Jul. 2, 2004 Memo to Norm Johnson.
Exhibit 2192 from Brown Motion 11—Jul. 9, 2004 Memo to Norm Johnson.
Exhibit 2193 from Brown Motion 11—Jul. 16, 2004 Memo to Norm Johnson.
Exhibit 2194 from Brown Motion 11—Jul. 23, 2004 Memo to Norm Johnson.
Exhibit 2195 from Brown Motion 11—Jul. 30, 2004 Memo to Norm Johnson.
Exhibit 2196 from Brown Motion 11—Aug. 6, 2004 Memo to Norm Johnson.
Exhibit 2197 from Brown Motion 11—Aug. 13, 2004 Memo to Norm Johnson.
Exhibit 2198 from Brown Motion 11—Aug. 20, 2004 Memo to Norm Johnson.
Exhibit 2199 from Brown Motion 11—Aug. 27, 2004 Memo to Norm Johnson.
Exhibit 2200 from Brown Motion 11—Sep. 3, 2004 Memo to Norm Johnson.
Exhibit 2201 from Brown Motion 11—Sep. 10, 2004 Memo to Norm Johnson.
Exhibit 2202 from Brown Motion 11—Sep. 17, 2004 Memo to Norm Johnson.

(56) References Cited

OTHER PUBLICATIONS

Exhibit 2203 from Brown Motion 11—Sep. 24, 2004 Memo to Norm Johnson.
Exhibit 2204 from Brown Motion 11—Oct. 1, 2004 Memo to Norm Johnson.
Exhibit 2205 from Brown Motion 11—Oct. 8, 2004 Memo to Norm Johnson.
Exhibit 2206 from Brown Motion 11—Oct. 22, 2004 Memo to Norm Johnson.
Exhibit 2207 from Brown Motion 11—Oct. 29, 2004 Memo to Norm Johnson.
Exhibit 2208 from Brown Motion 11—Nov. 5, 2004 Memo to Norm Johnson.
Exhibit 2209 from Brown Motion 11—Nov. 12, 2004 Memo to Norm Johnson.
Exhibit 2210 from Brown Motion 11—Jul. 17, 2003 Memo from Ken Stirn to Distribution.
Exhibit 2211 from Brown Motion 11—Jul. 21, 2003 Memo—PWC Weekly Update.
Exhibit 2212 from Brown Motion 11—Jul. 29, 2003 Memo—PWC Weekly Update.
Exhibit 2213 from Brown Motion 11—Aug. 4, 2003 Memo—PWC Weekly Update.
Exhibit 2214 from Brown Motion 11—Aug. 11, 2003 Memo—PWC Weekly Update.
Exhibit 2215 from Brown Motion 11—Aug. 15, 2003 Memo—PWC Weekly Update.
Exhibit 2216 from Brown Motion 11—Aug. 25, 2003 Memo—PWC Weekly Update.
Exhibit 2217 from Brown Motion 11—Sep. 22, 2003 Memo—PWC Weekly Update.
Exhibit 2218 from Brown Motion 11—Sep. 29, 2003 Memo—PWC Weekly Update.
Exhibit 2219 from Brown Motion 11—Oct. 3, 2003 Memo—PWC Weekly Update.
Exhibit 2220 from Brown Motion 11—Oct. 10, 2003 Memo—PWC Weekly Update.
Exhibit 2221 from Brown Motion 11—Oct. 20, 2003 Memo—PWC Weekly Update.
Exhibit 2222 from Brown Motion 11—Oct. 27, 2003 Memo—PWC Weekly Update.
Exhibit 2223 from Brown Motion 11—Nov. 3, 2003 Memo—PWC Weekly Update.
Exhibit 2224 from Brown Motion 11—Nov. 10, 2003 Memo—PWC Weekly Update.
Exhibit 2225 from Brown Motion 11—Nov. 17, 2003 Memo—PWC Weekly Update.
Exhibit 2226 from Brown Motion 11—Dec. 5, 2003 Memo—PWC Weekly Update.
Exhibit 2227 from Brown Motion 11—Dec. 15, 2003 Memo—PWC Weekly Update.
Exhibit 2228 from Brown Motion 11—Dec. 22, 2003 Memo—PWC Weekly Update.
Exhibit 2229 from Brown Motion 11—Jan. 12, 2004 Memo—CWC Weekly Update.
Exhibit 2230 from Brown Motion 11—Jan. 19, 2004 Memo—CWC Weekly Update.
Exhibit 2231 from Brown Motion 11—Feb. 2, 2004 Memo—CWC Weekly Update.
Exhibit 2232 from Brown Motion 11—Feb. 9, 2004 Memo—CWC Weekly Update.
Exhibit 2233 from Brown Motion 11—Feb. 16, 2004 Memo—CWC Weekly Update.
Exhibit 2234 from Brown Motion 11—Feb. 23, 2004 Memo—CWC Weekly Update.
Exhibit 2235 from Brown Motion 11—Mar. 1, 2004 Memo—CWC Weekly Update.
Exhibit 2236 from Brown Motion 11—Mar. 8, 2004 Memo—CWC Weekly Update.
Exhibit 2237 from Brown Motion 11—Mar. 15, 2004 Memo—CWC Weekly Update.
Exhibit 2238 from Brown Motion 11—Mar. 22, 2004 Memo—CWC Weekly Update.
Exhibit 2239 from Brown Motion 11—Mar. 29, 2004 Memo—CWC Weekly Update.
Exhibit 2240 from Brown Motion 11—Apr. 5, 2004 Memo—CWC Weekly Update.
Exhibit 2241 from Brown Motion 11—Apr. 12, 2004 Memo—CWC Weekly Update.
Exhibit 2242 from Brown Motion 11—Apr. 19, 2004 Memo—CWC Weekly Update.
Exhibit 2243 from Brown Motion 11—Apr. 23, 2004 Memo—CWC Weekly Update.
Exhibit 2244 from Brown Motion 11—May 7, 2004 Memo—CWC Weekly Update.
Exhibit 2245 from Brown Motion 11—Michaela Lewis PC Screen Shots of 2003 and 2004 Weekly Folders.
Exhibit 2246 from Brown Motion 11—Michaela Lewis PC Screen Shots of 2003 PWC and 2004 CWC Folders.
Exhibit 2247 from Brown Motion 11—Michaela Lewis Channel Flow folder file named "Channel Flow Design Review 070704.ppt"; Windows date modified Jul. 15, 2004.
Exhibit 2248 from Brown Motion 11—2003-2004, Channel Flow Concept Ideas Book.
Exhibit 2249 from Brown Motion 11—Gene Brown CD Screen Shot, 2003.
Exhibit 2250 from Brown Motion 11—VacationRecords_Gene_Steve_Stan_A1, 2003.
Exhibit 2251 from Brown Motion 11—Gasket Designs—030512.ppt, from GeneBrown_CD (Option 9 conception).
Exhibit 2252 from Brown Motion 11—Oslakovic 030804.ppt, from GeneBrown_CD.
Exhibit 2253 from Brown Motion 11—Design Requirements 40302.ppt, from GeneBrown_CD.
Exhibit 2254 from Brown Motion 11—End Cap-Possibilities 040224.ppt, from GeneBrown_CD (Concept M at 12).
Exhibit 2255 from Brown Motion 11—End Cap-Possibilities 040225.ppt, from GeneBrown_CD (Concept P at 15).
Exhibit 2256 from Brown Motion 11—End Cap-Possibilities 040303.ppt, from GeneBrown_CD (Concepts S and T at 19 and 20).
Exhibit 2257 from Brown Motion 11—End Cap-Possibilities 040304.ppt, from GeneBrown_CD (Concept U at 21).
Exhibit 2258 from Brown Motion 11—Honeycomb-CNH-030428.ppt slide 18 Option 9_AlLiibbe_File (Slide 18 is option 9).
Exhibit 2259 from Brown Motion 11—ScreenShot_AlLiibbe_FolderView_ (Honeycomb-CNH-030428.ppt file, Modified May 1, 2003).
Exhibit 2260 from Brown Motion 11—Declaration of Tom Hamilton, 2012.
Exhibit 2261 from Brown Motion 11—May 30, 2003 Memo from Ken Stirn to Distribution.
Exhibit 2262 from Brown Motion 11—Italy—ClarCor UK TRAVEL REQUET.doc, Al Libbe Travel Request Form Modified May 28, 2003.
Exhibit 2263 from Brown Motion 11—ScreenShot_AllLiibbe_FolderView, Italy—ClarCor UK TRAVEL REQUEST.doc, Modified May 28, 2003.
Exhibit 2264 from Brown Motion 11—Declaration of Michelle Pearson, 2012.
Exhibit 2265 from Brown Motion 11—BayOne Sep. 11, 2003 meeting.doc, Al Liibbee memo, diligence.
Exhibit 2266 from Brown Motion 11—DanArensTestData_ChannelFlowProjects_2003-2004.pdf.
Exhibit 2267 from Brown Motion 11—Declaration of Dan Arens, 2012.
Exhibit 2268 from Brown Motion 11—Declaration of Michaela Lewis, 2012.
Exhibit 2269 from Brown Motion 11—Channel Flow Material Specs approved Oct. 19, 2004 by Josh Quackenbush.
Exhibit 2270 from Brown Motion 11—Channel Flow Material Specs approved Oct. 19, 2004 by Kyle Swanson.

(56) References Cited

OTHER PUBLICATIONS

Exhibit 2271 from Brown Motion 11—R&DDesignQuote_to_JQ_ Dec. 4, 2003.
Exhibit 2272 from Brown Motion 11—DistefanoUPSConsignment_to-JQ_Dec. 22, 2003.
Exhibit 2273 from Brown Motion 11—DistefanoQuote_to_JQ_ Dec. 29, 2003.
Exhibit 2274 from Brown Motion 11—BaldwinFiltersPOs_from_ JQ Dec. 16, 2003.
Exhibit 2275 from Brown Motion 11—MidlandMoldingOrder_From_JQ May 11, 2004.
Exhibit 2276 from Brown Motion 11—DistefanoOrder_From_JQ May 12, 2004.
Exhibit 2277 from Brown Motion 11—DMBOrder_From_JQ Jan. 22, 2004.
Exhibit 2278 from Brown Motion 11—UrethaneMoldDrawingAndQuoteFromDistefano_JQ.
Exhibit 2279 from Brown Motion 11—ForecastOrderFrameOutletB_from_JQ Jul. 6, 2004.
Exhibit 2280 from Brown Motion 11—ForecastOrderOutletB_from_JQ Jun. 30, 2004.
Exhibit 2281 from Brown Motion 11—PurchaseRequisitionMoldsFromForecast_JQ May 24, 2004.
Exhibit 2282 from Brown Motion 11—MidlandMoldingQuoteVarious_to_JQ Jul. 6, 2004.
Exhibit 2283 from Brown Motion 11—DistefanoMoldOrder_from_JQ Jul. 6, 2004.
Exhibit 2284 from Brown Motion 11—DistefanoMoldOrder_from_JQ Aug. 19, 2004.
Exhibit 2285 from Brown Motion 11—DMBFastenersOrder_from_JQ Aug. 5, 2004.
Exhibit 2286 from Brown Motion 11—EnduraEmailExchangeReAnodizing_JQ Aug. 19, 2004.
Exhibit 2287 from Brown Motion 11—PurchaseRequisitionMoldCoatingFromEndura_JQ Aug. 16, 2004.
Exhibit 2288 from Brown Motion 11—MidlandOrderCA4700MoldParts_from_JQ Sep. 2, 2004.
Exhibit 2289 from Brown Motion 11—GT MidwesterurethaneQuote_to_SM Sep. 20, 2004.
Exhibit 2290 from Brown Motion 11—RedfieldOrderLabelToolingChannelFlow_from_JQ Oct. 21, 2004.
Exhibit 2291 from Brown Motion 11—McMasterOrder_CaulkingGun_from_JQ Sep. 27, 2004.
Exhibit 2292 from Brown Motion 11—MidlandQuote_SurfaceTexture_to_JQ Oct. 14, 2004.
Exhibit 2293 from Brown Motion 11—MidlandOrder_SurfaceTexture_from_JQ Oct. 19, 2004.
Exhibit 2294 from Brown Motion 11—EngineeringDrawing_OutletEndCap_CantedIn_BX02657_JQ Apr. 29, 2004.
Exhibit 2295 from Brown Motion 11—EngineeringDrawing_FrameRings_BX02524_JQ Mar. 15, 2004.
Exhibit 2296 from Brown Motion 11—EngineeringDrawing_Core_BX02622_JQ Mar. 29, 2004.
Exhibit 2297 from Brown Motion 11—CapitalProjectRequest_SM Apr. 7, 2004.
Exhibit 2298 from Brown Motion 11—AlstromMediaOrder_from_KS Jan. 22, 2004.
Exhibit 2299 from Brown Motion 11—EngineeringDrawing_CA4700FrameInlet_CA4700_JQ Aug. 16, 2004.
Exhibit 2300 from Brown Motion 11—EngineeringDrawing_CA4700BaldwinFilters_CA4700_JQ Jul. 22, 2004.
Exhibit 2301 from Brown Motion 11—EngineeringDrawing_CA4700FrameAssyOutlet_751490_JQ Jul. 22, 2004.
Exhibit 2302 from Brown Motion 11—EngineeringDrawing_Wout_SingleFace_149051_JQ Jul. 2004.
Exhibit 2303 from Brown Motion 11—EngineeringDrawing_CA4700FrameOutlet_751508_JQ Aug. 16, 2004.
Exhibit 2304 from Brown Motion 11—Aug. 25, 2003; sic, Aug. 29, 2003 Memo, PWC Weekly Update.
Exhibit 2305 from Brown Motion 11—EngineeringDrawing_CA4700Mold_751511_JQ Aug. 16, 2004.
Exhibit 2306 from Brown Motion 11—EngineeringDrawing_CA4700Core_147677_JQ Aug. 16, 2004.
Exhibit 2307 from Brown Motion 11—EngineeringDrawing_CA4700Rhms_147690_JQ Dec. 12, 2003.
Exhibit 2308 from Brown Motion 11—EngineeringDrawing_CA4700FrameAsyInlet_528654_JQ Jun. 2, 2004.
Exhibit 2309 from Brown Motion 11—EngineeringDrawing_CA4700_FrameInlet_147652_JQ Aug. 16, 2004.
Exhibit 2310 from Brown Motion 11—Declaration of Darla Wright-Covert, 2012.
Exhibit 2311 from Brown Motion 11—Oct. 15, 2004 ; Weekly Items—Engineering—Oct. 15, 2004.
Exhibit 2312 from Brown Motion 11—Declaration of Kyle Swanson, 2012.
Exhibit 2313 from Brown Motion 11—080112 Matrix Explanation.pdf.
Exhibit 2314 from Brown Motion 11—080112 NPR 003815.pdf.
Exhibit 2315 from Brown Motion 11—Declaration of Dan Schulte, 2012.
Exhibit 2316 from Brown Motion 11—Aug. 4, 2004, "Channel Flow Round Freightliner Radial Seal Trial Run" report.
Exhibit 2317 from Brown Motion 11—Baldwin Filters Catalog Supplement (2006) showing CA4700.
Exhibit 2318 from Brown Motion 11—Jun. 28, 2004, "Freightliner Channel Flow Design-WW.ppt".
Exhibit 2319 from Brown Motion 11—Declaration of Gene Brown, 2012.
Exhibit 2320 from Brown Motion 11—Patent application correspondence file, 2004.
Exhibit 2321 from Brown Motion 11—Reinhart CD Image "Channel Flow Concept Ideas" provided by GB, 2004.
Exhibit 2322 from Brown Motion 11—Declaration of Andrew Heinisch, 2012.
Exhibit 2323 from Brown Motion 11—File "JDFEAJoeBorgia070804.ppt".
Exhibit 2324 from Brown Motion 11—File "JDFEAJoeBorgia070804.ppt" Jul. 8, 2004 Date Modified Property.
Exhibit 2325 from Brown Motion 11—File "UpdateforMeeting091604.doc".
Exhibit 2326 from Brown Motion 11—File "UpdateforMeeting091604.doc" Sep. 24, 2004 Date Modified Property.
Exhibit 2327 from Brown Motion 11—Declaration of Chuck Oslakovic, 2012.
Exhibit 2328 from Brown Motion 11—Declaration of Al Liibe, 2012.
Exhibit 2329 from Brown Motion 11—Declaration of Steve Merritt, 2012.
Exhibit 2330 from Brown Motion 11—Date Modified "Channel Flow Design Review 070704.ppt" (Ex. 2247).
Exhibit 2331 from Brown Motion 11—Concept P Ex 2255, p. 15, marked, 2012.
Exhibit 2332 from Brown Motion 11—Concept S Ex 2256, p. 19, marked, 2012.
Exhibit 2333 from Brown Motion 11—Concept T Ex2256, p. 20, marked, 2012.
Exhibit 2334 from Brown Motion 11—Concept U Ex 2257, p. 21, marked, 2012.
Exhibit 2335 from Brown Motion 11—Concept M Ex 2254, p. 12, marked, 2004.
Exhibit 2336 from Brown Motion 11—LeydigBillingRecord, concepts P and U, 2012.

* cited by examiner

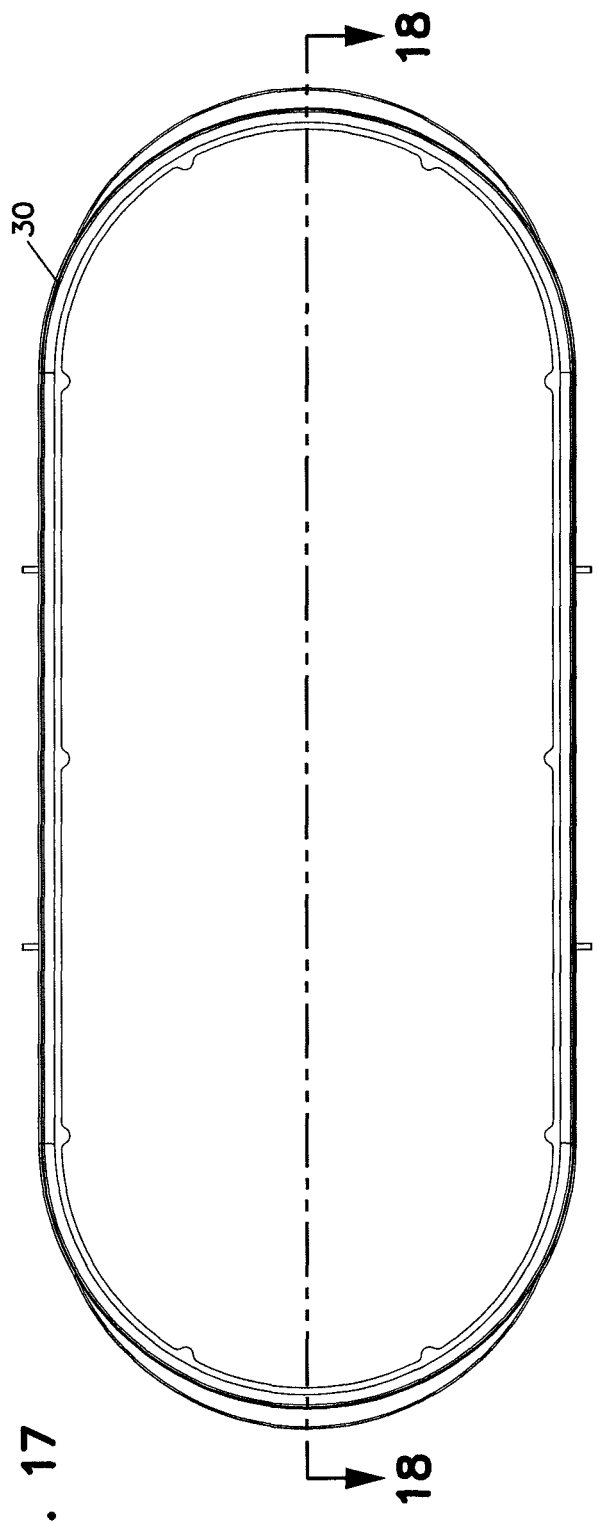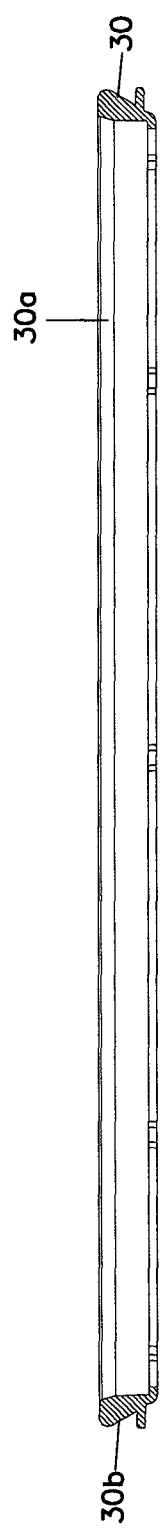
FIG. 17
FIG. 18

FIG. 28
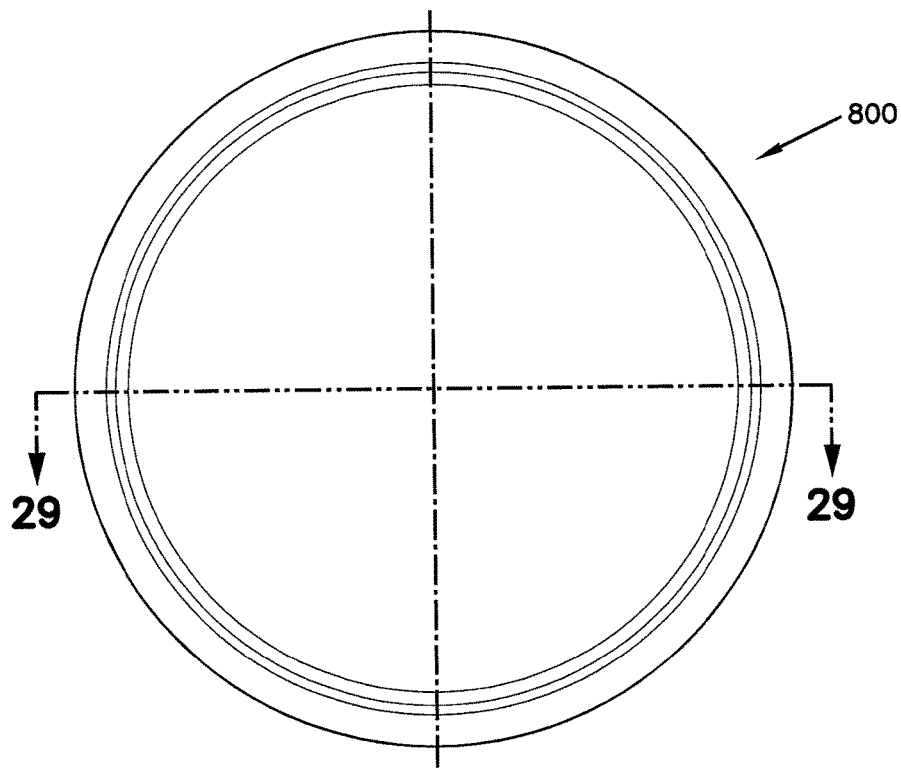
FIG. 29
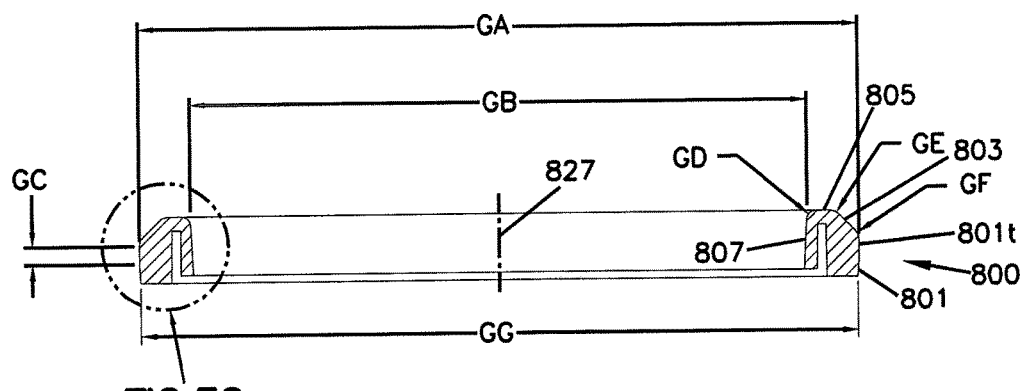
FIG. 30

SEAL ARRANGEMENT FOR FILTER ELEMENT; FILTER ELEMENT ASSEMBLY; AND, METHODS

CROSS-REFERENCE TO RELATED APPLICATIONS

This application is a continuation of U.S. application Ser. No. 14/611,604 filed on Feb. 2, 2015. U.S. application Ser. No. 14/611,604 is a continuation of U.S. application Ser. No. 13/854,316, filed on Apr. 1, 2013, and granted as U.S. Pat. No. 8,945,268 on Feb. 3, 2015. U.S. application Ser. No. 13/854,316 is a continuation of U.S. application Ser. No. 12/084,730, deposited on May 7, 2008 (371(c) date of Mar. 30, 2009), and granted as U.S. Pat. No. 8,409,316 on Apr. 2, 2013. U.S. application Ser. No. 12/084,730 is a U.S. National Stage of PCT international patent application No. PCT/U.S.2006/043836, filed Nov. 8, 2006, which claims the benefit of U.S. Provisional Patent Application Ser. No. 60/735,650, filed Nov. 9, 2005. To the extent appropriate, a claim of priority is made to each of the above disclosed applications. The above disclosed applications are incorporated herein by reference.

The present application includes disclosure discussed in U.S. Publication US 2005/0166561 A1, published Aug. 4, 2005, PCT Publication WO 05/63361, published Jul. 14, 2005, U.S. Pat. No. 6,190,432 and European Patent EP 1 159 052, each of which is incorporated herein by reference.

FIELD OF THE INVENTION

The present invention relates to air cleaners with removable and replaceable, i.e., serviceable, filter element components. Although other applications are possible, the invention described is particularly useful in air cleaners for use in filtering intake air for engines (used for example in: vehicles, construction, agricultural and mining equipment; and, generator systems). The invention specifically concerns seal arrangements provided on serviceable filter elements, for such air cleaners. The invention also concerns methods of assembly and use.

BACKGROUND

Air streams carry contaminant material therein. In many instances, it is desired to filter some or all of the contaminant material from the air stream. For example, air flow streams to engines for motorized vehicles or for power generation equipment, construction equipment or other equipment, gas streams to gas turbine systems and air streams to various combustion furnaces, carry particulate contaminant therein. It is preferred for such systems that the selected contaminant material be removed from (or have its level reduced in) the air or gas. A variety of air filter arrangements have been developed for contaminant reduction. In general, however, continued improvements are sought.

The techniques described herein are for variations in the seal arrangements of the types described in U.S. Publication U.S. 2005/0166561 A1, published Aug. 4, 2005, PCT Publication WO 05/63361, published Jul. 14, 2005, U.S. Pat. No. 6,190,432 and European Patent EP 1 159 052, each of which is incorporated herein by reference.

SUMMARY

According to the present disclosure a filter element is provided, for use in air filtering. Typically, the filter element comprises a media pack including opposite inlet and outlet ends (or faces). The media pack typically defines: a set of inlet flutes open at the inlet end of the media pack to passage of air to be filtered therein, the inlet flutes typically being closed at a location within a distance of 10% of the total length of the inlet flutes from the outlet end of the media pack; and, a set of outlet flutes closed to passage of air to be filtered therein at a distance within 10% of the total length of the inlet flutes from the inlet end of the media pack and open the passage of filtered air therefrom at the outlet end of the media pack. The media pack is typically closed passage of air therethrough, in between the inlet and outlet ends, without filtering flow through the media pack. The element further includes: a preform positioned adjacent a first one of the inlet and outlet ends of the media pack; and, a seal arrangement mounted on the preform.

In certain preferred applications, the media pack is a coiled z-filter media arrangement; and, the seal arrangement comprises foamed polyurethane. The media pack can have a variety of shapes and configurations. Two examples depicted are: an oval perimeter shape (periphery), for example having a racetrack perimeter or cross-sectional shape; and, a cylindrical shape having a circular perimeter (periphery) or cross-sectional shape. A variety of alternate shapes, are possible.

The techniques described herein were developed to provide improvements in such arrangements as those described in U.S. Publication U.S. 2005/0166561 A1, published Aug. 4, 2005 and PCT Publication WO 05/63361, published Jul. 14, 2005, U.S. Pat. No. 6,190,432 and European Patent EP 1 159 052, incorporated herein by reference. The improvements described herein can be applied in other applications, as well.

BRIEF DESCRIPTION OF THE DRAWINGS

I. Selected Figures from U.S. 2005/0166561 and PCT WO 05/63361, FIGS. 1-25

FIG. 17 is an optional end piece useable in the component of FIG. 1.

FIG. 18 is a cross-sectional view of the optional piece of FIG. 1.

II. Selected Figures from U.S. Pat. No. 6,190,432 and EP 1 159 052, FIGS. 26-27

Figure 26:
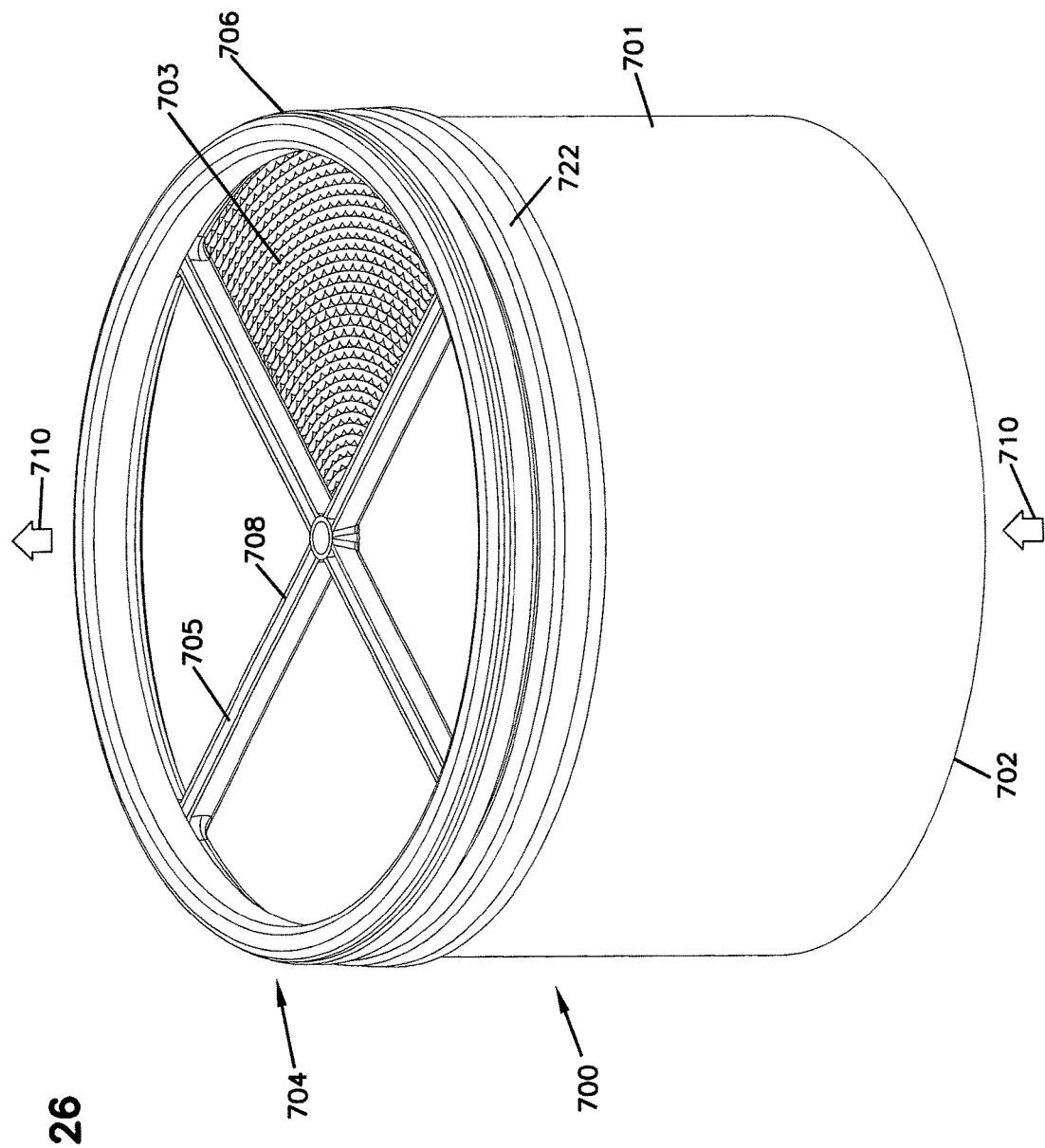

FIG. 26 is a perspective view of a filter cartridge in accord with the description of U.S. Pat. No. 6,190,432 and European Patent EP 1 159 052.

Figure 27:
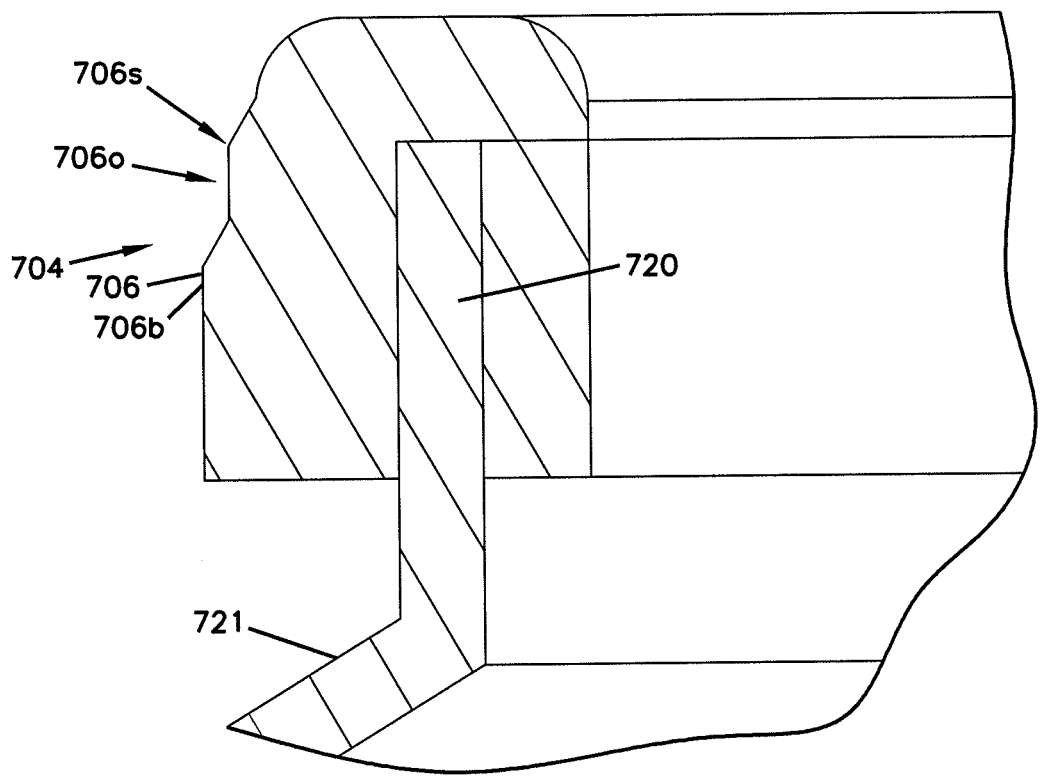

FIG. 27 is an enlarged fragmentary cross-sectional view of a seal portion of the cartridge of FIG. 26.

III. Figures Depicting Selected Improved Arrangements, FIGS. 28-40

A. Example Chamfered or Beveled Seals, FIGS. 28-31

FIG. 28 is a top plan view of a molded seal member portion useable in an arrangement in accord with selected ones to the previously described filter arrangements.

FIG. 29 is a cross-sectional view taken along line 29-29, FIG. 28.

Figure 30:
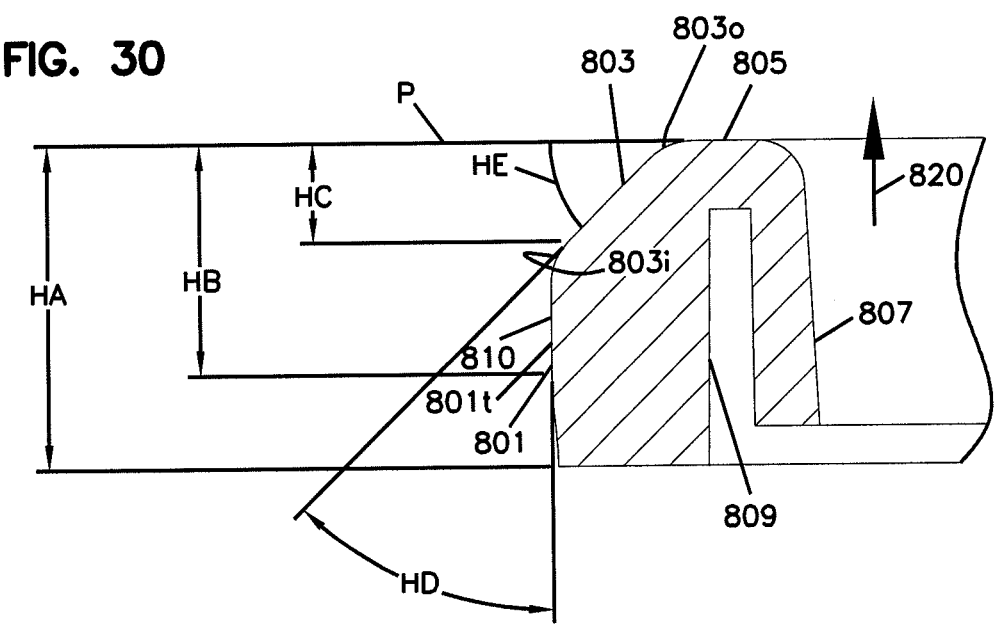

FIG. 30 is an enlarged fragmentary view of a portion of FIG. 29.

Figure 31:
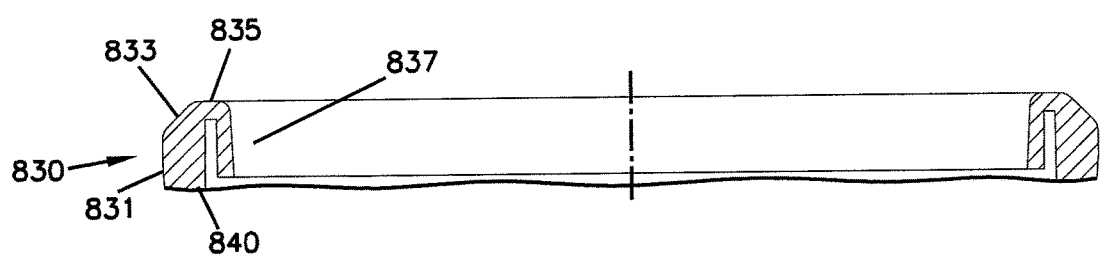

FIG. 31 is a cross-sectional view analogous to FIG. 29, of an alternate variation in the depleted seal member.

B. Modifications Involving a Preform Central Projection to Facilitate Molding of the Seal Member, FIGS. 32-40

Figure 32:
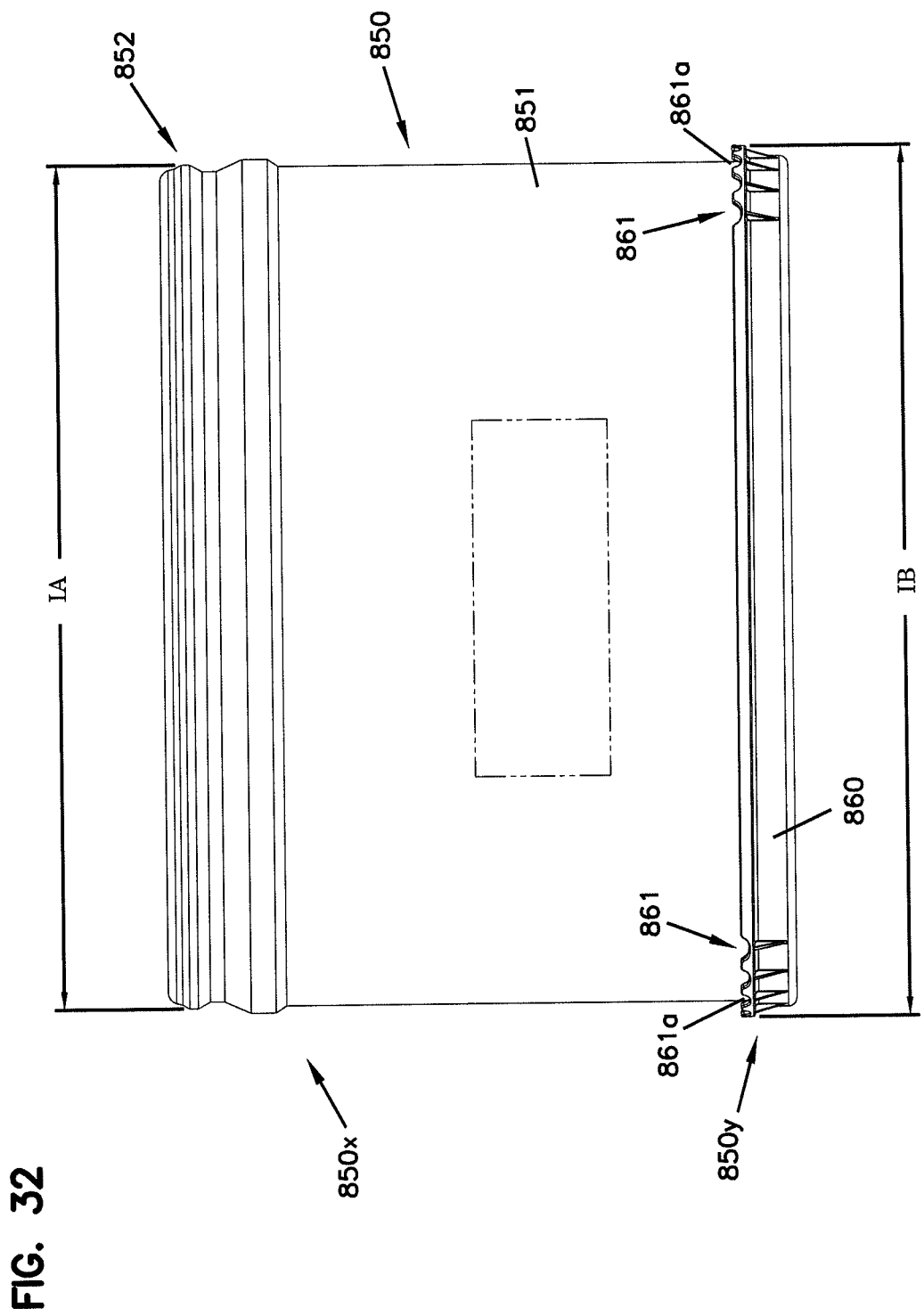

FIG. 32 is a schematic side elevational view of a filter cartridge including a seal with a modified preform in accord with principles described herein and depleting an optional end piece thereon.

Figure 33:
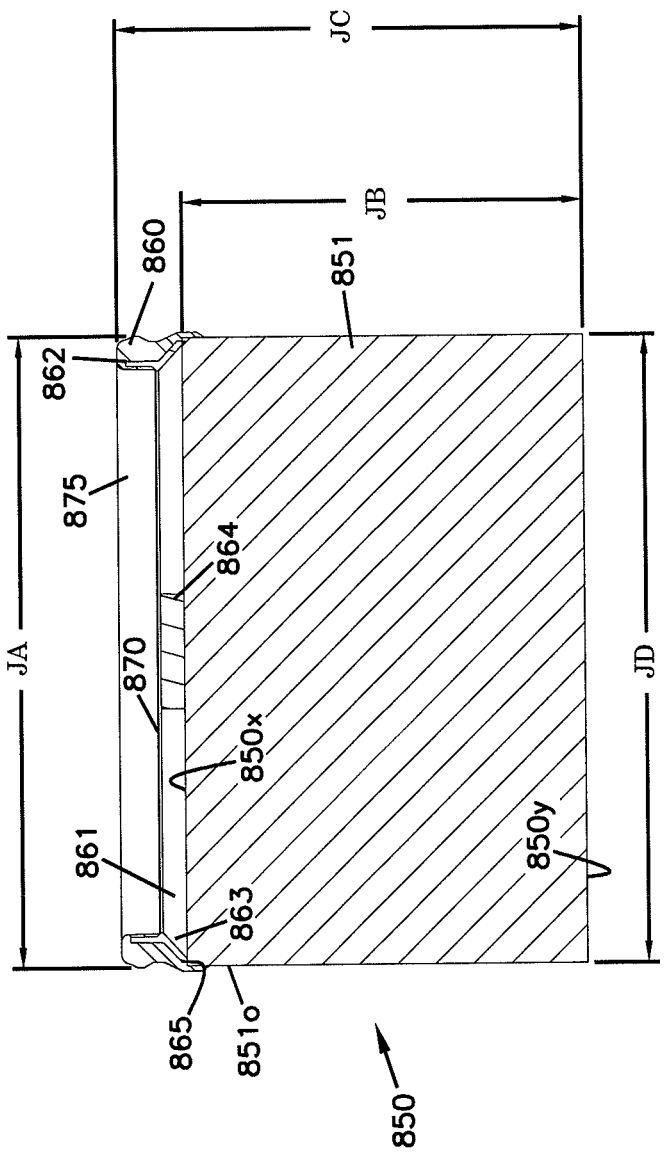

FIG. 33 is a schematic cross-sectional view of media pack and seal portions of the cartridge depicted in FIG. 32; the cross-section of FIG. 33 being taken along a long axis.

Figure 34:
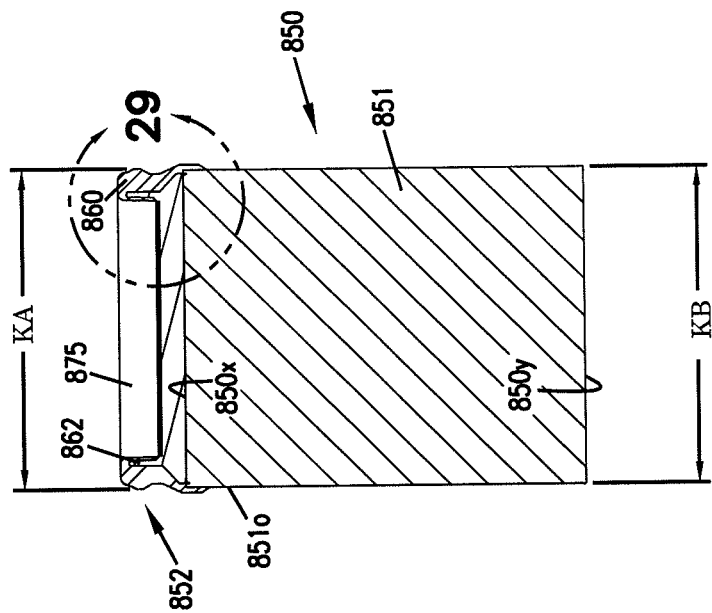

FIG. 34 is a second schematic cross-sectional view of the cartridge depicted in FIG. 32; the cross-section of FIG. 34 being taken along a short axis.

Figure 35:
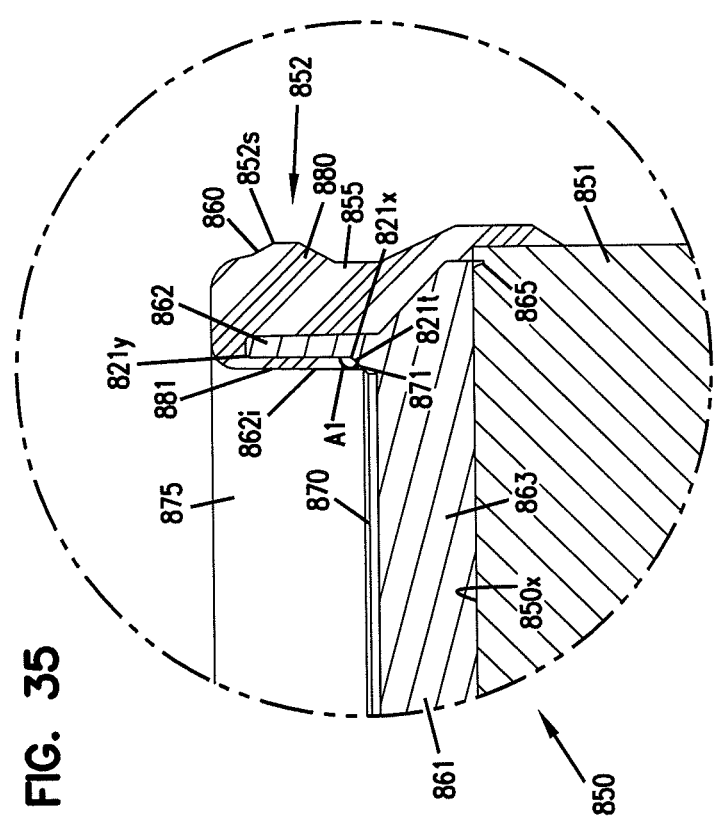

FIG. 35 is an enlarged fragmentary cross-sectional view of a portion of FIG. 34.

Figure 36:
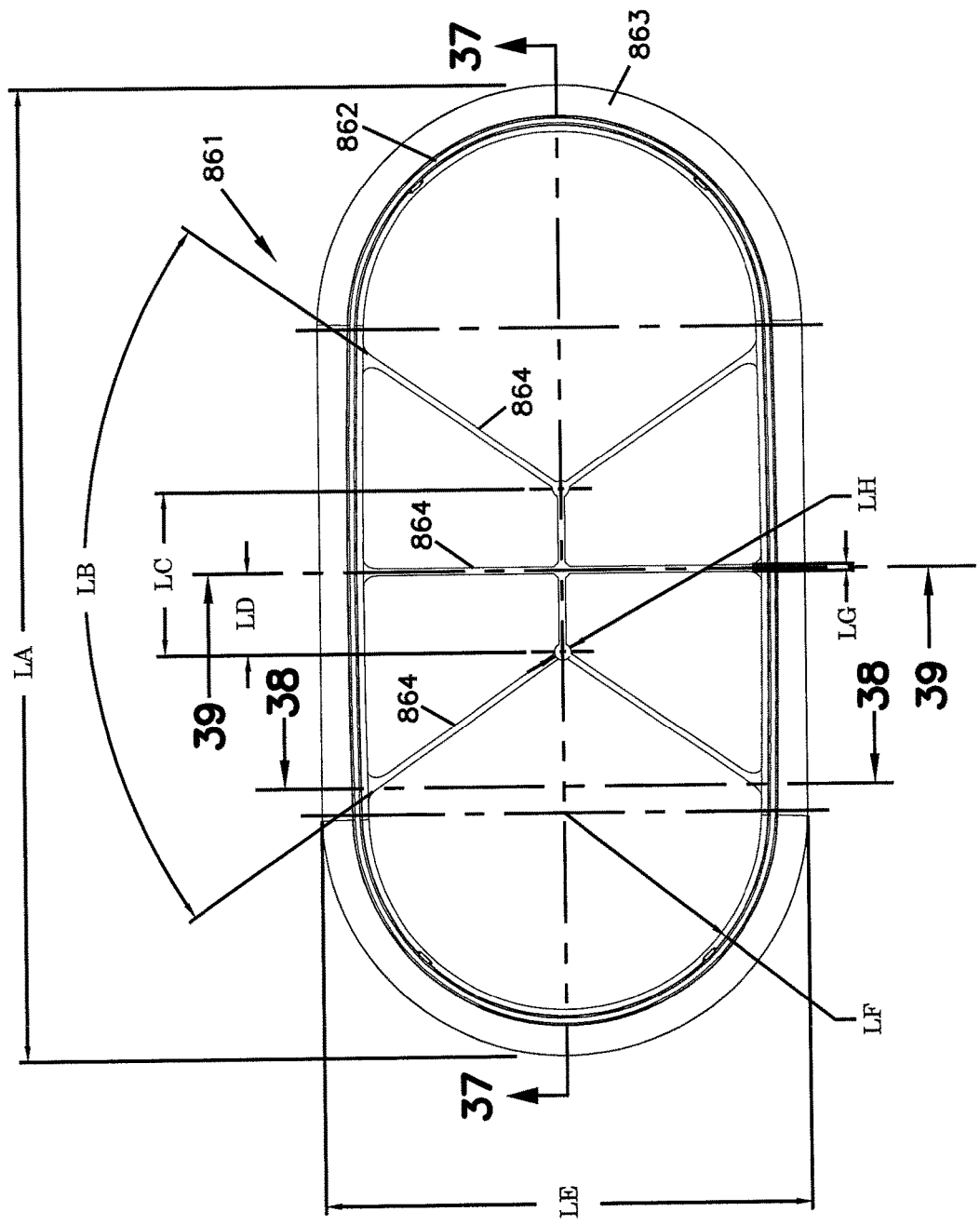

FIG. 36 is a top plan view of a preform component usable in the filter cartridge of FIGS. 32-35.

Figure 37:
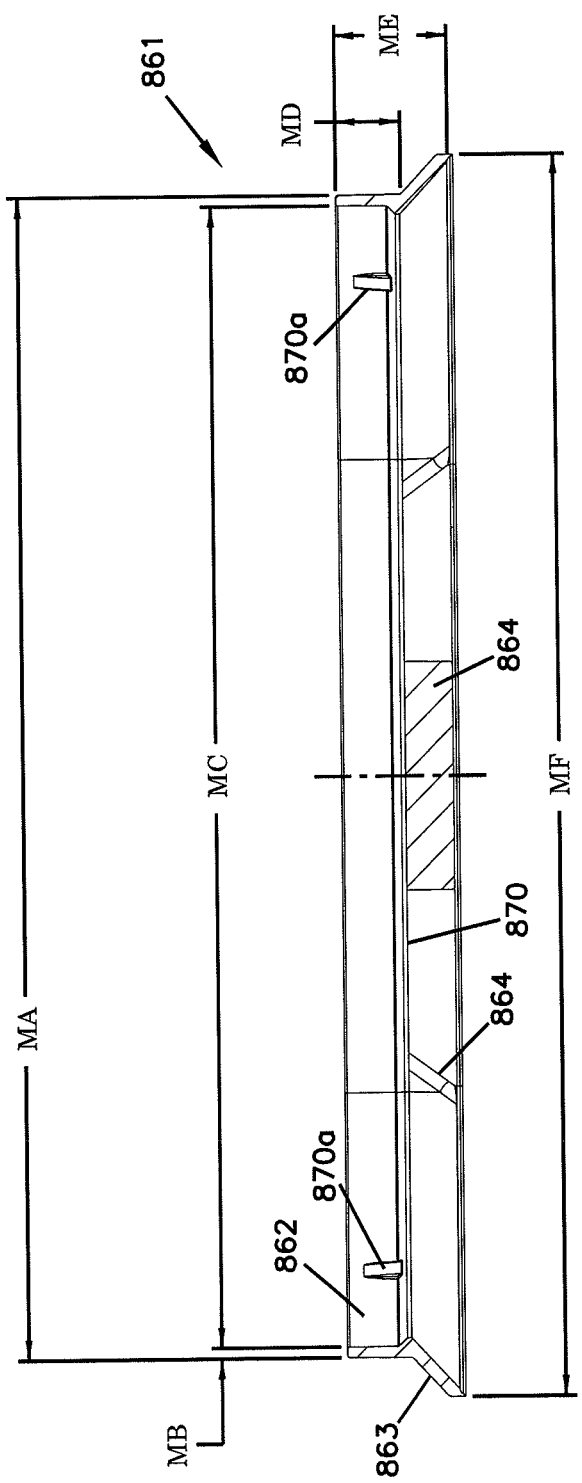

FIG. 37 is a cross-sectional view taken along line 37-37, FIG. 36.

Figure 38:
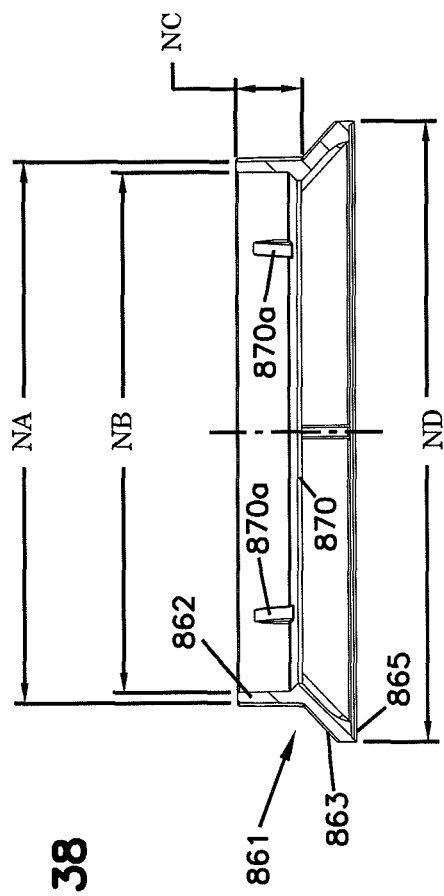
Figure 39:
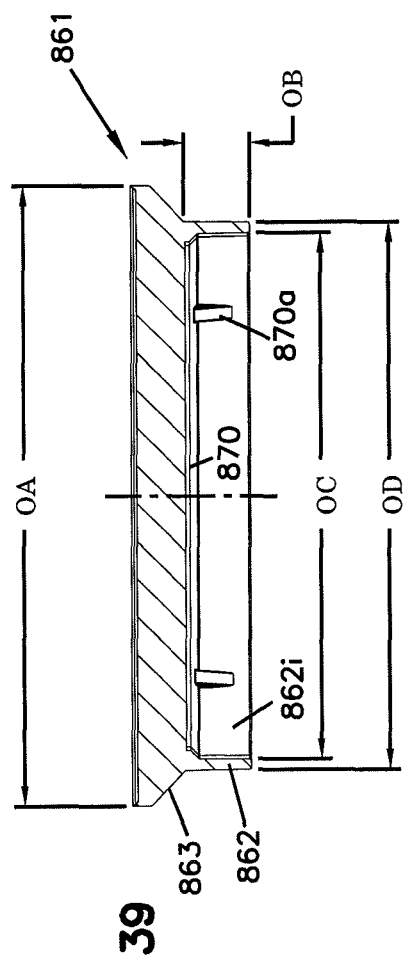

FIG. 38 is a cross-sectional view taken along line 38-38, FIG. 36. FIG. 39 is a cross-sectional view taken along line 39-39, FIG. 36, and depicted inverted as it would when placed in a mold for a molding step forming a seal.

Figure 40:
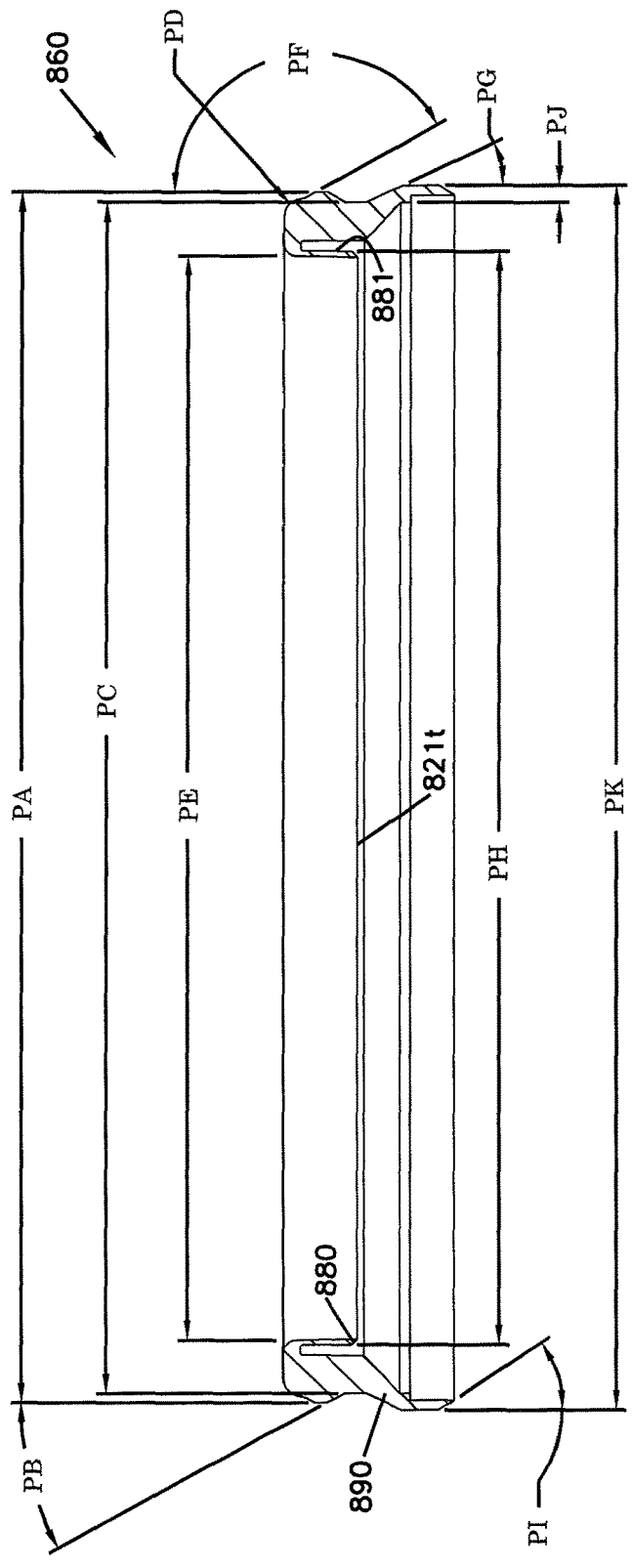

FIG. 40 is a cross-sectional view of an overmolded seal member that would be formed on the preform of FIG. 37 to form the cartridge FIG. 32.

DETAILED DESCRIPTION

I. General Information

The present disclosure relates to filter elements useable in air cleaner assemblies. In general, the preferred filter elements of concern herein are those in which: (a) the media of the elements comprises a first fluted (typically folded or corrugated) sheet of media attached to a second sheet of media (typically a flat media or nearly flat media) to form a single facer; and (b) in which the single facer combination is either wound or stacked, to create a media arrangement comprising a plurality of inlet flutes open at an inlet end or face of the filter media and closed at or near (typically within 10% of the total length of the inlet flutes of) the outlet and/or face of the media; and, a plurality of outlet flow flutes sealed closed at or near the inlet and/or face of the media (i.e., typically within 10% of the total length of the outlet flutes of the inlet and/or face), and open at the outlet end or face of the media. Typically the media pack is also closed to flow therethrough, entering the inlet face and exiting the outlet face, of air which has not been filtered by passage through the media of the media pack.

Such media arrangements are well known and are described for example in U.S. 2005/0160561 A1 published Aug. 4, 2005; PCT WO 05/63361 published Jul. 14, 2005; U.S. Pat. No. 6,190,432 and EP 1 159052; the complete disclosures of these four U.S. patents being incorporated herein by reference. Herein, such media will sometimes be referred to as z-filter media; and, media packs formed from such media as z-filter media packs.

Many variations of such media can be used, with the principles according to the present disclosure. For example, the end seals of the flutes (flute seals) can be provided in a variety of ways, including through utilization of sealant beads; darting, folding or other arrangements for distorting the shape of the flute at the end and/or closing and sealing the flute ends; and through combinations thereof. Not all flutes need to be sealed closed in the same way. The particular approach to flute sealing is generally a matter of choice, not specifically related to the general principles described herein (except as indicated) in connection with provision of seals between the serviceable filter element and a housing or housing component, in use.

Another variable is the specific shape of the flutes. Tapered flutes in accord with PCT Application No. WO 97/40918 and PCT Publication Number WO 03/47722 and other flute shapes can be used, with arrangements according to the principles disclosed. Of course, straight (non-tapered) flutes can, and often will, be used.

Another variable with respect to the media arrangement, is whether the media is configured in a "coiled" arrangement or a "stacked" arrangement. The principles described herein will typically be applied in connection with "coiled" arrangements, for reasons which will be apparent from the following discussions. However, certain of the principles could be applied in connection with arrangements that are stacked.

Herein the term "coiled" and variants thereof, when used to refer to a media pack form from z-filter media, is meant to refer to a media pack formed by coiling a single combination strip of media or single facer, made from a strip of corrugated media secured to flat or nearly flat sheet (the combination being a single facer), in order to form the media pack. Such coiled media can be made in a variety of shapes including: round or cylindrical; oval, for example racetrack; square; or rectangular with rounded corners; and, they can even be configured in conical or similar arrangements. Examples of selected ones of these are described in U.S. Pat. No. 6,350,291 and U.S. provisional application Ser. No. 60/467,521, filed May 2, 2003, the complete disclosures of which are incorporated herein by reference.

Herein the term "stacked arrangements" and variants thereof generally refers to media packs that are not formed from a single combination strip of media that is coiled, but rather to media packs formed from a plurality of strips of media or single facer (corrugated media secured to flat or nearly flat media); the strips being secured to one another in a stack or block form. Stacked arrangements are described for example in U.S. Pat. No. 5,820,646, at FIG. 3, incorporated herein by reference.

In general, z-filter media pack arrangements as described, are used in serviceable filter elements, i.e., filter elements that are removable and replaceable with respect to an air cleaner in which they are used. Generally, such z-filter media packs are provided with sealing arrangements for engagement with portions of air cleaner parts such as a housing, in use. Herein, such seals are referred to as "air cleaner seals" or "housing seals," or by variants thereof. A variety of such air cleaner seals are known. One type, involving an outside or outwardly directed radial seal, is described in U.S. Pat. No. 6,350,291 at Ref #250, FIG. 5.

Other types of seals useable with z-pack media are axial pinch seals, as described for example in U.S. Pat. Nos. 6,348,085; 6,368,374 and U.S. Publication U.S. 2002/0185007 A1, incorporated herein by reference; and, internally directed radial seals, as described for example in U.S. Provisional 60/457,255 filed Mar. 25, 2003 at FIG. 12, the complete disclosure of which is incorporated herein by reference.

II. The Arrangements of U.S. Publication 2005/0166561 A1 (published Aug. 4, 2005 and PCT Publication WO 05/63361 (published Jul. 14, 2005)

The techniques described herein are applicable in conjunction with the principles described in U.S. 2005/0166561 and PCT WO 05/63361, each of which is incorporated by reference. Therefore, before the improvement techniques of the present application improvement are described, general principles of U.S. 2005/0166561 and WO 05/63361 are described.

A. An Example Element, FIGS. 1-6.

Figure 1:
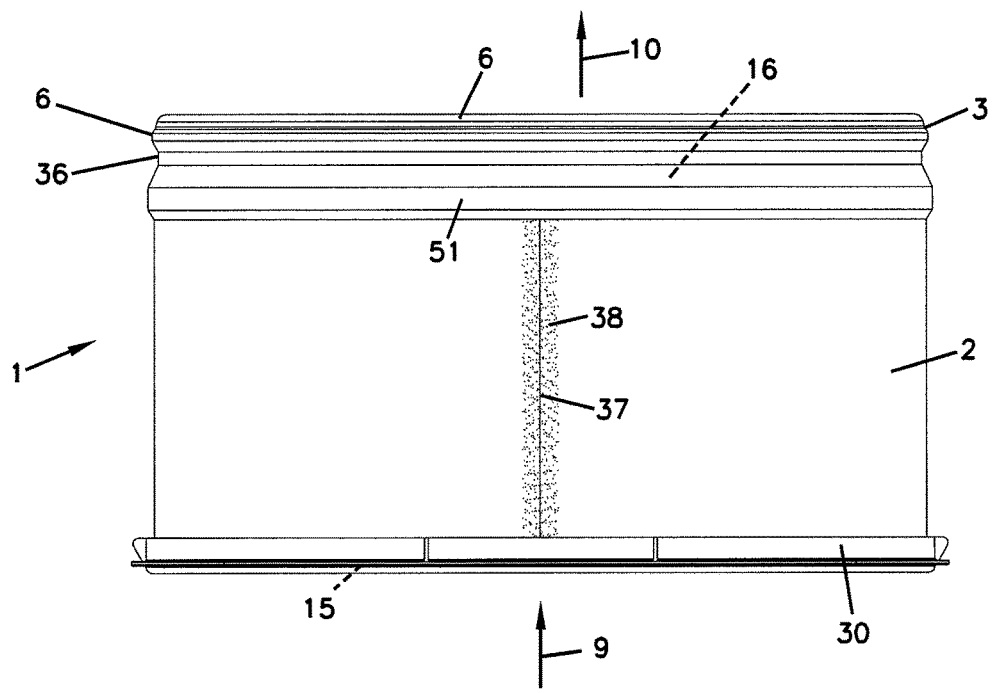
FIG. 1 is a side elevational view of a filter element according to an example from U.S. Publication US 2005/0166561 A1, published Aug. 4, 2005 and PCT Publication WO 05/63361, published Jul. 14, 2005.

The reference numeral 1, FIG. 1, generally depicts a serviceable filter element (air filter cartridge) according to the disclosures of U.S. 2005/0166561 and WO 05/63361. The filter element 1 depicted, comprises a z-filter media pack 2 having an air cleaner seal arrangement (housing seal arrangement) 3 positioned thereon.

Again, herein, the term "air cleaner seal arrangement", "housing seal arrangement" and variants thereof is generally meant to reference a seal arrangement 3 provided on a serviceable filter element or cartridge 1 in such a manner that, when the filter element 1 is installed in an air cleaner for use, the seal arrangement 3 provides for an air seal with appropriate componentry or portions of air cleaner, typically an air cleaner housing. The term "serviceable element" in this context, is meant to refer to a filter element 1 which is removable and replaceable with respect to other portions of an air cleaner.

The particular air cleaner seal arrangement 3 depicted comprises an outside radial seal member. By the term "outside radial seal member" in this context, it is meant that the surface 6 which forms a seal with an air cleaner component, in use, is directed radially outwardly, rather than radially inwardly with respect to the portion of the serviceable filter element 1 on which it is mounted.

In general, during operation, air flow through the z-filter media pack 2 is shown by inlet arrow 9 and exit arrow 10. It is a characteristic of z-filter media packs, that air flow therethrough is generally such that the inlet flow arrow and exit flow arrow are generally parallel to one another. That is, the only turns the air needs to make in passage through the element 1 are minor turns in flow through media pack 2, since the air flow flutes are generally parallel to one another, and parallel to the direction of inlet and outlet flow. It is noted that an opposite direction of air flow to that shown by arrows 9 and 10 is possible, but this particular direction of air flow shown, in use, is advantageous. When constructed and oriented for use in this manner, the media pack 2 has an inlet end or flow face 15 and an opposite exit end or flow face 16.

For the example shown, the inlet flow face 15 and exit flow face 16 are each substantially planar and are substantially parallel with one another. Although alternate arrangements are possible, the principles disclosed herein are particularly well considered for this application.

Figure 2:
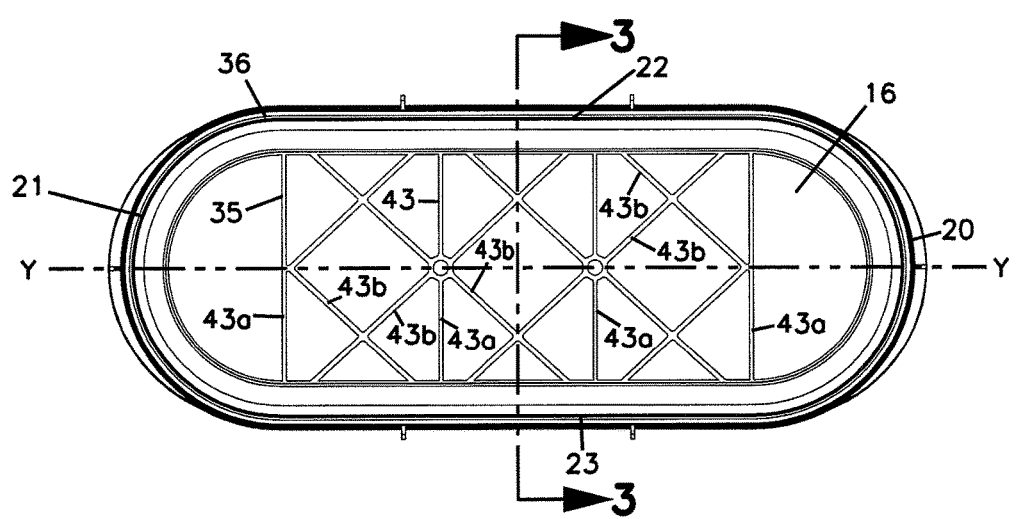
FIG. 2 is a top view of the filter element component of FIG. 1.

FIG. 2 is a top plan view of filter element arrangement 1. Referring to FIG. 2, the z-filter media 2 and seal arrangement 3 are provided with an oval outside perimeter shape, in this instance corresponding to two similar, opposite, curved ends 20, 21 spaced apart by two opposite, generally sides, 22, 23. Herein this specific oval configuration will generally be referred to as a "racetrack" shape with sides 22, 23 being generally straight. Racetrack shaped z-filter media pack elements are described in the prior art, for example, in U.S. Pat. No. 6,350,291 at FIG. 10. It will be seen that many of the principles of the present disclosure can be applied in elements having media packs with alternate peripheral shapes, for example circular, as described herein below. Another variation in the oval shape would one in which the opposite sides are not straight, but are curved somewhat, with less curvature than the ends. Another shape which is possible, is a shape which has two pairs of opposite, generally straight, sides which may or may not have a slight curvature to them, with four substantially curved corners. An example of this type of element is described in U.S. provisional application 60/457,255, in FIG. 22, the complete disclosure of which is incorporated herein by reference.

The various shapes identified in the previous paragraph, indicate that the principles discussed herein can be applied to a wide variety of coiled shapes, not just the ones shown in the figures.

Referring to FIG. 1, the filter element 1 includes an optional end piece or skid skirt 30 thereon, at an opposite end of the media 2 from the seal arrangement 3. The optional end piece or skid skirt 30 can be used to provide engagement between element 1, and structure in a housing, during use, to facilitate installation. Examples of such end pieces are shown and described, in PCT Publication number WO 03/095068, published Nov. 20, 2003, at FIGS. 4 and 8, the complete disclosure of PCT publication WO 03/095068 being incorporated herein by reference. The optional end piece 30 is discussed further below, in association with description of FIGS. 17 and 18.

Referring to FIG. 2, seal arrangement 3 comprises: a rigid preform part or insert 35; and, a molded seal component 36. By the term "preform part" and variants thereof, as used in this context herein, it is meant that part 35 is formed prior to formation of the molded seal component 36 to form the seal arrangement 3. Indeed, in a typical manufacturing process for filter element 1, as described below: media pack 2 would be preformed; part 35 would be preformed; and, the two parts (2, 35) would be placed together in a mold, for formation of the molded seal component 36. Herein, the particular molded seal component 36 depicted is sometimes referred to as an "overmold," or by variants thereof.

Figure 3:
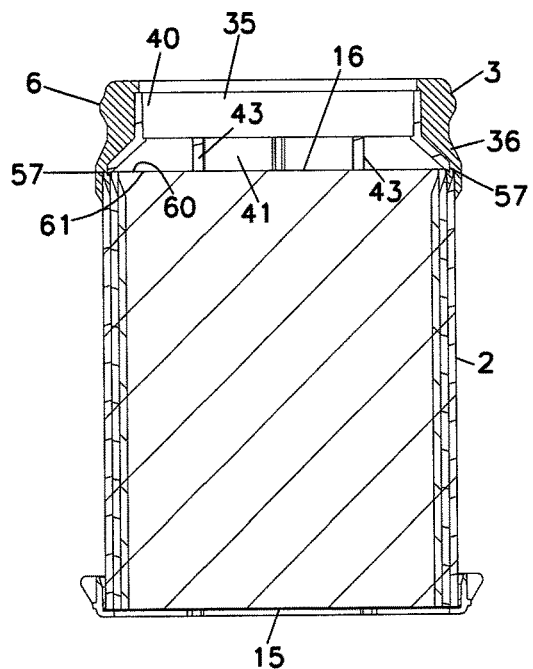
FIG. 3 is a cross-sectional view taken along line 3-3, FIG. 2.

Attention is now directed to FIG. 3. FIG. 3 is a cross-sectional view taken along line 3-3, FIG. 2. The cross-section of FIG. 3 is through the shorter or narrower dimension of the element 1, FIG. 1. However, similar features will be viewable, if the cross-section were taken along the longer axis, i.e., line Y-Y, FIG. 2.

The media pack 2, FIG. 3, is a coiled media pack. In general the media pack 2 comprises a corrugated media sheet secured to a flat or nearly flat sheet to form a strip or single facer, which is itself coiled in the configuration shown. Thus, the media pack 2 comprises a single strip of the corrugated sheet/flat or non-corrugated sheet, or single facer, coiled and configured as shown. In FIG. 2, although the media pack is shown schematically, the outer three coils are indicated. Referring to FIG. 1, the outside tail end of the outer most coil is shown at 37. For the embodiment shown, tail end 37 is sealed and secured in position, by a hot melt sealant strip 38, although alternatives are possible.

Referring again to FIG. 3, it is noted that there is no center board, center gap, center piece or center seal schematically shown in the media pack 2. The media pack 2 is simply shown schematically with respect to this point. Center boards can be used, for example as described in U.S. Pat. No. 6,348,084, incorporated herein by reference. Interdigitated center strips can be used, for example as described in U.S. Provisional Application Ser. No. 60/467,521, filed May 2, 2003. Center seals can also be used, for example as described in U.S. Provisional Application Serial Number 60/467,521, filed May 2, 2003. No specific choice from among these, and variants, is meant to be indicated with respect to FIG. 3.

Referring to FIG. 3, the preform part 35 depicted includes three sections generally comprising: housing seal support section 40; media engagement periphery or skirt 41; and, media face cross-piece arrangement 43.

Figure 4:
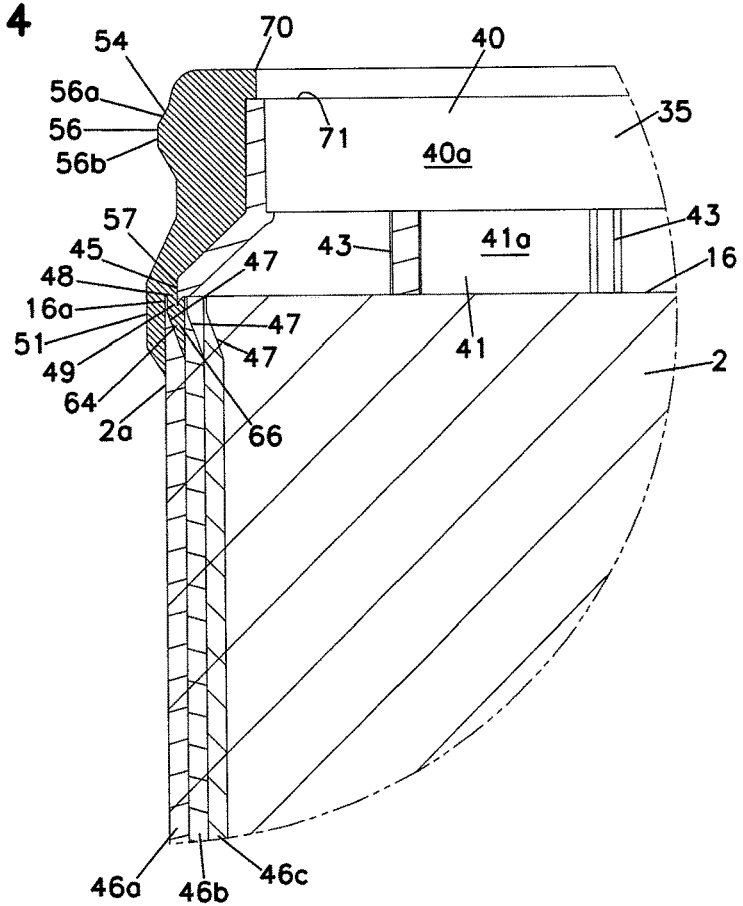
FIG. 4 is an enlarged fragmentary view of a portion of FIG. 3.

Attention is directed now to FIG. 4. FIG. 4 is a fragmentary enlarged view of a portion of FIG. 3. In FIG. 4 it can be seen that no portion of preform 35 extends around the outer periphery or side 2a of the media pack 2. This will be preferred, for arrangements according to the present disclosure, although alternates are possible. For the particular arrangement depicted in FIG. 3, media engagement portion 41 includes an edge 45 which is brought into engagement with flow face 16 of the z-filter media pack 2 and which does not project to, or beyond, an outer perimeter edge 16a of flow face 16. The particular preform 35 depicted includes a small ridge 45a, FIG. 6 which projects slightly into media pack 2. Preferably ridge 45a is no greater than 1 mm and comes to a fine point, to help contain flow of rising urethane, during formation of the seal component 36, and desirably from extending across flow face 16.

As described above in reference to FIG. 3, it is noted that the particular z-filter media pack 2 depicted comprises a coiled media arrangement. In FIG. 4, the outer three coils 46a, 46b and 46c are formed. The ends of coils 46a, 46b and 46c, adjacent surface 16, are shown comprising ends folded or darted closed at 47. Such folding or darting is described, for example, in U.S. Provisional Application Ser. No. 60/467,521, filed May 2, 2003, incorporated herein by reference.

Referring still to FIG. 4, molded seal component 36 is positioned with a portion 48 overlapping and sealing a joint 49 where preform part 35 engages flow surface 16 of the media pack 2. In particular, the depleted molded seal component 36 includes a portion 51 which extends beyond the joint 49 in a direction away from flow face 16 (toward opposite flow face 15, FIG. 3) a distance of at least 5 mm, preferably at least 8 mm, and typically a distance within the range of about 9 mm to 18 mm, inclusive.

In general, portions 48 and 51 of the molded seal component 36, provide then, for a sealing between the media pack 2 and the preform part 35 at this location, and also for sealing around and against media pack 2, adjacent face 16, to inhibit undesired, contaminated, air flow at this region.

Referring to FIG. 1, and in particular to hot melt seal strip 38, typically the strip 38 is continuous and terminates, underneath region 51 of overmold 36, at a location spaced at least 4 mm from face 16, FIG. 4. Typically an extension of 6-12 mm of strip 38 will be positioned underneath overmold 36. The termination of strip 38 at least 4 mm from surface 16 ensures that over a distance of at least 4 mm, the seal material of overmold 36 is sealed directly to the media pack 2 adjacent end face 16. This will help avoid leak between the overmold 36 and the media pack 2 at this location.

Referring to FIG. 4, molded seal component or overmold 36 further includes air cleaner seal portion 54. Air cleaner seal portion 54 includes a radial outer surface 56, configured in a preferred manner, for sealing with an air cleaner component. The particular surface 56 is depicted, as a stepped surface portion 56a having a shape similar to the shape of the seal surface portion at reference 250 depicted in U.S. Pat. No. 6,350,291 at FIG. 7, the complete disclosure of which is incorporated herein by reference.

From review of FIG. 3, it can be seen that portion 40 of preform part 35 is positioned to back up housing seal 56 and stepped portion 56a of molded seal arrangement 36. Thus, preform part 35, in part, serves a function of providing for rigid backup to the strength of the seal when air cleaner seal portion 54 is compressed in the thickness (typically at least 10% in thickness at the portion of most compression) upon installation in an air cleaner, with compression being of surface 56 toward portion 40. Typically, the distance of compression is within the range of 1.5-2.8 mm, at the thickest part 56b of seal 56, usually about 1.9-2.5 mm.

Figure 15:
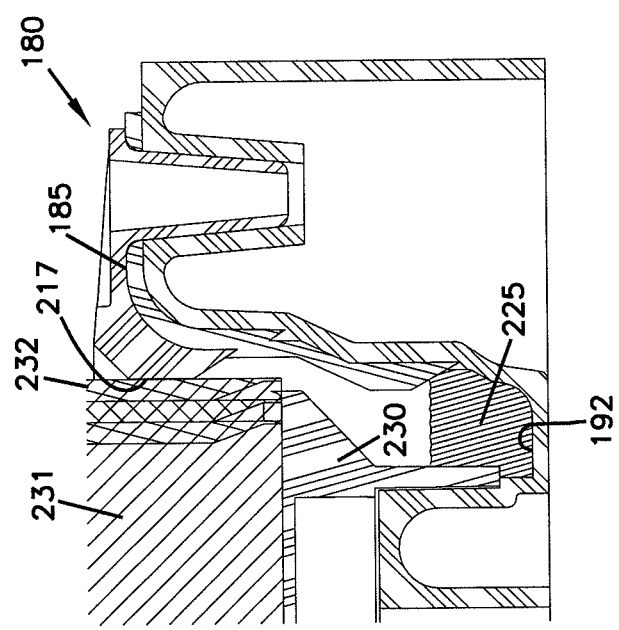
FIG. 15 is a view of FIG. 14, with the seal material foamed and substantially cured.

The recess of surface 40 across face 16, from outer periphery 2a of the media pack 2, provides that the filter element 1 can be installed in air cleaners that are originally configured, for example, to receive elements such as element 450, FIG. 15 of U.S. Pat. No. 6,350,291, incorporated herein by reference. Of course alternate configurations are possible.

Figure 6:
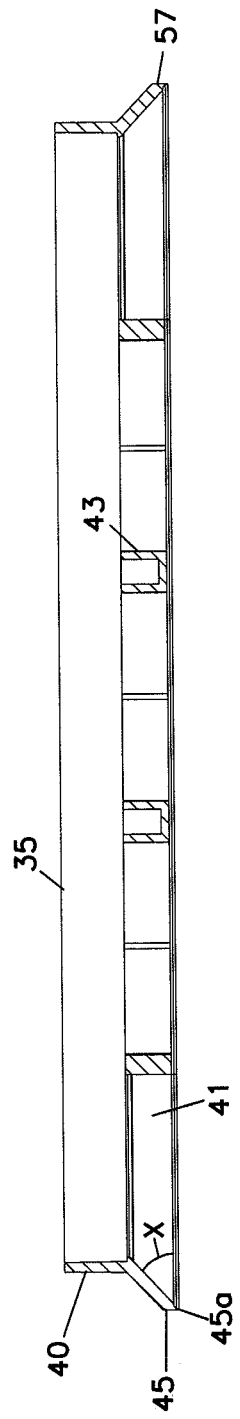
FIG. 6 is a cross-sectional view of the component of FIG. 5, taken along line 6-6 thereof.

Media engagement portion 41 is configured to extend radially outwardly, in extension between portion 40 and edge 57. Media engagement portion 41 is configured as a radially outwardly directed skirt, from region 40. This outward extension means that ends of outlet flutes in the z-filter media pack 2, at region 60, FIG. 3, are not closed to passage of air therefrom, during filtering operation. If region 41 was not positioned as a flared, diagonal, skirt, but rather section 40 extended to point 61, flutes in region 60 would be blocked by extension 41, for air flow therefrom. This would lead to increased restriction, and less efficient use of the media. Typically angle X, FIG. 6, is within the range of 20°-70°, to accommodate the desired skirt. The angle X is the angle between the inside surface of skirt 41 and the media face 16.

Referring to FIG. 4, it is noted that for the particular arrangement shown skirt 41 is sized and positioned to leave region 64 in face 16 (corresponding to the otherwise open ends of exit flutes in an outer flute wrap 46a in the media pack 2), exposed to receive a portion of molded seal component 36 therein, as indicated at 66. This can provide for advantage. In particular, this allows some of overmold 36 to rise into the media pack 2, as described below, during molding.

It is noted that for the preferred element 1 depicted in FIG. 4, no portion of the molded seal component 36 is positioned along interior surface 40a of section 40. Further, typically no portion of molded seal component 36 is provided along inner surface 41a of region 41, except possibly for some bleed or flash immediately adjacent edge 45. This latter, when deliverable, prevents undesired levels of flash across surface 16.

Still referring to FIG. 4, media face cross piece arrangement 43 extends across media face 16, in engagement with region 41 of preformed part 35. Media face cross piece arrangement 43 prevents the media pack 2 from telescoping, in the direction of arrow 10, FIG. 1, during use.

A variety of cross piece configurations are useable. In FIG. 2, the particular cross piece arrangement 43 depicted, comprises: a grid of parallel extensions 43a between opposite sides 22, 23; interconnected by diagonal framework 43b.

Figure 5:
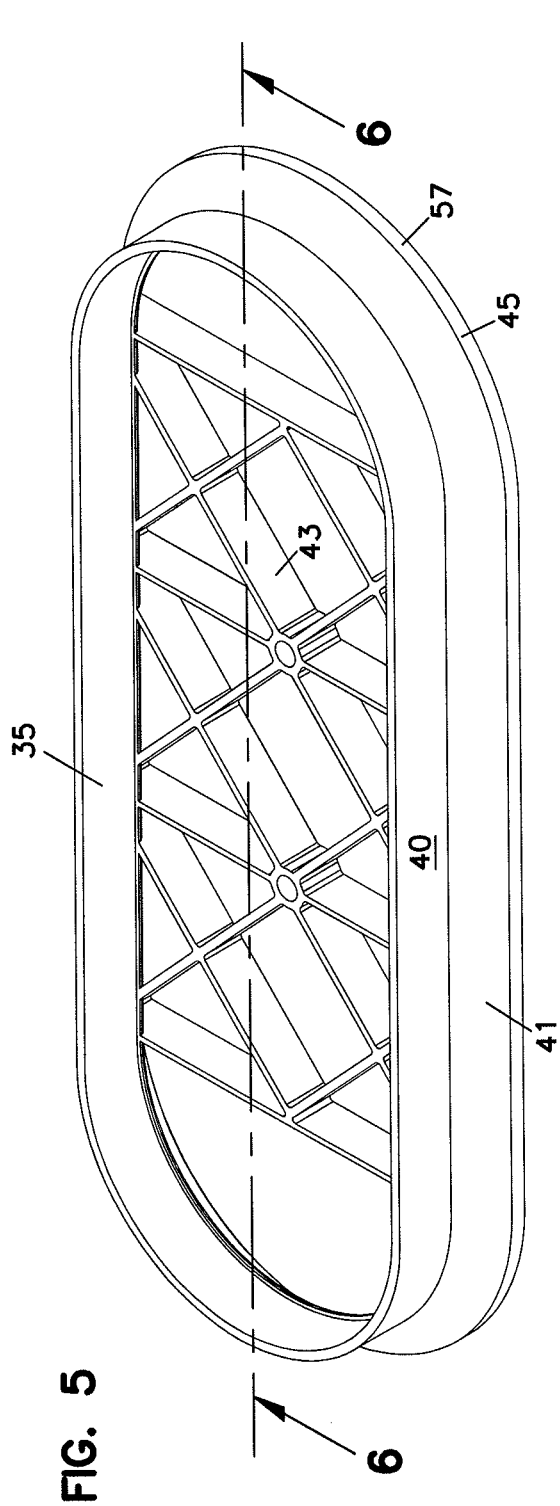
FIG. 5 is an enlarged, perspective view of a component used in the filter element of FIG. 1.

In FIG. 5, a perspective view is provided, showing preformed part 35. It can be seen that the preform part 35 can be formed as a single integral unit, for example through injection molding or other molding processes. It was typically formed from a polymer such as a (33% for example) glass filled nylon material.

Referring again to FIG. 4, molded overmold or seal component 36 includes a portion 70 overlapping part of end 71 of preform part 35. This is an artifact from a preferred molding operation, as described below.

Referring to FIG. 4, it is noted that where cross-brace 43 engages skirt 41, the angle of the skirt 41 relative to the face 16 may be interrupted somewhat. However, in general, at other locations the skirt 41 will typically have the preferred angle X as characterized above.

The techniques described in U.S. Publication 2005/0166561 and PCT WO 05/63361 could be applied in a wide variety of element configurations and sizes. The following dimensions were provided in examples only, and to help understand the wide application of the described techniques. The overmold 36, in its thickest location, could be about 10-12 mm thick, for example about 11.5 mm. The longest cross-sectional dimension of the racetrack shaped media pack could be about 300-320 mm, for example about 308 mm. The shortest cross-sectional dimension of the racetrack shaped element could about 115-125 mm, for example about 121 mm. The length of the straight sides could be about 175-195 mm, for example about 188 mm.

Before formation of arrangements such as described above is discussed application of the same principles in an alternate configuration will be discussed in connection with FIGS. 7-10.

B. The Arrangement of FIGS. 7-10

Figure 7:
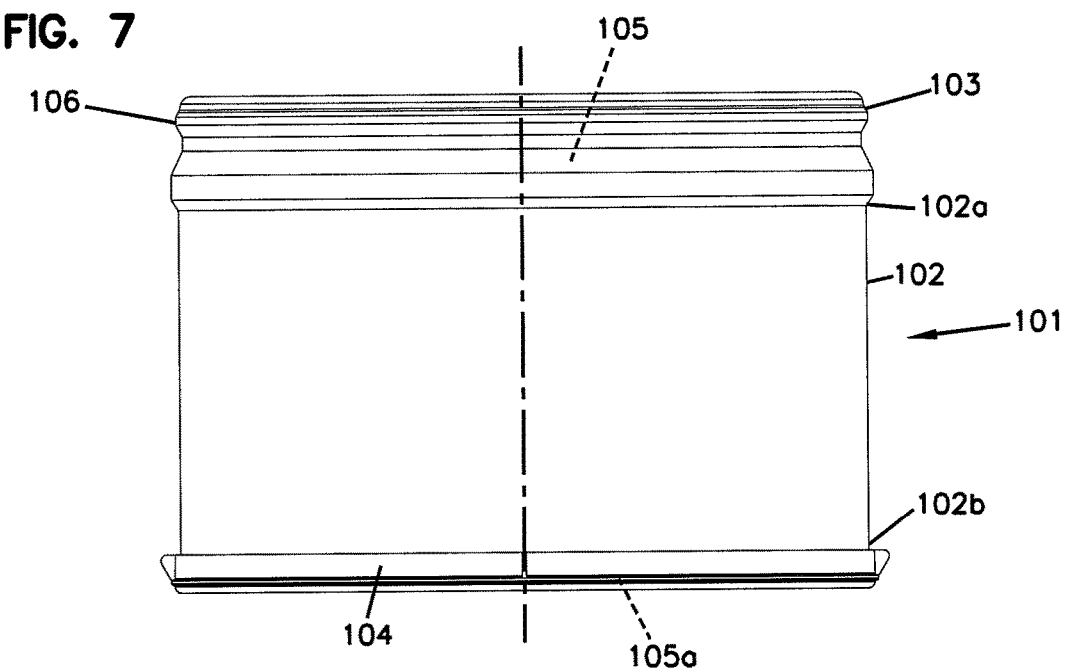
FIG. 7 is a side elevational view of a filter element according to a second example from U.S. Publication U.S. 2005/0166561 A1, published Aug. 4, 2005 and PCT Publication WO 05/63361, published Jul. 14, 2005.

Attention is first directed to FIG. 7. FIG. 7 is a side elevational view of a filter element or cartridge 101. The filter element or cartridge 101 comprises a z-filter media pack 102 and seal arrangement 103. The element 101 further includes optional end piece 104 at an end 102b of media pack 102 opposite from an end 102a in which seal arrangement 103 is located.

The media pack 102 comprises a coiled single facer having first and second, opposite, flow faces 105, 105a. It would, of course, have an outside tail end, not shown, which would be secured down, for example, with a sealant strip analogous to strip 38 above.

In general, and referring to FIG. 7, surface 106 of seal arrangement 103, is configured to provide a housing seal, as an outwardly directed radial seal, with a housing or air cleaner component in use (of course alternatives are possible). Surface 106 may be configured, in cross-section, analogously to surface 56, FIG. 4.

Figure 8:
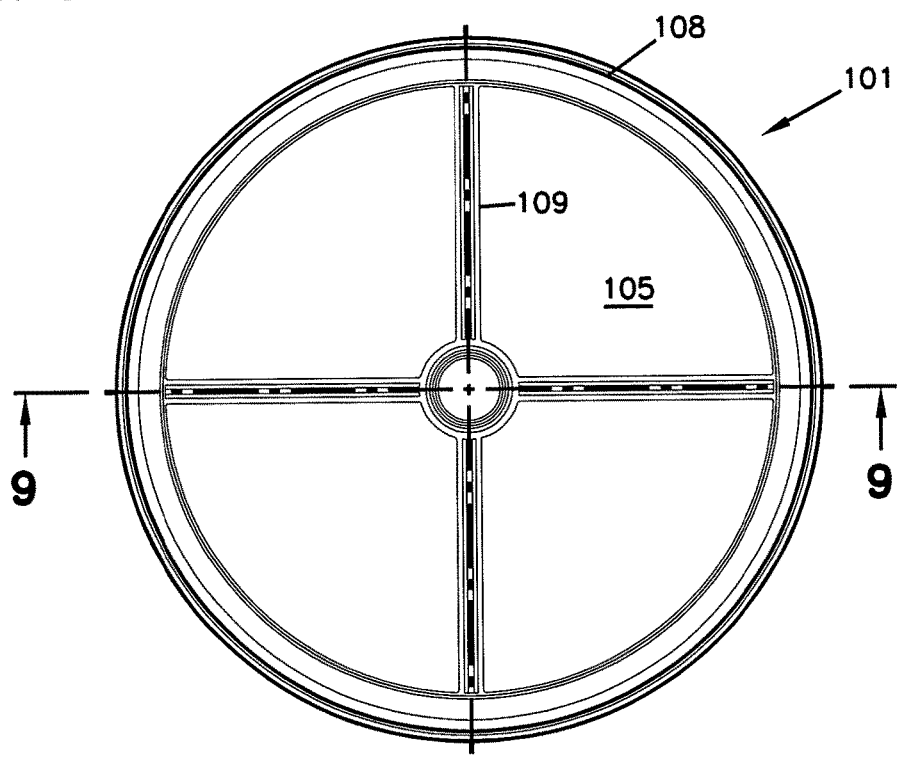
FIG. 8 is a top view of the element shown in FIG. 7.

Attention is now directed to FIG. 8, in which element 101 is depicted in top plan view. From the view of FIG. 7, it can be seen that element 101 has a generally circular outer perimeter 108 defined by both the outer circumference of the seal arrangement 103 and media pack 102. In FIG. 8, grid work 109 is viewable, extending across flow face 105; in this instance face 105 preferably being an outlet flow face.

Figure 9:
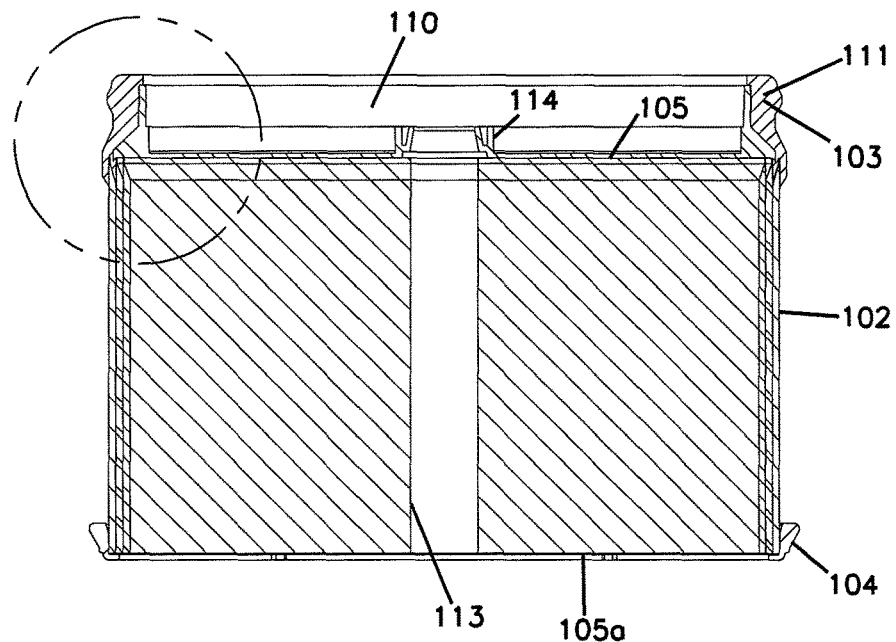
FIG. 9 is a cross-sectional view of the arrangement depicted in FIG. 8, taken along line 9-9 thereof

Attention is now directed to FIG. 9, which shows a cross-sectional view through element 101. From FIG. 9, it can be seen that the seal arrangement 103 comprises a preformed part 110 and an overmold or molded seal component 111. The preform part 110 and molded seal component 111 may generally be analogous to the preform part 35 and molded seal component 36 of the embodiment shown in FIGS. 1-5, except made with a round outer perimeter.

Specifically, element 101 includes a core 113, around which the media pack 102 is wound. Core 113 can be provided in snap fit engagement with a portion 114 of preform part 110. A variety of engagement arrangements can be used, including the one, for example, described at FIG. 5 in U.S. Pat. No. 6,517,598, incorporated herein by reference. Core 113 is shown in schematic. It would typically be provided with a plug therein. The plug could be integral with a remainder of core 113 or is added thereto.

Figure 10:
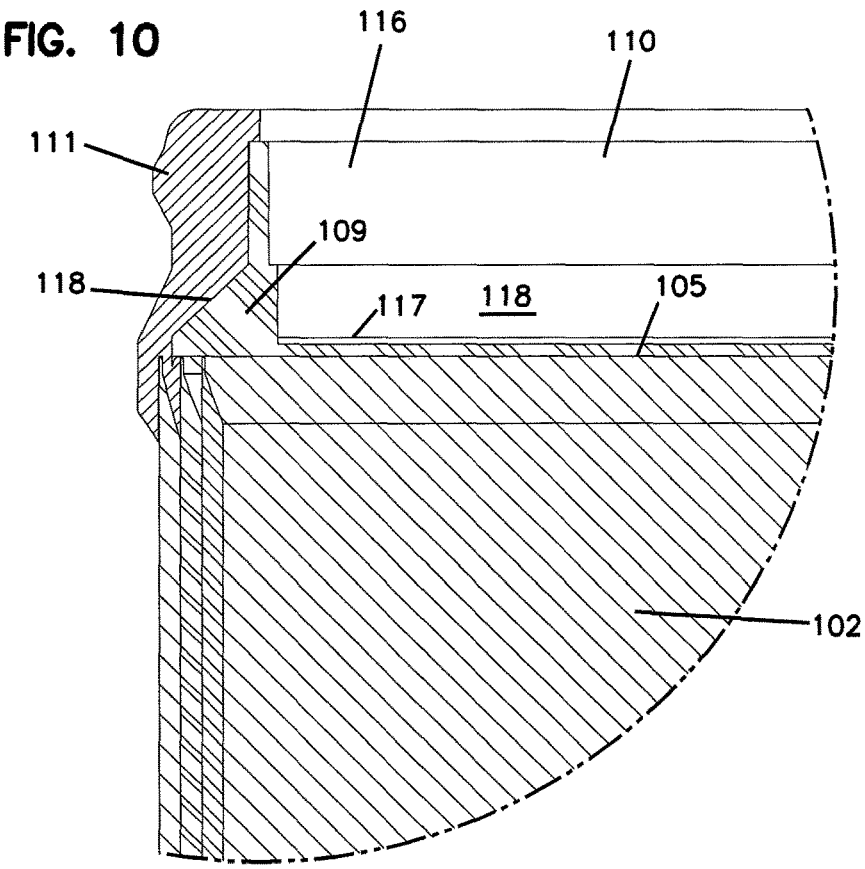
FIG. 10 is an enlarged, fragmentary, view of a portion of FIG. 9.

In FIG. 10, an enlarged fragmentary view of a portion of FIG. 9 is shown. The preform part 110 includes a housing seal support 116; and, a media pack engagement portion 117, configured as a radially outwardly directed skirt 118; and media face cross piece arrangement 109 (FIG. 8). (At region 114 the inside outward skirt 118 is shown filled because the cross-section is taken through cross piece grid work 109, FIG. 8.) For element 101, these components generally provide the same basic operation as the analogous components for element 1, FIG. 1.

C. Process for Assembly of Elements (Air Filter Cartridges) According to FIGS. 1-10.

In general, elements (air filter cartridges) corresponding to element or cartridge 1, FIG. 1, and element or cartridge 101, FIG. 6, are formed the processes involving the following:

1. Preforming the media pack component (2, 102);
2. Preforming the preformed part (35, 110) of the seal arrangement;
3. Positioning the preform part (35, 110) and media pack component (2, 102) appropriately with respect to one another in a mold.
4. Molding (in the examples shown by overmolding) seal material to form the appropriate molded seal component of the arrangement.
5. Demolding.
6. Optionally placing the skid (30, 104) on an end of the element opposite the seal.

In this context, the term "overmolding" and variants thereof are meant to refer to molding a molded seal component 36, 111 in position: (a) with a portion of the molded seal component 36 over the outside of joint between the preformed part (35, 110) of the seal arrangement and the media pack (2, 102); and, (b) with a portion of the same seal component 36, 111 (i.e. preferably a portion integral with a remainder of the overmold) positioned to form an air cleaner seal. Typical and preferred processes will use, for the formation of the molded seal component, a foaming polyurethane, as described below. Herein, a molded seal component 36 which has been made by overmolding as defined, will sometimes be referred to as an overmold. The portions of the overmold seal, are preferably integral with one another; the overmold 36, 111 being preferably molded from a single pool of polymer.

Typically, the thickness of the molded seal component, in the region of the seal surface, is configured so that compression of the thickness of the thickest portion of the molded seal component in this region, will be at least 10%, and typically at least 15%, when the element (1, 101) is installed in an air cleaner for use. This can be accomplished with configurations as shown, using materials as described below.

A typical process is described herein, in connection with FIGS. 11-16.

Figure 11:
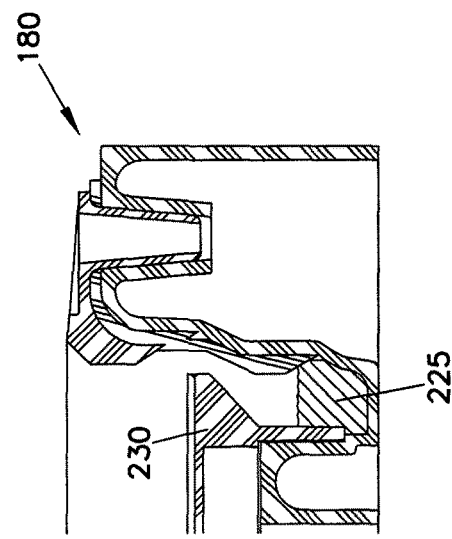
FIG. 11 is a fragmentary schematic, cross-sectional view of a mold arrangement useable to form a seal component of the arrangement depicted in either FIG. 1 or FIG. 7.

Attention is first directed to FIG. 11. In FIG. 11, reference numeral 180 identifies a mold arrangement useable to form the overmold seal arrangement of FIGS. 1-10. Mold arrangement 180 is shown in fragmentary, cross-section. The portions indicated will provide an understanding of how the overmold seal arrangement can be formed. The remainder of the mold will be configured either round or obround, etc., depending on the particular instance of application.

Referring to FIG. 11, the particular mold arrangement 180 depicted is a multi-part mold 181. That is, the mold 180 includes more than one piece fit together, to form the mold in which the overmolding process occurs. The particular multi-part mold 180 depicted comprises three parts 183, 184 and 185 that are fit together, to form the mold. Aperture 189, which extends through three parts 183, 184, 185 when they are appropriately aligned, FIG. 11, can be used to receive a pin or similar member to secure the mold together.

In general, part 183 forms the basic mold structure including: an inner reservoir portion 192, in which uncured resin is placed, for the molding process; inner wall 193, against which a preformed part would be placed in use; shelf 194 on which an edge of the preform part would rest, during the molding process; central wall 195 and shelf 196 which supports additional mold parts as described; and, outer wall 197, which provides an outer support structure to the assembly 180.

The second part 184 comprises a mold insert having an extension 200 with a surface 201 that forms a portion of the outer surface of the molded part of the seal arrangement in use. In this instance surface 201 includes a portion 202 which, in combination with central wall 195 provides a mold undercut 203 molding a particular portion of the sealing surface of the resulting seal portion, as discussed below in connection with FIG. 15. Part 184 further includes upper extension 205 which rests on shoulder 196.

Finally, part 185 includes inner wall 215 and upper flange 218. The flange 218 extends over portion 205 of center part 184. Inner wall 215 includes a surface 216 which will define selected portions of the seal member, during the molding process, as discussed below in connection with FIG. 15. Section 217 will cap the mold, and engage media, during a molding operation as described.

Figure 12:
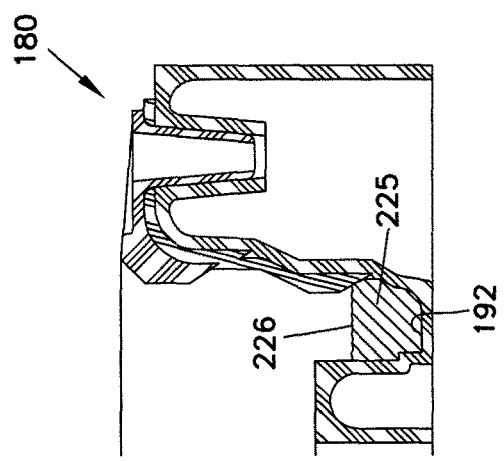
FIG. 12 is a schematic cross-sectional view of the mold of FIG. 11, depicted with a pool of non-cured polymeric seal material therein.

Attention is now directed to FIG. 12, in which assembly 180 is depicted with curable material 225 positioned within reservoir 192 up to fill line 226. The material 225 would generally comprise resin which, during a cure process, will foam and rise as a cure to form the moldable seal component. Typically, during molding and use the material 225 will expand in volume at least 80%, a preferred material increasing about 100%, in volume.

Figure 13:
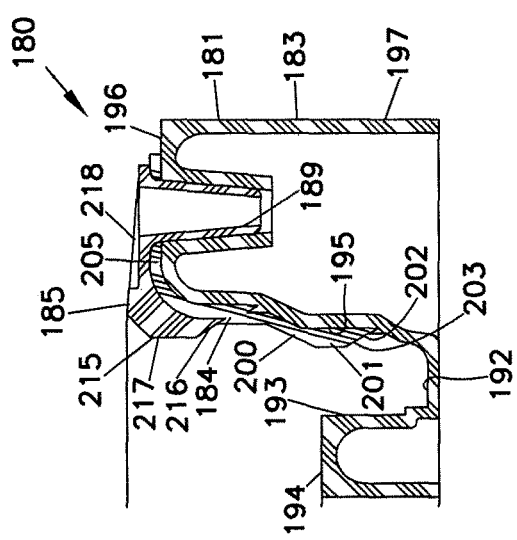
FIG. 13 is a view of the mold of FIG. 12 with certain pre-formed filter element componentry positioned therein.

In FIG. 13, the mold assembly 180 having resin 225 therein is shown having preformed part 230 therein. The preform part 230 could correspond, for example, to preform part 35, FIG. 1. It could also correspond to preform part 110, FIG. 7. However if used with the arrangement of FIG. 7, in some instances it would already be attached to the media pack.

Figure 14:
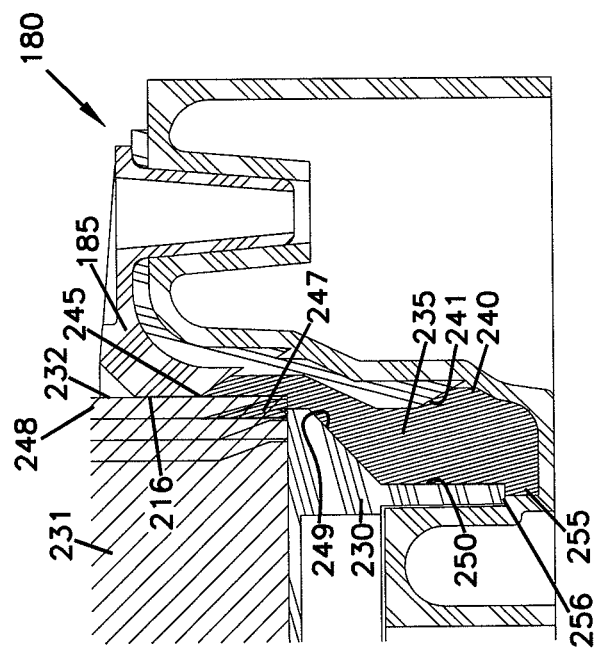
FIG. 14 is a view of FIG. 13 with a media component positioned therein.

Attention is now directed to FIG. 14 in which the mold arrangement 180 is depicted with preform part 230 and media pack 231 positioned appropriately. It is noted that an outer surface 232 of media pack 231 is sized to engage portion 217 of the mold part 185.

Attention is now directed to FIG. 15. In FIG. 15 the material at 235 is meant to indicate the foamed, risen, substantially cured resin; i.e., the overmold (corresponding to overmold 36, FIG. 1, or overmold 103, FIG. 7). By the term "substantially cured" it is meant that the resin is cured sufficiently to have reached a shape which will generally be maintained, as it further cures. From FIG. 15, some of the following important features relating to the molding operation can be understood:

1. At region 240, the most outwardly projecting portion of the molded seal member 235 (number that above) is formed. Portion 240 then, will form the outer most portion of the outwardly directed radial seal member, i.e., the part that compresses most in use as an air cleaner seal;
2. Surface 241 is a portion of mold undercut, which is used to form a portion of region 240.
3. At region 245, rise of the material 235 around the outside surface 232 of the media pack 231 is capped or stopped by mold piece 185, in particular by region 216 of mold piece 185.

At location 247, some of the resin of overmold 235 has risen into the media pack between an outer most layer 248 of the media pack 231 and the layer underneath. This rise will tend to close off any otherwise open flutes at this location. In general, this will render the outer most layer of the media pack (for example layer 46a, FIG. 4) such that while it can be used for filtering material, air must pass into the next inner layer, before it can exit the media pack. What this means or ensures is that even if the outer most wrap of media pack is damaged during handling or installation, leakage will not result. Thus, in a typical arrangement made in this manner, a third set of flutes, closed at both ends, is present in the media pack. This third set is present, preferably, only in the outermost wrap. These flutes would otherwise be outlet flutes, and will sometimes be referred to by such terms.

For the process shown in FIGS. 11-16, the media pack is one which has closed ends at the inlet flutes, adjacent the outlet flow face, darted closed, to provide the edges viewable. Alternates of course are possible, including ones that are not darted at all. The overmold material is shown risen up into the open ends of the outlet flutes, at the outlet face of the media, in the region indicated at 247.

Along regions 249, 250, the resin material 236 completely lines an outer surface of preform 230, securing it in place. At region 255, material 235 is positioned over a part of an end 256 of preform 230.

In the particular arrangement shown, FIG. 15, the overmold 235 is a single integral member, molded from the resin 225, FIG. 14.

Demolding can be accomplished by forcing the element out of the mold 180, in a powered process. Equipment to cause the forcing can engage the cross-pieces on the preform 230. Generally the overmold 235 will compress sufficiently, to be pushed past undercuts in the mold. It is anticipated that typically, with materials and configurations described herein, demolding can be accomplished with a force of 110 lbs. or less, typically about 100 lbs. (The demolding force would typically be applied directly to the gridwork of the preform 35, 110.)

The optional preform skid skirt at the opposite end of the element, can be applied either before or after molding. In general, if a center plug is used within the media, it would be preformed before the described molding process. However, in some instances a center plug can be molded at the same time as the overmold. This latter would require ensuring that a part of the mold or some other configuration is provided, for appropriate dispensing of the urethane to accomplish this.

It is noted that in some instances, as described above, the preform 230 could be attached to the media pack 231 by snap-fit arrangement.

Figure 16:
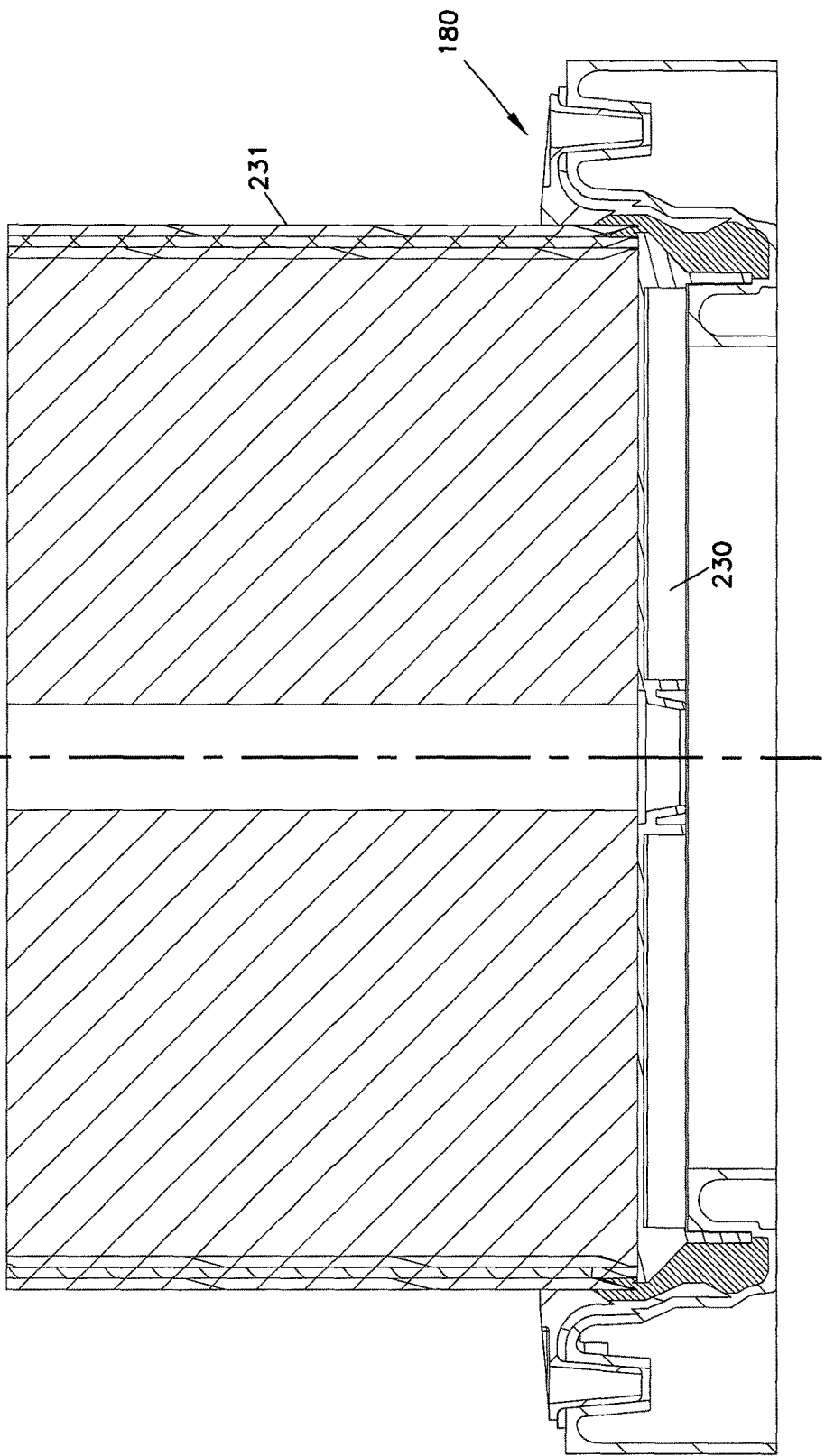
FIG. 16 is a view of preform and media pack component in a mold according to the process of FIGS. 11-15.

In FIG. 16, the mold 180 is depicted with the media pack 231 and preform 230 positioned therein, at molding. In this instance the media pack 231 is depicted without the option skid skirt mounted therein.

D. The Optional Skid Skirt

In the discussion above with respect to FIG. 1, it was indicated that the skid skirt 30 was an optional component. This component is depicted in FIGS. 17 and 18.

Referring first to FIG. 17, a top plan view, the skid skirt 30 is depicted. In FIG. 18, the skid skirt 30 is depicted in cross-sectional view. Referring to FIG. 18, receiving area 30a for the media pack, can be viewed, along with outside surface 30b configured to engage componentry in a housing, during installation, as desired. From the principles described in FIGS. 17 and 18, an analogous, but circular, component can be understood, if desired, for application in a circular arrangement. The skid skirt 30 is typically formed from a glass filled (for example 33% glass filled) nylon, secured in position with an adhesive.

E. The Curable Seal Resin

Typically with such arrangements, the polyurethane formulation chosen provides for a high foam, very soft, molded end cap. In general, the principal issue is to utilize a formulation that provides for an end cap that is such that a robust seal will result under conditions which will allow for hand assembly and disassembly. This generally means that the seal range which has material is a relatively low density, and exhibits appropriate and desirable compression load deflection and compression set.

Typically the formula chosen will be such as to provide end caps having an as molded density of no greater than 28 lbs./cubic foot, usually no more than 22 lbs./cubic foot, often no greater than 18 lbs/cubic feet and preferably within the range of 12 to 17 lbs/cubic foot.

Herein the term "as molded density" is meant to refer to its normal definition of weight divided by volume. A water displacement test or similar test can be utilized to determine volume of a sample of the molded foam. It is not necessary when applying the volume test, to pursue water absorption into the pores of the porous material, and to displace the air the pores represent. Thus, the water volume displacement test used, to determine sample volume, would be an immediate displacement, without waiting for a long period to displace air within the material pores. Alternately stated, only the volume represented by the outer perimeter of the sample need be used for the as molded density calculation.

In general, compression load deflection is a physical characteristic that indicates firmness, i.e. resistance to compression. In general, it is measured in terms of the amount of pressure required to deflect a given sample of 25% of its thickness. Compression load deflection tests can be conducted in accord with ASTM 3574, incorporated herein by reference. In general, compression load deflection may be evaluated in connection with aged samples. A typical technique is to measure the compression load deflection on samples that have been fully cured for 72 hours at 75° F. or forced cured at 190° F. for 5 hours.

Preferred materials will be ones which when molded, show a compression load deflection, in accord with ASTM 3574, on a sample measured after heat aging at 158° F. for seven days, on average, of 14 psi or less, typically within the range of 6-14 psi, and preferably within the range of 7-10 psi.

Compression set is an evaluation of the extent to which a sample of the material (that is subjected to compression of the defined type and under defined conditions), returns to its previous thickness or height when the compression forces are removed. Conditions for evaluating compression set on urethane materials are also provided in ASTM 3574.

Typical desirable materials will be ones which, upon cure, provide a material that has a compression set of no more than about 18%, and typically about 8-13%, when measured on a sample compressed to 50% of its height and held at that compression at a temperature of 180° F. for 22 hours.

In general, the compression load deflection and compression set characteristics can be measured on sample plugs prepared from the same resin as used to form the end cap, or on sample cut from the end cap. Typically, industrial processing methods will involve regularly making test sample plugs made from the resin material, rather than direct testing on portions cut from molded end caps.

Urethane resin systems useable to provide materials having physical properties within the as molded density, compression set and compression load deflection definition as provided above, can be readily obtained from a variety of polyurethane resin formulators, including such suppliers as BASF Corp., Wyandotte Mich., 48192.

In general, with any given industrial process to select the appropriate physical characteristics with respect to the material, the key issue will be management of the desired characteristics and the final product, with respect to mounting and dismounting of the element, as well as maintenance of the seal over a variety of conditions. The physical characteristics provided above are useable, but are not specifically limiting with respect to products that may be considered viable. In addition, various element manufacturers, depending on the circumstances, may desire still further specifications, for example, cold temperature compression deflection, typically measured on the sample cooled to −40° F., with the specification being for the pressure required to cause the compression under the ASTM test, for example, being 100 psi max.

One example usable material includes the following polyurethane, processed to an end product having an "as molded" density of 14-22 pounds per cubic foot. The polyurethane comprises a material made with I36070R resin and I3050U isocyanate, which are sold exclusively to the assignee Donaldson by BASF Corporation, Wyandotte, Mich. 48192.

The materials would typically be mixed in a mix ratio of 100 parts I36070R resin to 45.5 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70-95° F. The mold temperatures should be 115-135° F.

The resin material I36070R has the following description:
 (a) Average molecular weight
  1) Base polyether polyol=500-15,000
  2) Diols=0-10,000
  3) Triols=500-15,000
 (b) Average functionality
  1) total system=1.5-3.2
 (c) Hydroxyl number
  1) total systems=100-300
 (d) Catalysts
  1) amine=Air Products 0.1-3.0 PPH
 (e) Surfactants
  1) total system=0.1-2.0 PPH
 (f) Water
  1) total system=0.2-0.5%
 (g) Pigments/dyes
  1) total system=1-5% carbon black
 (h) Blowing agent
  1) water.

The I3050U isocyanate description is as follows:
 (a) NCO content—22.4-23.4 wt %
 (b) Viscosity, cps at 25° C.=600-800
 (c) Density=1.21 g/cm$^3$ at 25° C.
 (d) Initial boiling pt.—190° C. at 5 mm Hg
 (e) Vapor pressure=0.0002 Hg at 25° C.
 (f) Appearance—colorless liquid
 (g) Flash point (Densky-Martins closed cup)=200° C.

F. Z-filter Media Generally

Herein above it was discussed in general the media packs usable in the arrangements described, for example as media packs 2, 102, comprise z-filter media packs. It was indicated that a variety of alternate flute shapes and seal types can be used in such media packs.

1. Z-Filter Media Configurations, Generally.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to facing media, are stacked on one another, to create a filter construction. An example of this is described in FIG. 11 of U.S. Pat. No. 5,820,646, incorporated herein by reference.

For specific applications as described herein, coiled arrangements are preferred. Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application U.S. Ser. No. 04/07927, filed Mar. 17, 2004, each of which is incorporated herein by reference. The resulting coiled arrangement generally has, as the outer surface of the media pack, a portion of the facing sheet.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by such techniques as corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid cleaner. In some instances, each of the inlet flow end and outlet flow end will be generally flat or planar, with the two parallel to one another. However, variations from this, for example non-planar faces are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to facing media with appropriate sealing to allow for definition of inlet and outlet flutes; or, such a media coiled or otherwise constructed or formed into a three dimensional network of inlet and outlet flutes; and/or, a filter construction including such media.

Figure 19:
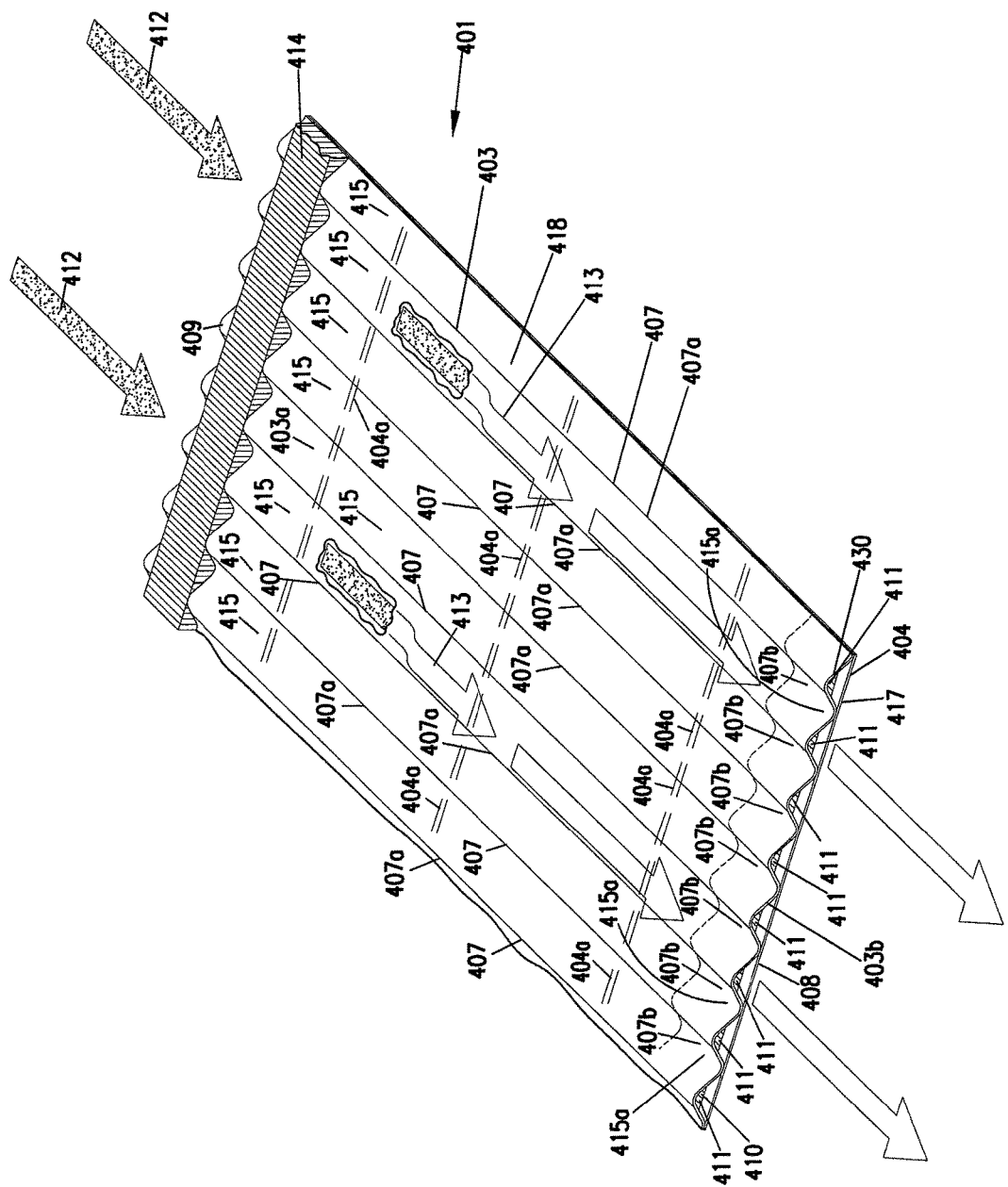
FIG. 19 is a fragmentary, schematic, perspective view of z-filter media useable in arrangements according to U.S. Publication U.S. 2005/0166561 A1, published Aug. 4, 2005 and PCT Publication WO 05/63361, published Jul. 14, 2005.

In FIG. 19, an example of media 401 useable in z-filter media is shown. The media 401 is formed from a corrugated (fluted) sheet 403 and a facing sheet 404.

In general, the corrugated sheet 403, FIG. 19, is of a type generally characterized herein as having a regular, curved, wave pattern of flutes or corrugations 407. The term "wave pattern" in this context, is meant to refer to a flute or corrugated pattern of alternating troughs 407b and ridges 407a. The term "regular" in this context is meant to refer to the fact that the pairs of troughs and ridges (407b, 407a) alternate with generally the same repeating corrugation (or flute) shape and size. (Also, typically in a regular configuration each trough 407b is substantially an inverse of each ridge 407a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 403 is flexible. With respect to the characterization of a repeating pattern, it is not meant that in any given filter construction, an equal number of ridges and troughs is necessarily present. The media 401 could be terminated, for example, between a pair comprising a ridge and a trough, or partially along a pair comprising a ridge and a trough. (For example, in FIG. 19 the media 401 depicted in fragmentary has eight complete ridges 407a and seven complete troughs 407b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 407a of each ridge and the bottom 407b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 19, for the corrugated sheet 403, is that at approximately a midpoint 430 between each trough and each adjacent ridge, along most of the length of the flutes 407, is located a transition region where the curvature inverts. For example, viewing back side or face 403a, FIG. 19, trough 407b is a concave region, and ridge 407a is a convex region. Of course when viewed toward front side or face 403b, trough 407b of side 403a forms a ridge; and, ridge 407a of face 403a, forms a trough. (In some instances, region 430 can be a straight segment, instead of a point, with curvature inverting at ends of the straight segment 430.)

A characteristic of the particular regular, curved, wave pattern corrugated sheet 403 shown in FIG. 19, is that the individual corrugations are generally straight. By "straight" in this context, it is meant that through at least 70% (typically at least 80%) of the length between edges 408 and 409, the ridges 407a and troughs 407b do not change substantially in cross-section. The term "straight" in reference to corrugation pattern shown in FIG. 19, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 19 and as referenced above, the media 401 has first and second opposite edges 408 and 409. When the media 401 is coiled and formed into a media pack, in general edge 409 will form an inlet end for the media pack and edge 408 an outlet end, although an opposite orientation is possible as discussed below with respect to FIG. 24.

Adjacent edge 408 the sheets 403, 404 are sealed to one another, for example by sealant, in this instance in the form of a sealant bead 410, sealing the corrugated (fluted) sheet 403 and the facing sheet 404 together. Bead 410 will sometimes be referred to as a "single facer" bead, when it is applied as a bead between the corrugated sheet 403 and facing sheet 404, to form the single facer or media strip 401. Sealant bead 410 seals closed individual flutes 411 adjacent edge 408, to passage of air therefrom.

Adjacent edge 409, is provided sealant, in this instance in the form of a seal bead 414. Seal bead 414 generally closes flutes 415 to passage of unfiltered fluid therein, adjacent edge 409. Bead 414 would typically be applied as the media 401 is coiled about itself, with the corrugated sheet 403 directed to the inside. Thus, bead 414 will form a seal between a back side 417 of facing sheet 404, and side 418 of the corrugated sheet 403. The bead 414 will sometimes be referred to as a "winding bead" when it is applied as the strip 401 is coiled into a coiled media pack. If the media 401 were cut in strips and stacked, instead of coiled, bead 414 would be a "stacking bead."

In some applications, the corrugated sheet 403 is also tacked to the facing sheet 4 at various points along the flute length, as shown at lines 404a.

Referring to FIG. 19, once the media 401 is incorporated into a media pack, for example by coiling or stacking, it can be operated as follows. First, air in the direction of arrows 412, would enter open flutes 411 adjacent end 409. Due to the closure at end 408, by bead 410, the air would pass through the media shown by arrows 413. It could then exit the media pack, by passage through open ends 415a of the flutes 415, adjacent end 408 of the media pack. Of course operation could be conducted with air flow in the opposite direction, as discussed for example with respect to FIG. 24. The point being that in typical air filter applications, at one end or face of the media pack unfiltered air flow goes in, and at an opposite end or face the filtered air flow goes out, with no unfiltered air flow through the pack or between the faces.

For the particular arrangement shown herein in FIG. 19, the parallel corrugations 7a, 7b are generally straight completely across the media, from edge 708 to edge 709. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 403, facing sheet 404 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 20:
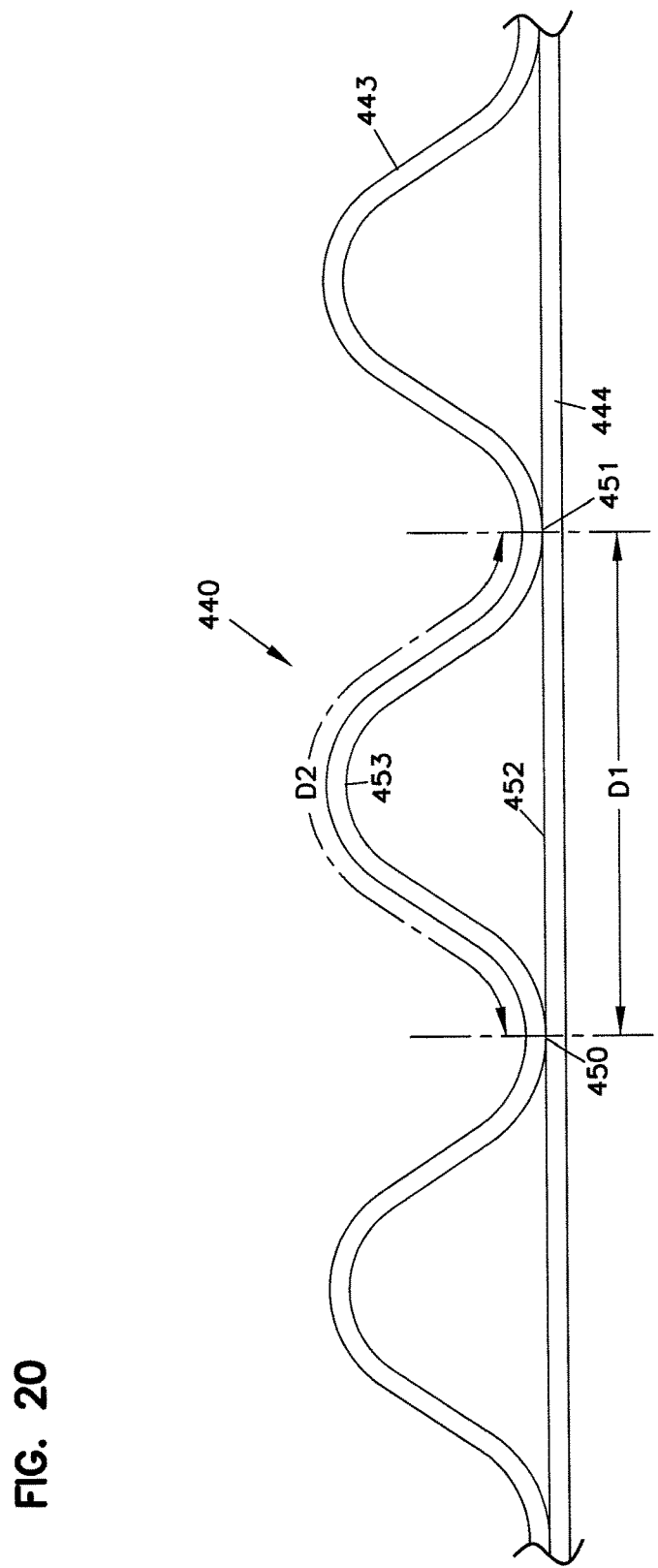
FIG. 20 is a schematic, cross-sectional view of a portion of the media depicted in FIG. 19.

Attention is now directed to FIG. 20, in which a z-filter media construction 440 utilizing a regular, curved, wave pattern corrugated sheet 443, and a facing (in this instance non-corrugated) sheet 444, is depicted. The distance D1, between points 450 and 451, defines the extension of facing media 444 in region 452 underneath a given corrugated flute 453. The length D2 of the arcuate media for the corrugated flute 453, over the same distance D1 is of course larger than D1, due to the shape of the corrugated flute 453. For a typical regular shaped media used in fluted filter applications, the linear length D2 of the media 453 between points 450 and 451 will generally be at least 1.2 times D1. Typically, D2 would be within a range of 1.2-2.0 time D1, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated (fluted) media.

Figure 21:
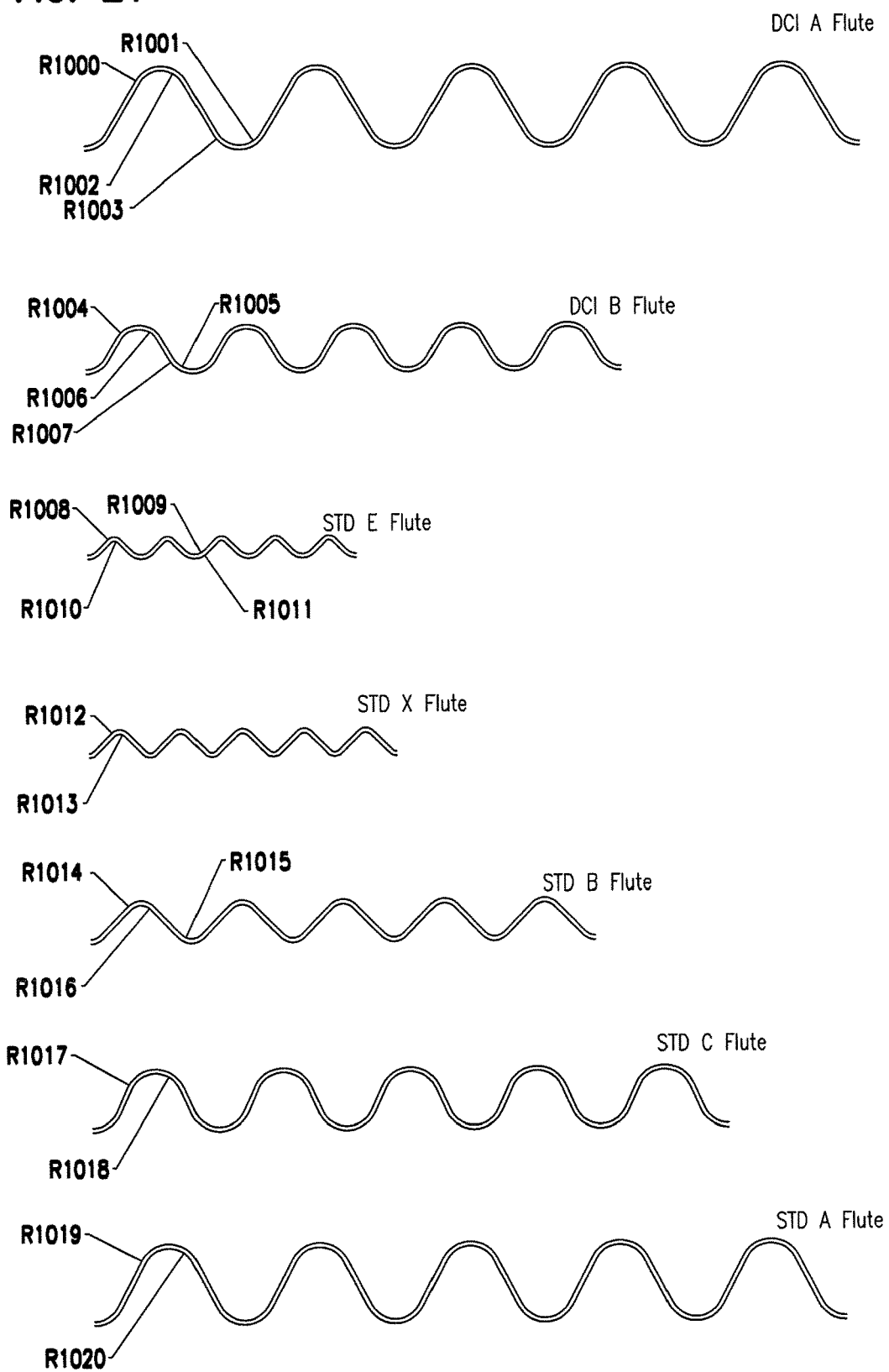
FIG. 21 is a schematic view of examples of various corrugated media definitions.

In the corrugated cardboard industry, various standard flutes have been defined. For example the standard E flute, standard X flute, standard B flute, standard C flute and standard A flute. FIG. 21, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 21.

TABLE A (Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations. A variety of other flute sizes and shapes can also be used with arrangements described herein.

2. Manufacture of Coiled Media Configurations Using Fluted Media, Generally.

Figure 22:
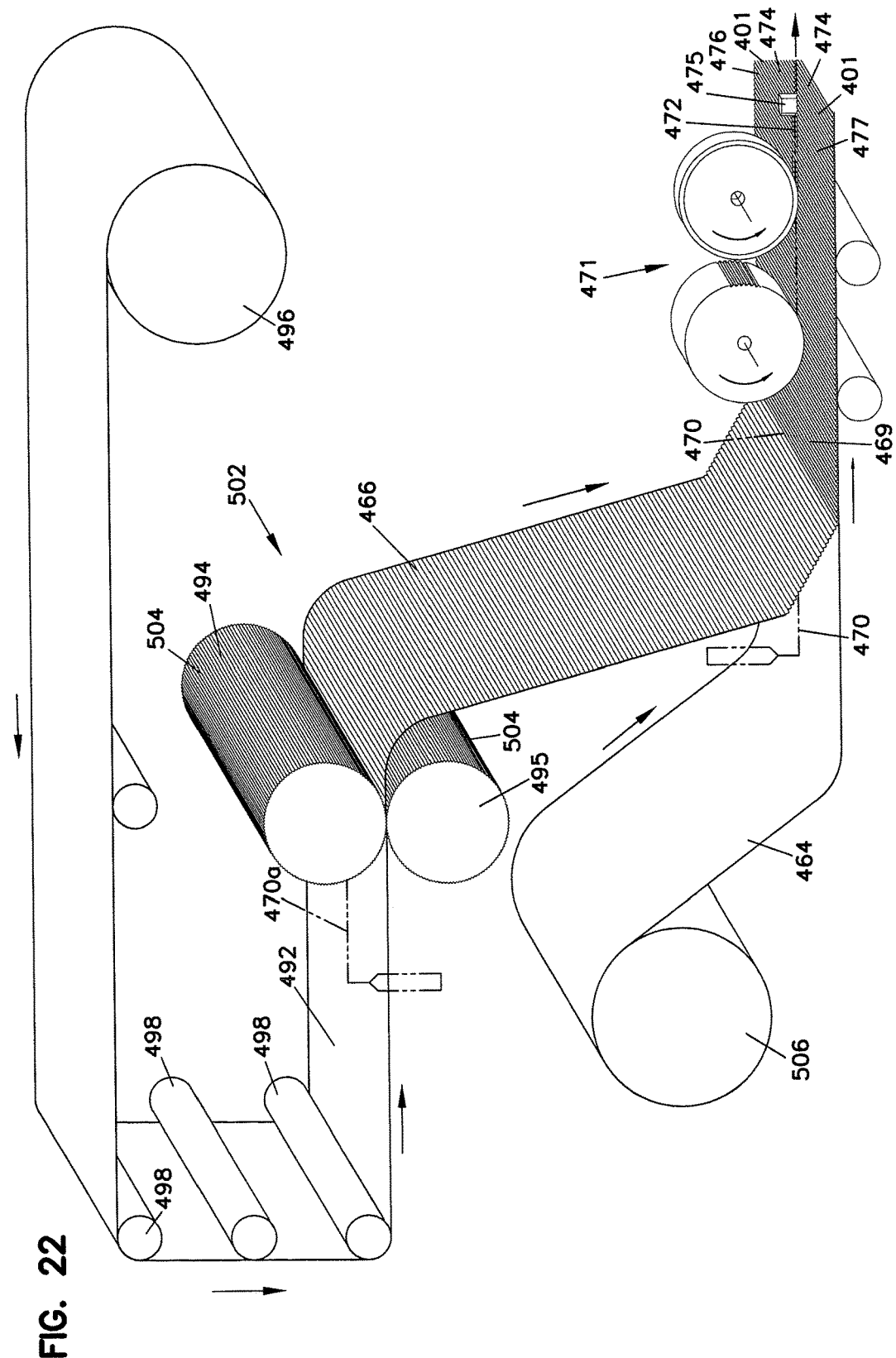
FIG. 22 is a schematic view of a process for manufacturing media according to U.S. Publication U.S. 2005/0166561 A1, published Aug. 4, 2005 and PCT Publication WO 05/63361, published Jul. 14, 2005.

In FIG. 22, one example of a manufacturing process for making a media strip corresponding to strip 401, FIG. 19 is shown. In general, facing sheet 464 and the fluted (corrugated) sheet 466 having flutes 468 are brought together to form a media web 469, with an adhesive bead located therebetween at 470. The adhesive bead 470 will form a single facer bead 410, FIG. 19. An optional darting process occurs at station 471 to form center darted section 472 located mid-web. The z-filter media or Z-media strip 474 can be cut or slit at 475 along the bead 470 to create two pieces 476, 477 of z-filter media 474, each of which has an edge with a strip of sealant (single facer bead) extending between the corrugating and facing sheet. Of course, if the optional darting process is used, the edge with a strip of sealant (single facer bead) would also have a set of flutes darted at this location.

Also, if tack beads or other tack connections 404a, FIG. 19, are used, they can be made, as the sheets 464, 466 are brought together.

Techniques for conducting a process as characterized with respect to FIG. 22 are described in PCT WO 04/007054, published Jan. 22, 2004 incorporated herein by reference.

Still in reference to FIG. 22, before the z-filter media 474 is put through the darting station 471 and eventually slit at 475, it must be formed. In the schematic shown in FIG. 22, this is done by passing a sheet of media 492 through a pair of corrugation rollers 494, 495. In the schematic shown in FIG. 22, the sheet of media 492 is unrolled from a roll 496, wound around tension rollers 498, and then passed through a nip or bite 502 between the corrugation rollers 494, 495. The corrugation rollers 494, 495 have teeth 504 that will give the general desired shape of the corrugations after the flat sheet 492 passes through the nip 502. After passing through the nip 502, the sheet 492 becomes corrugated across the machine direction and is referenced at 466 as the corrugated sheet. The corrugated sheet 466 is then secured to facing sheet 464. (The corrugation process may involve heating the media, in some instances.)

Still in reference to FIG. 22, the process also shows the facing sheet 464 being routed to the darting process station 471. The facing sheet 464 is depicted as being stored on a roll 506 and then directed to the corrugated sheet 466 to form the Z-media 474. The corrugated sheet 466 and the facing sheet 464 are secured together by adhesive or by other means (for example by sonic welding).

Referring to FIG. 22, an adhesive line 470 is shown used to secure corrugated sheet 466 and facing sheet 464 together, as the sealant bead. Alternatively, the sealant bead for forming the facing bead could be applied as shown as 470a. If the sealant is applied at 470a, it may be desirable to put a gap in the corrugation roller 495, and possibly in both corrugation rollers 494, 495, to accommodate the bead 470a.

The type of corrugation provided to the corrugated media is a matter of choice, and will be dictated by the corrugation or corrugation teeth of the corrugation rollers 494, 495. One preferred corrugation pattern will be a regular curved wave pattern corrugation of straight flutes, as defined herein above. A typical regular curved wave pattern used, would be one in which the distance D2, as defined above, in a corrugated pattern is at least 1.2 times the distance D1 as defined above. In one preferred application, typically D2=1.25–1.35×D1. In some instances the techniques may be applied with curved wave patterns that are not "regular," including, for example, ones that do not use straight flutes.

Figure 23:
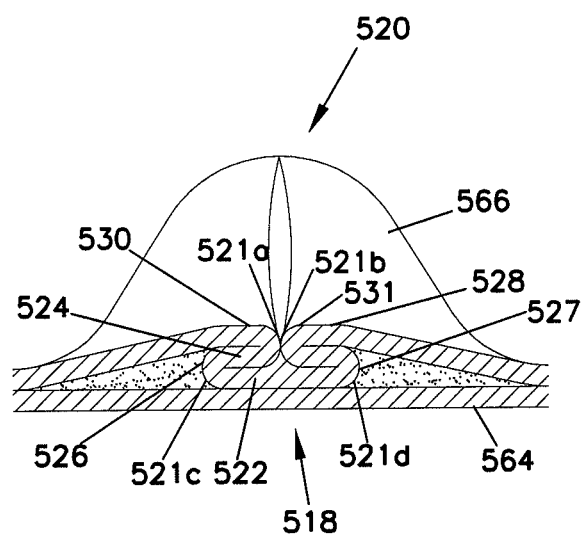
FIG. 23 is a schematic cross-sectional view and optional end dart for media flutes useable in arrangements according to U.S. 2005/0166561 and PCT WO 05/63361.

As described, the process shown in FIG. 22 can be used to create the center darted section 472. FIG. 23 shows, in cross-section, one of the flutes 468 after darting and slitting.

A fold arrangement 518 can be seen to form a darted flute 520 with four creases 521a, 521b, 521c, 521d. The fold arrangement 518 includes a flat first layer or portion 522 that is secured to the facing sheet 464. A second layer or portion 524 is shown pressed against the first layer or portion 522. The second layer or portion 524 is preferably formed from folding opposite outer ends 526, 527 of the first layer or portion 522.

Still referring to FIG. 23, two of the folds or creases 521a, 521b will generally be referred to herein as "upper, inwardly directed" folds or creases. The term "upper" in this context is meant to indicate that the creases lie on an upper portion of the entire fold 520, when the fold 520 is viewed in the orientation of FIG. 23. The term "inwardly directed" is meant to refer to the fact that the fold line or crease line of each crease 521a, 521b, is directed toward the other.

In FIG. 23, creases 521c, 521d, will generally be referred to herein as "lower, outwardly directed" creases. The term "lower" in this context refers to the fact that the creases 521c, 521d are not located on the top as are creases 521a, 521b, in the orientation of FIG. 23. The term "outwardly directed" is meant to indicate that the fold lines of the creases 521c, 521d are directed away from one another.

The terms "upper" and "lower" as used in this context are meant specifically to refer to the fold 520, when viewed from the orientation of FIG. 23. That is, they are not meant to be otherwise indicative of direction when the fold 520 is oriented in an actual product for use.

Based upon these characterizations and review of FIG. 23, it can be seen that a preferred regular fold arrangement 518 according to FIG. 23 in this disclosure is one which includes at least two "upper, inwardly directed, creases." These inwardly directed creases are unique and help provide an overall arrangement in which the folding does not cause a significant encroachment on adjacent flutes.

A third layer or portion 528 can also be seen pressed against the second layer or portion 524. The third layer or portion 528 is formed by folding from opposite inner ends 530, 531 of the third layer 528.

Another way of viewing the fold arrangement 518 is in reference to the geometry of alternating ridges and troughs of the corrugated sheet 566. The first layer or portion 522 is formed from an inverted ridge. The second layer or portion 524 corresponds to a double peak (after inverting the ridge) that is folded toward, and in preferred arrangements folded against, the inverted ridge.

Techniques for providing the optional dart described in connection with FIG. 23, in a preferred manner, are described in PCT WO 04/007054, incorporated herein by reference. Techniques for coiling the media, with application of the winding bead, are described in PCT application U.S. Ser. No. 04/07927, filed March 17, 2004 and incorporated herein by reference.

Techniques described herein are particularly well adapted for use with media packs that result from coiling a single sheet comprising a corrugated sheet/facing sheet combination, i.e., a "single facer" strip. Certain of the techniques can be applied with arrangements that, instead of being formed by coiling, are formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application U.S. Ser. No. 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application U.S. Ser. No. 04/07927.

Another way of describing the peripheral or perimeter shape is by defining the perimeter resulting from taking a cross-section through the media pack in a direction orthogonal to the winding axis of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack. Examples of such media pack arrangements are shown in U.S. Provisional Application 60/578,482, filed Jun. 8, 2004, incorporated herein by reference.

The flute seals (for example from the single facer bead, winding bead or stacking bead) can be formed from a variety of materials. In various ones of the cited and incorporated references, hot melt or polyurethane seals are described as possible for various applications. Such materials are also useable for arrangements as characterized herein.

When the media is coiled, generally a center of the coil needs to be closed, to prevent passage of unfiltered air between the flow faces; i.e., through the media pack. Some approaches to this are referenced below. Others are described in U.S. Provisional 60/578,482, filed Jun. 8, 2004; and U.S. Provisional 60/591,280, filed Jul. 26, 2004.

The media chosen for the corrugated sheet and facing sheet can be the same or different. Cellulose fiber, synthetic fiber or mixed media fiber materials can be chosen. The media can be provided with a fine fiber layer applied to one or more surface, for example in accord with U.S. Pat. No. 6,673,136, issued Jan. 6, 2004, the complete disclosure of which is incorporated herein by reference. When such material is used on only one side of each sheet, it is typically applied on the side(s) which will form the upstream side of inlet flutes.

Above it was discussed that flow could be opposite to the direction shown in FIG. 19. An example is shown in FIG. 24.

Figure 24:
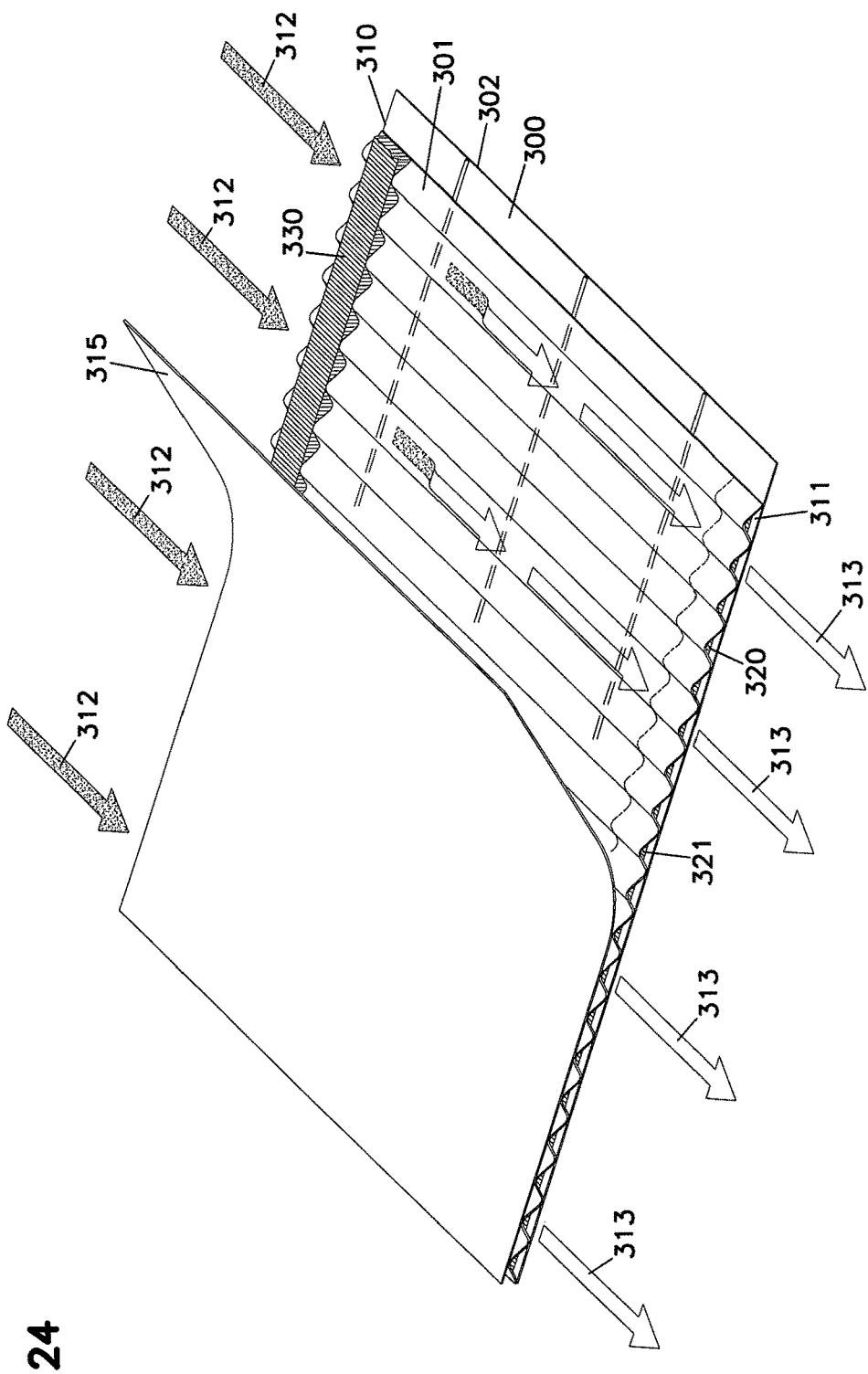
FIG. 24 is a schematic perspective view of a media material useable in the filter elements of FIG. 1 and FIG. 7.

In FIG. 24, a schematic depiction of media useable in such z-filter media packs as shown. The schematic depiction of FIG. 24 is generic, and is not meant to indicate unique or preferred seal type or flute shapes.

Referring to FIG. 24, the reference numeral 300 generally indicates a single facer comprising corrugated sheet 301 secured to flat sheet 302. It is noted that the flat sheet 302 does not have to be perfectly flat, it may comprise a sheet that itself has very small corrugations and other formations therein.

Particular single facer 300 depicted, could be coiled around itself or around a core and then around itself, typically with flat sheet 302 to the outside. For the arrangement shown, edge 310 will form the inlet face in the eventual media pack and end or edge 311 will form the outlet flow faces. Thus arrows 312 represent inlet arrows and arrows 313 represent outlet flow arrows. Sheet 315 is merely meant to schematically represent a flat sheet corresponding to sheet 302, of the next wind.

Adjacent edge 311 is provided a single facer seal arrangement 320. In this instance the single facer shield arrangement 320 comprises a bead of sealant 321 between corrugated sheet 301 and flat sheet 302, positioned along edge 310 or within about 10% of the total length of the flutes, i.e., the distance between inlet edge 310 and outlet edge 311. A variety of materials and arrangements can be used for the seal arrangement 320. The seal arrangement could comprise a corrugated or folded arrangement, sealed with a sealant, or sealed by other means. The particular seal arrangement 320 depicted, could comprise a bead of hot melt sealant, although alternatives are possible. The seals at 320 could be darted or folded, as shown for FIGS. 4 and 10.

Adjacent end 310 a winding seal 330 is depicted. Winding seal 330 generally provides for a seal between layers adjacent edge 311, as the single facer 300 is coiled. Preferably winding seal 330 is positioned within 10% of the total length of the flutes (i.e., the distance between edge 311 and 310) of edge 310.

If is the very ends (lead and tail) of the single facer need to be sealed between the corrugated and flat sheets, sealant can be applied at these locations to do so.

G. General Background Regarding Air Cleaner Systems.

Figure 25:
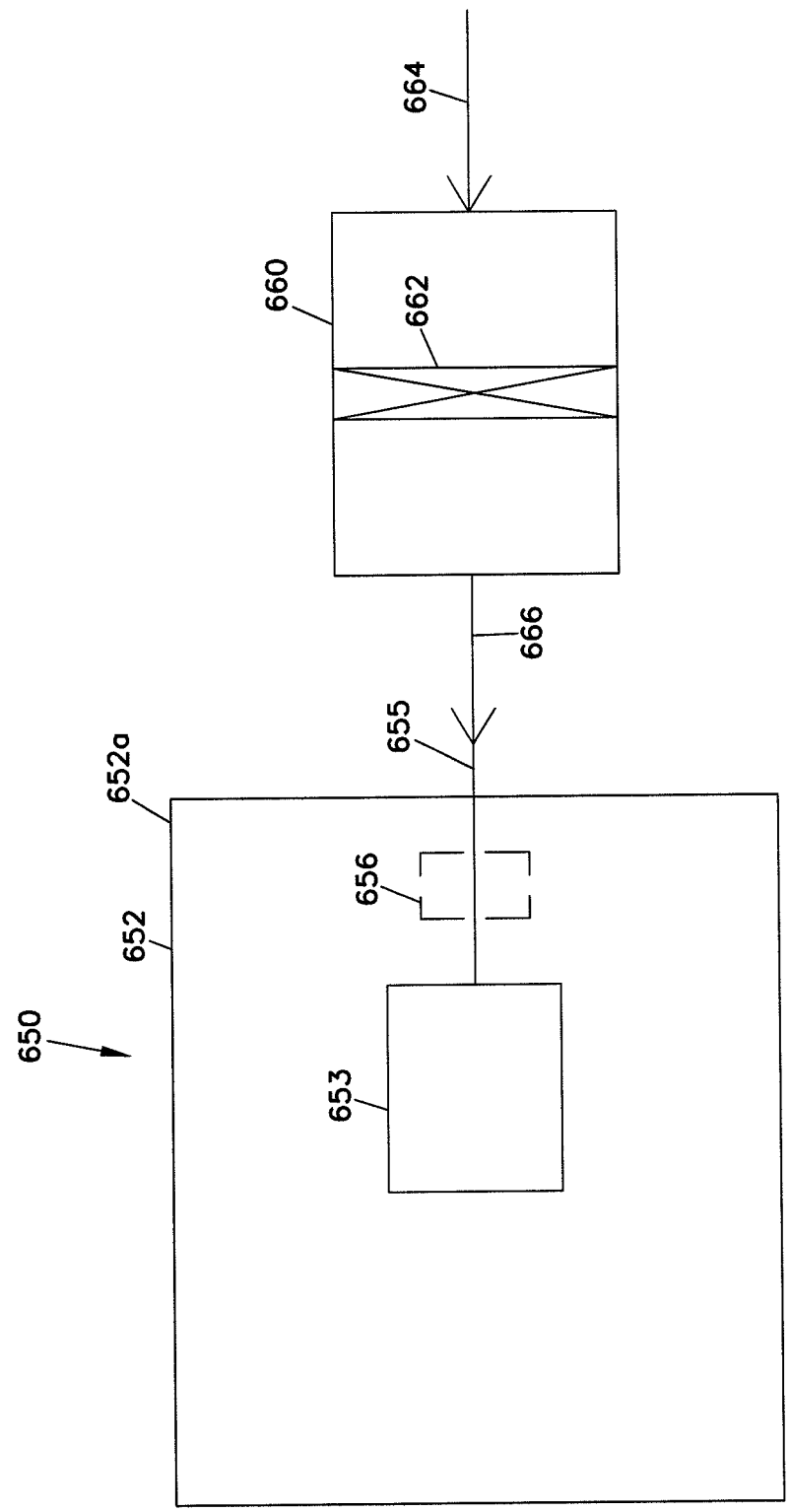
FIG. 25 is a schematic view of a system using an air cleaner having a filter cartridge component according to U.S. Publication U.S. 2005/0166561 A1, published Aug. 4, 2005 and PCT Publication WO 05/63361, published Jul. 14, 2005.

The principles and arrangements described in U.S. Publ. 2005/0166561 and PCT WO 05/63361 are useable in a variety of systems. One particular system is depicted schematically in FIG. 25, generally at 650. In FIG. 25, equipment 652, such as a vehicle 652a having an engine 653 with some defined rated air flow demand, for example in the range of 50 cfm to 2000 cfm (cubic feet per minute) (i.e., 1.4-57 cubic meters/minute) is shown schematically. Although alternatives are possible, the equipment 652 may, for example, comprise a bus, an over-the-highway truck, an off-road vehicle, a tractor, a light-duty or medium-duty truck, or a marine vehicle such as a power boat. The engine 653 powers the equipment 652 upon fuel combustion. In FIG. 25, air flow is shown drawn into the engine 653 at an air intake at region 655. An optional turbo 656 is shown in phantom, as optionally boosting the air intake to the engine 653. The turbo 656 is shown downstream from an air cleaner 660, although alternate arrangement are possible.

The air cleaner 660 has a filter cartridge 662 and is shown in the air inlet stream to the engine 653. In general, in operation, air is drawn in at arrow 664 into the air cleaner 660 and through the filter cartridge 662. Upon passage through the air cleaner 660, selected particles and contaminants are removed from the air. The cleaned air then flows downstream at arrow 666 into the intake 655. From there, the air flow is directed into the engine 653.

In a typical air cleaner 660, the filter cartridge 662 is a serviceable component. That is, the cartridge 662 is removable and replaceable within the air cleaner 660. This allows the cartridge 662 to be serviced, by removal and replacement, with respect to remainder of air cleaner 660, when the cartridge 662 becomes sufficiently loaded with dust or other contaminant, to require servicing.

III. An Example Filter Cartridge in Accord with U.S. Pat. No. 6,150,432 and EP 1 159 052 FIGS. 26-27

In U.S. Pat. No. 6,150,432 and EP 1 159 052, an earlier variation of the z-filter cartridge was described. One such example is shown herein in FIG. 26 at reference numeral 700. The air filter cartridge 700 comprises a media pack 701 with opposite ends 702, 703. The media pack is generally in accord with the media pack 2 previously discussed and described. At end 703 a seal arrangement 704 is positioned comprising preform 705 and molded in place seal member 706. The preform 705 includes a cross-piece arrangement 708 which provides: radial strength to the structure of the preform 705; and, inhibition against telescoping of the media at face 703.

A typical air flow direction is indicated at arrows 710. In FIG. 27, a portion of the seal arrangement 704 is shown in cross-section. This portion of the seal arrangement comprises support 720 and molded-in-place seal member 706. The seal arrangement 706 includes an outer surface 706*o*, with the stepped radial seal area 706*s*; a thickest portion being represented at 706*b*, comprising the region of greatest compression during sealing. Structure 720 is a support to the radial seal 706 and projects axially outwardly from media pack end 703, FIG. 26, in a direction away from the media pack 701. Referring to FIG. 27, outwardly directed skirt 721, extends between support 720 and an outer rim 722 (FIG. 26) of the preform 705, which fits around an outer periphery of the media pack 701. The media pack 701 can be glued or otherwise adhesively secured to the preform 705. The seal 706 would typically be premolded on the preform 704, in particular on support 720, before the preform 705 (comprising support 720, frame 708, skirt 721 and rim 722) is attached to the media pack 701, for example, adhesive.

The seal member 706 would operate similarly to those described above, but without the advantages of the overmolded portion of the seal member.

The type of seal arrangement described in connection with FIGS. 26 and 27 can be applied on a variety of shapes of cartridges. The example shown in FIGS. 26 and 27 is a media pack 701 which is generally cylindrical in shape and has a circular cross-section. The same type of seal can be provided on an oval shaped arrangement, such as for example a racetrack arrangement, if desired. This is described in U.S. Pat. No. 6,190,432 and EP 1 159 052 incorporated herein by reference.

Media pack 701 can generally be in accord with the descriptions herein above, and can be made in accord with the descriptions herein above.

IV. Selected Modifications of the Housing Seal Arrangements Shown and Described in FIGS. 1, 3, 4, 7, 9, 10, 26 and 27

A. A Modified Housing Seal Profile FIGS. 28-31

In FIGS. 28-31, a modified housing seal profile from those described in FIGS. 1, 3, 4, 7, 9, 10, 26 and 27, is presented. A commonality among the housing seals of FIGS. 1, 3, 4, 7, 9, 10, 26 and 27, is that the seal region is a stepped region, in each instance showing a total of three steps between an outer tip and a thickest part of the seal. In some instances, the amount of force needed to install an element having a seal profile in accord with FIGS. 1, 3, 4, 7, 9, 10, 26 and 27, can be undesirable. To provide for reduction in this force, a variation in the housing seal profile of these Figs. is provided herein. The modifications described can be applied on a variety of perimeter shapes of seals and media packs including, for example, ones having a circular media pack and seal outer periphery (perimeter); and, ones having a media pack and seal of oval, for example racetrack, outer periphery (perimeter). This will be understood from the following.

In FIGS. 28-31, only the molded seal member itself is depicted. That is, the seal member is shown schematically, without the preform member on which it is mounted in use being present. It should be understood that the preform member can be in accord with those previously described in FIGS. 1-27, or in accord with the improvements described herein below, in connection with FIGS. 32-40.

In typical arrangements, the seal member 800, FIG. 28, would not exist separately from the preform on which it is mounted. Rather the seal member 800 would typically be molded-in-place on a preform with which it would be used.

The seal member 800, FIG. 28, can be provided in the form of a seal member otherwise in accord with FIGS. 26, 27, which is molded onto a preform that is attached (adhered) to a media pack; or in accord with FIGS. 1, 3, 4, 7, 9 and 10, that is molded as part of an overmold with portion thereof providing for attachment of the housing seal member and support, to a media pack, by an adhesive separate from the seal member. In FIGS. 28-30, an example is shown in which the housing seal member is in a form as it would be if molded-in-place on support 720, FIG. 27.

In FIG. 31 a similar housing seal profile is shown, as a portion of a seal member molded in the form of an overmold, such as in FIGS. 1, 3, 4, 7, 9 and 10. In the arrangement of FIG. 31, the seal member would be an integral part of an overmold that also secures the seal member and preform to a media pack.

Attention is now directed to FIG. 28. In FIG. 28, reference numeral 800 indicates the housing seal member. Seal member 800 is shown with a circular perimeter shape, but could be formed with alternate perimeter shapes such as oval, an example being racetrack.

In FIG. 29, housing seal member 800 is depicted in cross-section. Housing seal member 800 includes an outer seal portion 801. The outer seal portion 801 is a portion which compresses to form a housing seal between an outer annular housing portion (when installed), and a support such as support 720. Outer portion 801 includes a single, chamfered or beveled, forward edge region 803. The chamfered or beveled forward edge region 803 is discussed in greater detail below.

The term "single" as used in the context of the previous paragraph, is meant to refer an outer portion 801 that includes only one beveled region 803 between a thick part 801*t* of the radial seal region 801 that overlaps a support (for example support 720), and tip 805. This is different from previous arrangements discussed in connection with FIGS. 1, 3, 4, 7, 9, 10, 26 and 27, in which two, small, spaced, beveled regions, forming several steps, are positioned.

Still referring to FIG. 29, housing seal member 800 further includes tip 805 and inner region 807. The inner region 807 would be positioned against an inside surface of a support, such as support 720, FIG. 27, when housing seal member 800 is used. Alternately stated, inner portion 807 is positioned on an opposite side of a support from region 801, during use. Tip 805 extends between regions 807 and 801, typically over an outermost tip, remote from media pack, of a support on which housing seal member 800 is positioned in use.

Attention is now directed to FIG. 30, in which a portion of FIG. 29 is shown in an enlarged fragmentary view. Instead of possessing multiple steps, as do the seal profiles of the arrangement shown in FIGS. 1, 3, 4, 7, 9, 10, 26 and 27, housing seal member 800 includes, at outer portion 801, a single beveled or chamfered edge 803 extending between tip 805 and outer surface 810 of region 801, which is the thickest portion 801*t* that forms an outwardly directed radial seal, backed up by a support such as support 720, in use. Edge 803 typically extends at an angle, HE, relative to a plane perpendicular (indicated at P) to air flow through a filter cartridge in use, indicated by axial arrow 820, within the range of 30° to 60°, inclusive typically 35°-55°, inclusive usually 40°-50°, inclusive. (In some instance air flow could be in a direction opposite to arrow 820, but the plane perpendicular would be the same). It is anticipated that in a typical arrangement, a cartridge utilizing seal 800 would be installed such that air flow of filtered air from a media pack would be in the direction of arrow 820. The use of a single chamfered or beveled surface 803, extending at an angle, HE, to a direction perpendicular to flute direction in a corresponding media pack is advantageous for installation in certain applications.

Typically, surface 803 is straight over a distance of at least 4 mm, usually at least 6 mm, typically 6-16 mm, inclusive. Forming radiused portions at ends 803*o* and 803*i* facilitates installation.

Generally speaking, region 801 would be about 6 to 18 mm thick, inclusive, at its thickest portion 801*t* (in thickness from region 809, where a support would be positioned in use.) Typically the thickness is in the range of 8-14 mm, inclusive.

In FIGS. 29 and 30, example dimensions are provided to facilitate understanding. Alternate dimensions can be utilized, with principles described herein. The dimensions indicated in FIGS. 29 and 30 are as follows: GA=226.5 mm; GB=194 mm; GC=5.7 mm; GD=3.0 mm radius; GE=4.0 mm radius; GF=4.0 mm radius; GG=225.7 mm; HA=20.9 mm; HB=14.9 mm; HC=6.4 mm and HD=45°.

At region 801*t*, the outer surface 810 is generally parallel or approximately parallel to central axis 827, i.e., an axis parallel with air flow through a filter cartridge in use. Angle HD, FIG. 30, is an acute angle between surfaces 803 and surface 810 in region 801*t*. It is typically no greater than 60°, usually no less than 30°, often within the range of 35°-55°, inclusive. Usually the angle HD is within the range of 40°-50° inclusive, for example 45° as shown.

In FIG. 31, an additional housing seal arrangement 830 is depicted, with outer portion 831, inner portion 837, tip 835 and chamfered surface 833. These regions may be generally as described for example 800, FIGS. 29 and 30, except region 831 is shown fragmented at 840, indicating that housing seal arrangement 830 is a housing seal portion of an overmold otherwise analogous to that described above in connection with FIGS. 1, 3, 4, 7, 9 and 10. Thus, the principles described in connection with FIGS. 29 and 30, can also be applied for the profile of a housing seal member in an arrangement involving an overmold to secure the housing seal member to the media pack, as described above in connection with FIGS. 1, 3, 4, 7, 9 and 10.

B. Modifications in the Preform to Define an Advantageous Filter Cartridge for Selected Situations, FIGS. 32-40.

The reference numeral 850, FIG. 32, indicates an alternate filter cartridge including selected improvements described herein. The particular filter cartridge 850 depicted includes a media pack 851 and a housing seal arrangement 852. The media pack 851 may be generally as described hereinabove, comprising z-filter media in accord with the variations discussed. The particular media pack 851 on housing seal arrangement 852 depicted, each have a generally oval, in this instance racetrack, shaped perimeter outer periphery, although the principles described herein can be applied in connection with media packs that have a circular perimeter (outer periphery) if desired.

For the example shown, the housing seal 852 comprises a portion of an overmold 855, generally in accord with overmold of seal arrangements, discussed above in connection with FIGS. 1, 3, 4, 7, 9 and 10. However the housing seal 852 could be formed as a seal member molded onto a separate preform which is than secured to a media pack, analogously to the description above for FIGS. 26, 27. Further, the profile of region 852 can be modified in accord with the chamfered or beveled arrangement discussed above in connection with FIGS. 28-31.

Still referring to FIG. 32, the media pack 851 has opposite ends 850*x* and 850*y*. At end 850*x*, the housing seal arrangement 852 is positioned. At end 850*y* an optional end skirt (skid skirt) or end piece 860 is positioned. The framepiece or end piece 860 can be used to perform functions similar to those for framepiece 104, discussed above in connection with FIGS. 7 and 9. It is noted that framepiece 860 is improved relative to framepiece 104, by the provision of scallop-shaped finger tip receiving regions 861 therein, around selected portions of framepiece 860. The scallop-shaped regions 861 facilitate handling of cartridge 850 during installation and removal.

The scallop-shaped regions 861 can be provided with undercuts at 861*a*, and are particularly useful when positioned around the curved ends of a racetrack or oval shaped media pack 851. More specifically, scalloped regions 861 are open in a direction toward the housing seal arrangement and help with removal of cartridge 850 when installed in an arrangement of the general type described in PCT/U.S. 2005/014909, incorporated herein by reference, including a loading of the cartridge through a housing side, with a cam or ramp.

In general, certain air cleaners being developed include mass air flow sensors (MAFS) positioned relatively close to the serviceable filter cartridge, at a location downstream therefrom. In typical arrangements, in which the housing seal is positioned on a downstream end of the filter cartridge, this means that the housing seal arrangement comprising a preform in the molded housing seal member, are positioned relatively near the mass air flow sensor and in air flow coming from a downstream end of the media pack. It is preferred that the housing seal arrangement be configured so as to not contribute undesirably and inconsistently to fluctuations in the air flow or mass air flow sensor readings can be unacceptably disturbed.

It has been found that when housing seal arrangements are molded in accord with the profiles of FIGS. 1, 3, 4, 7, 9, 10, 26 and 27, in some instances inwardly positioned regions of molded urethane can provide undesirable levels of inconsistent flash thereby disturbing the stability of flow pass the air flow sensor an unacceptable amount. To inhibit this, cartridge 850 is provided with a housing seal arrangement including a preform having a radially, inwardly directed, usually continuous, seal material resin rise stop or lip therein, that, when used in association with features in mold, reduce this issue.

With respect to this, attention is first directed to FIG. 33. In FIG. 33, cartridge 850 is depicted without end piece 860, (FIG. 32) thereon. Referring to FIG. 33, housing seal arrangement 852 comprises the molded seal member 860 and preform 861. The preform 861, except as discussed below, is generally analogous to preform 35, FIGS. 3, 4 and 5, and includes: seal support 862 which extends generally axially, outwardly, from surface 850x away from the media pack 851; skirt 863, extending between the support 862 and a perimeter region of the media pack 851; and, cross pieces 864, which provides stability to surface 850x, and also circumferential strength to the preform 861. The particular preform 861 depicted stops short of outside periphery 851o, of media pack 851, and includes tip 865 analogous to tip 45a, FIG. 6. (It is noted that cross-pieces 864 define a different portion than in previously depicted arrangements, but similar functions are accommodated.)

Preform 861 includes, unlike preform 35, FIGS. 3-6, inwardly, radially, projecting stop or lip 870 located at an end support 862, generally at a junction between support 862 and skirt 863. Projection 870, as will be seen, provides for control of rise of seal resin in region 875, during filter cartridge manufacture. This can help create a more uniform region of molded material in overlap with surface 850x, to reduce production of instability into air flow therefrom. In this context the term "inwardly" and variants thereof, is meant to indicate a direction of extension away from support 862 in a direction also away from a seal region of the molded seal member 860. The term "radially" is meant to indicate a direction of extension generally toward a central axis extending through the media pack 851.

FIG. 34, cross-sectional view analogous of FIG. 33, is depicted, except through a shorter axis of the oval shape. Features depicted have analogous function and are numbered accordingly.

In FIG. 35 a portion of FIG. 34 is shown in enlarged, fragmentary view. The portion depicted in FIG. 35, generally provides an understanding of the housing seal arrangement 852.

Referring to FIG. 35, housing seal arrangement 852 includes molded seal region 855 having a radially, outwardly, directed housing seal surface 852s thereon and formed integrally therewith. The housing seal arrangement 852 further includes preform 861 having support 862, skirt 863 and lip or projection 870. Referring to FIG. 35, at region 871, it can be understood that projection 870 comprises an angled inner surface adjacent an inner surface 862i of support 862, typically extending at an angle A1, thereto, within the range is 130° to 155°, typically 135° to 150°.

In the example shown in FIG. 35, surface 821i extends slightly outwardly, in extension between joint 821x and tip 821y, at an angle, relative to a direction parallel with air flow through media pack 851, of about 6°, although variations are possible.

Still referring to FIG. 35, molded overmold 855 includes outer portion 880 and inner portion 881. Surface 871 is provided to cap the mold in the region where inner portion 881 rises, during molding. With respect to this, it is noted that the arrangement of FIG. 35 will be formed analogously to the arrangement of FIGS. 1, 3, 4, 7, 9 and 10, and thus would be inverted relative to FIG. 35, when region 881 and 880 are formed.

Still referring to FIG. 35, region 881 will typically be at least about 1 mm thick, typically at least about 1.5 mm thick and usually within the ranges about 1.6-2.5 mm thick, inclusive, in extension along surface 821i and inwardly therefrom, although variations from this are possible.

Region 821i includes beveled tip 821t, adjacent projection 870.

Projection to lip 870 then typically extends a distance of at least 1 mm, usually at least 1.5 mm and typically a distance within the range of at least 1.6-2.6 mm, although variations are possible. In a completed cartridge 850, lip 870 is positioned between tip 821t, and the media 851g with lip 870 adjacent the seal material in region 821i and spaced from the media 851.

Still referring to FIG. 35, when inverted it will be understood that projection 870 extends over a mold region in which resin can rise to form molded portion 881, of overmold 852, along an inside of support 862. By resting on a mold cavity, region 870 will cap the rise of resin forming region 881. Thus extra flash outwardly, or uneven molding, is reduced. This will facilitate stable air flow and mass air flow sensor operation.

In FIG. 36, preform 861 is depicted. Support 862, skirt 863 and cross pieces 864 are viewable. FIG. 37 is a cross-sectional view taken along line 37-37, FIG. 36. Here radially inwardly directed, projection or lip 870 can be viewed. It is noted that ridge or stop 870 is supported by gussets 870a. In typical arrangement, lip 870 is radially continuous, around its entire extension, and does not include gaps therein.

FIG. 38 is a cross-sectional view taken along line 38-38, FIG. 36.

In FIG. 39 a cross-sectional view taken along line 39-39, FIG. 36 is depicted. In FIG. 39 preform 861 is depicted inverted, as it would be when positioned when in a mold, for forming molded in place seal arrangement 860, FIG. 33. It can be seen that radially inwardly projecting stop or ridge 870 is positioned to provide a stop to resin flow upwardly along region 862i, during molding.

FIG. 40 is a viewable molded seal region 860 when made using a preform 861, in accord with a molded process generally otherwise in accord with that described above for FIGS. 11-16. Typically molded seal region 860 would not be formed separately from preform support, but rather would be molded in place thereon. However, in FIG. 40 is depicted separately, so features can be readily seen.

At 880, a surface which defines tip 821t, resulting from rise into stop 870, FIGS. 37-39, is shown. Surface 880 will typically be beveled to extend downwardly, in extension out from gap 881, FIG. 40, in which a seal support will be positioned in use.

It will be understood that a lip analogous to lip 870 can be used also on preform used in the arrangements of FIGS. 26, 27, to control rise along an inner region while the mold in place seal arrangements used therein, are formed. The principal difference is that such seal arrangements do not include the overmold region 890, FIG. 40.

In FIGS. 32-40, example dimension are provided for an example arrangement utilizing a racetrack shape. The example dimensions are as follows: IA=300.4 mm; IB=310.3 mm; JA=300.4 mm; JB=190 mm; JC=221.1 mm; JD=299 mm; KA=152.4 mm; KB=151 mm; LA=295.6 mm; LB=70°; LC=49.5 mm; LD=24.7 mm; LE=147.6 mm; LF=61.8 mm radius; LG=2 mm; LH=5.0 mm diameter; MA=276.6 mm; MB=2.5 mm; MC=271.6 mm; MD=15.8 mm; ME=27 mm; MF =295.6 mm; NA=128.6 mm; NB=123.6 mm; NC=15.8 mm; ND=147.6 mm; OA =147.6 mm; OB=15.8 mm; OC=125.2 mm; OD=130.2 mm; PA=300.4 mm; PB=28.6°; PC=295.6 mm; PD=4.0 mm radius; PE=269.1 mm; PF=150.8°; PG=25°; PH=271.4 mm; PI=33.3°; PJ=4.2 mm; and PK=304 mm.

What is claimed is:

1. An air filter cartridge comprising:
   (a) a media pack including an inlet end and an opposite outlet end:
      (i) the media pack comprising filter media defining flutes extending between the inlet end and the outlet end;
      (ii) the media pack being closed to flow of unfiltered air therethrough without passage through filter media of the media pack; and
      (iii) the media pack having a racetrack shaped periphery;
   (b) a seal member positioned on an end of the media pack;
      (i) the seal member including a portion thereof molded around the periphery of the media pack; and
      (ii) the seal member including a radially directed seal surface for forming a radial seal with a seal surface of an air cleaner housing; and
   (c) a preform mounted on an end of the media pack opposite the seal member;
      (i) at least one finger tip receiving region located between the media pack and the preform and sized to receive finger tips to facilitate handling of the air filter cartridge during installation and removal from an air cleaner housing; and
      (ii) the preform extending around the periphery of the media pack.

2. An air filter cartridge according to claim 1 wherein:
   (a) the seal member portion molded around the outer periphery of the media pack is located at the outlet end of the media pack, and the preform extending around the periphery of the media pack is located at the inlet end of the media pack.

3. An air filter cartridge according to claim 1 wherein:
   (a) the at least one finger tip receiving region located between the media pack and the preform comprises a scallop-shaped finger tip receiving region.

4. An air filter cartridge according to claim 1 wherein:
   (a) the at least one finger tip receiving region located between the media pack and the preform is positioned at a curved end of the racetrack shaped periphery of the media pack.

5. An air filter cartridge according to claim 1 wherein:
   (a) the at least one finger tip receiving region is open in a direction toward the seal member.

6. An air filter cartridge according to claim 1 wherein:
   (a) the media pack comprises a coiled arrangement of a fluted sheet secured to a facing sheet.

7. An air filter cartridge according to claim 1 wherein:
   (a) the racetrack shape periphery of the media pack has opposite curved ends and opposite straight sides.

8. An air filter cartridge according to claim 1 wherein:
   (a) the air filter cartridge further comprises an arrangement extending across a media pack flow face at the outlet end to prevent the media pack from telescoping during use.

9. An air filter cartridge according to claim 8 wherein:
   (a) the seal member is supported by a seal support.

10. An air filter cartridge according to claim 9 wherein:
    (a) the arrangement extending across the media flow face extends from the seal support.

11. An air filter cartridge comprising:
    (a) a media pack including an inlet end and an opposite outlet end:
       (i) the media pack comprising filter media comprising a fluted sheet and a facing sheet forming flutes extending between the inlet end and the outlet end;
       (ii) the media pack being closed to flow of unfiltered air therethrough without passage through filter media of the media pack; and
       (iii) the media pack having a racetrack shaped periphery;
    (b) a seal member positioned on an end of the media pack;
       (i) the seal member including a portion thereof molded around the periphery of the media pack; and
       (ii) the seal member including a radially directed seal surface for forming a radial seal with a seal surface of an air cleaner housing; and
    (c) a preform mounted on an end of the media pack opposite the seal member;
       (i) an opening between the media pack and the preform and facing the seal member; and
       (ii) the preform extending around the periphery of the media pack.

12. An air filter cartridge according to claim 11 wherein:
    (a) the seal member portion molded around the outer periphery of the media pack is located at the outlet end of the media pack, and the preform extending around the periphery of the media pack is located at the inlet end of the media pack.

13. An air filter cartridge according to claim 11 wherein:
    (a) the opening between the media pack and the preform is positioned at a curved end of the racetrack shaped periphery of the media pack.

14. An air filter cartridge according to claim 11 wherein:
    (a) the media pack comprises a coiled arrangement of the fluted sheet secured to the facing sheet.

15. An air filter cartridge according to claim 11 wherein:
    (a) the media pack racetrack periphery has opposite curved ends and opposite straight sides.

16. An air filter cartridge according to claim 11 wherein:
    (a) the air filter cartridge further comprises an arrangement extending across a media pack flow face at the outlet end to prevent the media pack from telescoping during use.

17. An air filter cartridge according to claim 16 wherein:
    (a) the seal member is supported by a seal support.

18. An air filter cartridge according to claim 17 wherein:
    (a) the arrangement extending across the media flow face extends from the seal support.

19. An air filter cartridge comprising:
    (a) a media pack including an inlet end and an opposite outlet end:
       (i) the media pack comprising filter media comprising a fluted sheet and a facing sheet forming flutes extending between the inlet end and the outlet end; and
       (ii) the media pack being closed to flow of unfiltered air therethrough without passage through filter media of the media pack;
    (b) a seal member positioned on an end of the media pack; the seal member having a racetrack shaped periphery;
       (ii) the seal member including a portion thereof molded around the periphery of the media pack; and
       (iii) the seal member including a radially directed seal surface for forming a radial seal with a seal surface of an air cleaner housing; and
    (c) a preform mounted on an end of the media pack opposite the seal member;

(i) an opening between the media pack and the preform and facing the seal member; and
(ii) the preform extending around the periphery of the media pack.

* * * * *